United States Patent [19]
Aoki et al.

[11] Patent Number: 5,385,189
[45] Date of Patent: Jan. 31, 1995

[54] PNEUMATIC TIRE WITH PAIRED SIDES IN THE TREAD

[75] Inventors: Namito Aoki, Kokubunji; Yasufumi Ichiki; Chishiro Tanabe, both of Kodaira, all of Japan

[73] Assignee: Bridgestone Corporation, Tokyo, Japan

[21] Appl. No.: 967,281

[22] Filed: Oct. 27, 1992

[30] Foreign Application Priority Data

| Nov. 1, 1991 | [JP] | Japan | 3-287689 |
| Nov. 1, 1991 | [JP] | Japan | 3-288017 |
| Nov. 11, 1991 | [JP] | Japan | 3-294338 |
| Nov. 11, 1991 | [JP] | Japan | 3-294339 |
| Nov. 11, 1991 | [JP] | Japan | 3-294340 |
| Nov. 11, 1991 | [JP] | Japan | 3-294341 |
| Jun. 4, 1992 | [JP] | Japan | 4-144591 |
| Jun. 4, 1992 | [JP] | Japan | 4-144614 |

[51] Int. Cl.⁶ ............................................. B60C 11/12
[52] U.S. Cl. ........................... 152/209 R; 152/DIG. 3
[58] Field of Search .......... 152/209 R, 209 A, 209 D, 152/DIG. 3; D12/146, 147

[56] References Cited

U.S. PATENT DOCUMENTS

| D. 238,768 | 2/1976 | Dubos | D12/146 |
| D. 261,495 | 10/1981 | Yurkovich | D12/146 |
| D. 271,958 | 12/1983 | Gorez | D12/147 |
| D. 335,845 | 5/1993 | Lurois | D12/147 |
| 2,121,955 | 6/1938 | Eger | 152/209 R |
| 2,848,910 | 8/1958 | Bastian | |
| 4,945,966 | 8/1990 | Ogawa | 152/209 R |
| 5,024,260 | 6/1991 | Ochiai | |

FOREIGN PATENT DOCUMENTS

| 7411386 | 9/1974 | Germany . |
| 63-279903 | 11/1988 | Japan . |
| 63-279904 | 11/1988 | Japan . |
| 1101205 | 4/1989 | Japan . |
| 2212204 | 8/1990 | Japan . |
| 2267009 | 10/1990 | Japan . |
| 2286405 | 11/1990 | Japan . |
| 2293204 | 12/1990 | Japan . |
| 2310109 | 12/1990 | Japan . |
| 3182811 | 8/1991 | Japan . |
| 4183611 | 6/1992 | Japan . |
| 4191104 | 7/1992 | Japan . |
| 4215505 | 8/1992 | Japan . |
| 4218411 | 8/1992 | Japan . |
| 474588 | 11/1937 | United Kingdom . |
| 2053783A | 2/1981 | United Kingdom . |
| 1594884 | 8/1981 | United Kingdom . |

*Primary Examiner*—Caleb Weston
*Assistant Examiner*—Nancy T. Krawczyk
*Attorney, Agent, or Firm*—Oliff & Berridge

[57] ABSTRACT

A pneumatic tire includes a plurality of blocks, each having a narrow area interposed between one set of two sipes which extend substantially in a transverse direction of the tire and wide areas positioned respectively at both sides of the narrow area across the sipes. An average distance H2 from a tire tread surface of the narrow area to bottom portions of the sipes is less than an average distance H1 from tire tread surfaces of the wide areas to the bottom portions of the sipes. Expanded portions may be provided at the bottom portions of the two sipes. A ratio W2/W1 of a length W2 of the narrow area in the transverse direction of the tire to a length W1 of the wide areas in the transverse direction of the tire may satisfy $0.50 \leq W2/W1 \leq 0.95$. A length, in the circumferential direction of the tire, of at least one side end portion of the narrow area may be longer than a length, in the circumferential direction of the tire, of a central portion of the narrow area. In a vulcanization mold for forming a green tire, a pair of blades for forming a pair of sipes are provided at a bottom portion of a concave portion for forming a block portion. A vent hole is also provided at a bottom portion of an area between the blades. A method of manufacturing a pneumatic tire using the mold is provided.

13 Claims, 53 Drawing Sheets

FIG. 48A
PRIOR ART
FIG. 48B
PRIOR ART
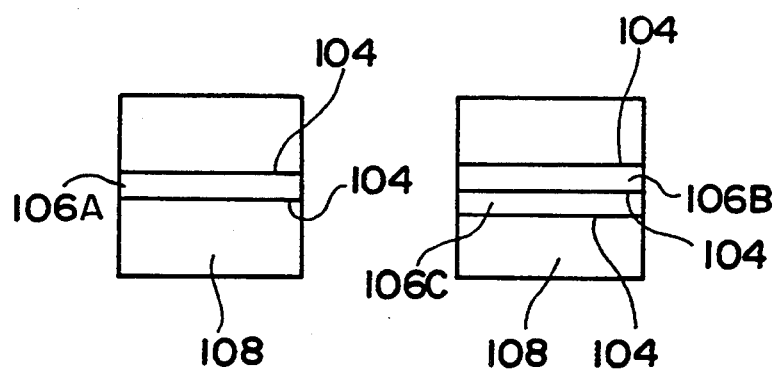
FIG. 49A
FIG. 49B
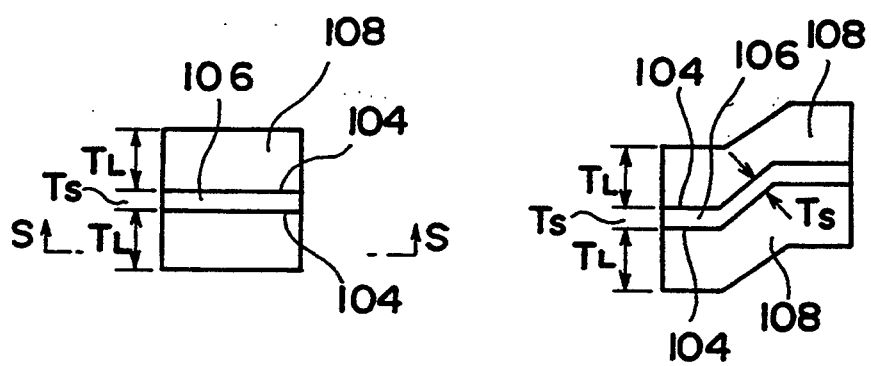

PNEUMATIC TIRE WITH PAIRED SIDES IN THE TREAD

BACKGROUND OF THE INVENTION

1. Field of the Invention

The present invention relates to a pneumatic tire having a block pattern, and in particular, a pneumatic tire comprising blocks having sipes and formed in various structures. Further, the present invention relates to a vulcanizing mold having a particular structure for manufacturing a pneumatic tire having a block pattern, and to a method of manufacturing a pneumatic tire using this mold.

2. Description of Related Art

A pneumatic tire which has sipes in blocks so that the running performance of the tire improves on ice- or snow-covered roads due to the edges of the sipes is known as a studless tire. The studless tire is used on vehicles which run on ice- or snow-covered roads. FIG. 44 is a cross-sectional view cut along a circumferential direction of a conventional block tire.

As shown in FIG. 44, a pair of sipes 104, which extend in the transverse direction of a pneumatic tire 100 (the direction orthogonal to the surface of the paper in FIG. 44), is provided in a block 102 in a central portion in the circumferential direction of the tire (the direction of arrow A in FIG. 44). The block 102 is divided by the pair of sipes 104 into a central area 106, which is defined between the sipes 104, and areas 108, which are located respectively at both sides of the central area 106. The width, in the circumferential direction of the tire, of the central area 106 is narrow compared to the width of the area 108. As a result, the narrow central area 106 (hereinafter referred to as "narrow area") is less rigid than the area 108 (hereinafter referred to as "wide area"). When the block 102 of the pneumatic tire 100 contacts a road surface and is subject to frictional force from the road surface in a direction tangential to the outer circumference of the tire, as shown in FIG. 45, the narrow area 106, having lower rigidity, is greatly deformed, and one of the sipes of the pair of sipes 104 closes while the other opens. As a result, the narrow area 106 is used as an edge, and the driving performance and braking performance improve as the coefficient of friction on ice increases.

As an example, Japanese Patent Application Laid-Open Nos. 63-279903 and 63-279904 disclose a pneumatic tire having blocks in which the ratio of the width of the narrow area to the width of wide area is less than or equal to 0.8.

However, with regard to the ground contacting pressure within the block, as shown in FIG. 45, because the deformation of the narrow area 106 is large compared with that of the wide areas 108, the ground contacting pressure of the narrow area 106 is small. As a result, the narrow area 106 wears more slowly than the wide areas 108. As the wear progresses, the narrow area 106 protrudes further than the wide areas 108 (see the imaginary or phantom line in FIG. 44). When the narrow area 106 protrudes further than the wide areas 108, the ground contacting pressure on the wide areas 108 decreases, and there is a drawback in that the on-ice performance of these wide areas 108 deteriorates. FIG. 46 is a graph illustrating the relation between the amount of protrusion of the narrow area and the coefficient of friction $\mu$ on ice. It is clear from the graph that as the amount of protrusion of the narrow area increases, the coefficient of friction $\mu$ on ice decreases. (When the protruding surfaces of the narrow area 106 and the wide areas 108 are even, the coefficient of friction $\mu$ on ice is set to an index number of 100). The concept of FIG. 45 was recognized by the inventor of the present application, and the FIG. 46 data was obtained from an experiment carried out by the inventor of the present application.

Further, because the groove width of the sipe 104 is narrow, when the sipe 104 opens, it is easy for stress to concentrate on the bottom portion 104A of the sipe 104. It is therefore easy for cracks to form from the bottom portion 104A. In order to combat this drawback, forming an enlarged portion, having a circular cross-sectional configuration, at the bottom portion of one sipe is known. However, as illustrated in FIG. 47A, when two sipes are disposed so as to be adjacent to each other, if an interval L between enlarged portions 105 is too narrow, a drawback arises in that the rubber which should be between the sipes 104 is caught and remains between blades 110 of a vulcanization mold 200, as shown in FIG. 47B. Further, the rigidity of the narrow area 106 between the sipes 104 decreases, and the amount of shearing deformation, when the pneumatic tire is subject to a front-to-back force F during running, increases. As a result, a drawback arises in that it is easy for cracks to form from the bottom portion 104A.

FIGS. 48A and 48B are plan views of conventional blocks having at least two sipes. When side force is applied to narrow areas 106A, 106B, 106C due to cornering or the like, distortion due to shearing occurs, and cracks form in the bottoms of the sipes 104. If the cracks worsen, depending on the case, the narrow areas may break off.

There exist a variety of configurations a plurality of sipes formed in a tire block. In the majority of cases, a pair of sipes is formed so as to be parallel. Examples are illustrated in FIGS. 49A and 49B.

However, when a side force during running, such as that described above, acts upon tires having a variety of configurations for blocks having sipes, the bottom portion of the narrow area 106 is deformed by shearing force in the transverse direction. Cracks are generated, and, depending on the case, the narrow area 106 may break off.

When the above-described blocks having sipes are disposed on a pneumatic tire tread such that the narrow areas are arranged in a row along the transverse direction of the tire, another drawback arises in that areas having low rigidity are arranged so as to coincide along the transverse direction of the tire. When a side, force is applied to the pneumatic tire, the deformation of the narrow areas is great, cracks form in the narrow areas, and the narrow areas break off.

Usually, concave portions for forming blocks are provided in a vulcanization mold for vulcanizing a block tire. After an unvulcanized green tire is placed in the vulcanization mold, the green tire is pressurized to a predetermined pressure and heated to a predetermined temperature. Due to this process, the rubber of the green tire is pressed tightly into the concave portions so that the outer contour is formed and vulcanization is effected.

FIG. 50 illustrates a block forming portion of a conventional vulcanization mold with the rubber of a green tire placed therein. When internal pressure is applied to the green tire and rubber 121 of the green tire is forced into the concave portion 100, the concave portion 100 is closed by the rubber 121, and air and gas generated by the rubber stagnate so that the rubber cannot flow. In order to prevent such a situation from occurring, vent holes 140, which communicate with the outside air, are provided in vicinities of the four corners of the concave portion 100 so that the air within the cavities can escape and the rubber 121 can flow more easily. When a pair of sipes is provided so that the block is divided into three areas, as illustrated in FIG. 51, it is necessary to form a pair of thin, plate-shaped blades 110, which extend from one wall surface 116 of the mold to the opposing wall surface 118, within the concave portion 100. The concave portion 100 is divided into three areas by the pair of blades 110 so that a small concave portion 112 is formed between the pair of blades 110. In this case, as shown in FIG. 52, when the rubber 121 of the green tire flows into the concave portion 100, there is no place within the small convex portion 112 for the air to escape so that the small concave portion 112 can be closed by the rubber. Therefore, the rubber does not flow to the bottom portion of the small concave portion 112, and there is a drawback in that bare areas exist in the block after vulcanization.

In order to eliminate this drawback, the inventor of the present application attempted a method of forming a pneumatic tire by using a vulcanization mold in which through-holes 114, shown by the imaginary lines in FIG. 51 (because the holes 114 are not statutory prior art), are provided so that the small concave portion 112 and end concave portions 115, which are adjacent to the small concave portion 112, communicate via the through-holes 114. However, this structure did not sufficiently allow the air inside the small concave portion 112 to escape, and consequently did not sufficiently prevent the formation of bare areas.

SUMMARY OF THE INVENTION

An object of the present invention is to provide a pneumatic tire in which, as the tire becomes worn, the protruding of a narrow area interposed between sipes is prevented so that the on-ice running performance of the tire does not deteriorate.

Another object of the present invention is to provide a pneumatic tire which has blocks with at least one pair of sipes and which can reliably and easily be removed from a mold for vulcanization.

Another object of the present invention is to provide a pneumatic tire having blocks with at least one pair of sipes in which the generation of cracks at bottom portions of the sipes can be prevented.

Another object of the present invention is to provide a pneumatic tire having a block pattern capable of preventing the formation of cracks in a narrow area defined by a pair of sipes and the breaking off of portions of blocks.

Another object of the present invention is to provide a mold for vulcanization and a method of manufacturing a pneumatic tire which can prevent the formation of bare areas in a narrow area when a pneumatic tire having blocks with at least one pair of sipes is manufactured.

A pneumatic tire comprises a plurality of blocks, each having a narrow area interposed between one set of two sipes which extend substantially in a transverse direction of the tire and wide areas positioned respectively at both sides of the narrow area across the sipes, an average distance H2 from a tire tread surface of the narrow area to bottom portions of the sipes being less than an average distance H1 from tire tread surfaces of the wide areas to the bottom portions of the sipes. By making H2 shorter than H1, as the tire contacts the ground when it rotates, due to the difference between the distance from the center of rotation of the tire to the tread surface of the narrow area and the distance from the center of rotation of the tire to the tread surface of the wide area, there are cases in which the narrow area slidingly contacts the road surface and cases in which the narrow area does not contact the road surface. In the former case, the narrow area wears more quickly than the wide areas due to the narrow areas slidingly contacting the road surface. As a result, even when the block becomes worn, there is no protruding of only the narrow area. In the latter case (no contact), if, for example, $H2 << H1$, the narrow area does not contact the road surface from the initial stages of wear of the block to the intermediate stages thereof. Therefore, the narrow area does not protrude compared with the wide areas. After the intermediate stages of wear of the block, H2 is relatively small. Therefore, the rigidity of the narrow area is not as small as that of the wide area. As a result, there is no protruding of only the narrow area. Accordingly, in either of these cases, by making H2 smaller than H1, sufficient running performance is maintained until the final stages of wear. It is preferable that H2/H1 is greater than or equal to 0.55 so that the edge effect of the sipes is exhibited for a longer period of time. When H2/H1 is less than 0.55, because time is required for the tread surface of the narrow area to contact the road surface as the tire becomes worn, the edge effect of the sipes is exhibited for a short time. When H2/H1 is greater than or equal to 1, the protruding of the narrow area cannot be prevented. It is especially preferable that H2/H1 satisfies $0.6 \leq H2/H1 \leq 0.85$.

According to another aspect of the present invention, a pneumatic tire comprises a plurality of blocks, each having a narrow area interposed between one set of two sipes which extend substantially in a transverse direction of the tire and wide areas positioned respectively at both sides of the narrow area across the sipes, expanded portions being formed respectively at bottom portions of the sipes. A ratio L/TS of a shortest distance L between the expanded portions to an average length TS of the narrow area in a circumferential direction of the tire satisfies $0.7 \leq L/TS \leq 1.5$.

By providing the expanded portions at the bottom portions of the sipes, the stress applied to the bottom portions when the sipes open is dispersed, and the formation of cracks from the bottom portions can be prevented. By setting the ratio of the shortest distance L in the circumferential direction of the tire between the expanded portions of the two sipes to the average length TS of the narrow area in the circumferential direction of the tire within a range of $0.7 \leq L/TS \leq 1.5$, deterioration of the rigidity of a base portion of the narrow area interposed between the two sipes of the block is suppressed. Therefore, when the pneumatic tire is removed from the vulcanization mold used to form the pneumatic tire, the narrow area is not caught and does not remain between blades of the vulcanization mold which are used to form the sipes. If the ratio L/TS is less than 0.7, the strength of the base portion of the narrow area deteriorates. Therefore, when the pneumatic tire is removed from the vulcanization mold, the narrow area may be caught by and may remain between the blades which form the sipes. Further, because the rigidity of the narrow area decreases and shearing deformation due to front-to-back force during running becomes large, there is the fear that cracks may form from the bottom portions of the sipes. On the other hand, if the ratio L/TS is greater than 1.5, the rigidity of the wide areas decreases, and the inclination of the blades of the vulcanization mold which form the sipes increases. Therefore, it becomes difficult to remove the pneumatic tire from the vulcanization mold.

It is preferable that the relation between the shortest distance L between the enlarged portions and the depth D of the sipe is such that L/D=0.1 to 0.8. It is even more preferable that L/D=0.3 to 0.8. If L/D is less than 0.1, the rigidity of the narrow area decreases, and there is the fear that the narrow area will break off when the tire is removed from the vulcanization mold. If L/D is greater than 0.8, the narrow area will become too rigid, and there will not be a difference between the rigidities of the areas. The value of L must be at least 1.0 mm, and 2.5 to 5.6 mm is especially preferable. It is preferable that the value of D is 7 to 15 mm.

With regard to the size of the block, in general, the length in the circumferential direction of the tire is 17 to 40 mm and preferably 20 to 35 mm. The length in the axial direction is 10 to 80 mm and preferably 15 to 50 mm. When the length in the axial direction is less than 10 mm, the rigidity of the block decreases, and traction on snow deteriorates. In addition, the rigidity of the narrow area decreases, and there is the fear that the narrow area will break off when the tire is removed from the vulcanization mold. If the length of the block in the axial direction of the tire is greater than 80 mm, the ground contacting pressure of the block decreases. Therefore, it is difficult for the edge effect to be exhibited.

It is preferable that the bottom portions of one set of sipes expand in convex shapes in directions moving away from each other. By forming the enlarged portions in this way, when the tire is removed from the vulcanization mold, the narrow area of the block is smoothly and reliably removed from the mold so that portions do not break off from the narrow area of the block of the manufactured tire.

In accordance with another aspect of the present invention, a pneumatic tire comprises a plurality of blocks, each having a narrow area interposed between one set of two sipes which extend substantially in a transverse direction of the tire and wide areas positioned respectively at both sides of the narrow area across the sipes, wherein a ratio W2/W1 of a length W2 of the narrow area in the transverse direction of the tire to a length W1 of the wide areas in the transverse direction of the tire satisfies $0.50 \leq W2/W1 \leq 0.95$. When side force is applied to the tire due to cornering or the like, the shearing force acting on the end portions of the sipes can be greatly reduced by setting W2/W1 within the above-mentioned range. As a result, the number of cracks which form in the bottoms of the sipe end portions can be reduced, and the breaking off of portions of the narrow area can be prevented. When W2/W1 is greater than 0.95, a large shearing force forms in the sipe bottoms when side force is applied to the tire, and the narrow area easily breaks off. On the other hand, when W2/W1 is less than 0.5, the coefficient of friction on ice decreases. Therefore, the purpose of providing the two or more sipes is lost.

According to another aspect of the present invention, a pneumatic tire comprises a plurality of blocks, each having a narrow area interposed between one set of two sipes which extend substantially in a transverse direction of the tire and wide areas positioned respectively at both sides of the narrow area across the sipes, and a length, in the circumferential direction of the tire, of at least one side end portion of the narrow area is longer than a length, in the circumferential direction of the tire, of a central portion of the narrow area. It is preferable that the relation between the length TS1, in the circumferential direction of the tire, of the central portion of the narrow area and the length TS2, in the circumferential direction of the tire, of a side end portion of the narrow area satisfies the condition $1.1 \leq TS2/TS1 \leq 3$. If TS2/TS1 is less than 1.1, rigidity of the narrow area in the transverse direction is insufficient, and cracks form easily in the end portions of the narrow area. If TS2/TS1 is greater than 3, rigidity of the narrow area in the circumferential direction is too large. Therefore, the purpose of providing the plurality of sipes is lost, and the on-ice braking performance is insufficient.

By using the above-described structure, the formation of cracks in the narrow area can be effectively prevented in the following two cases.

(1) In a case in which the depths of the main grooves adjacent the blocks are equal and the sipes are more shallow than the main grooves: When side force is input to the block while the vehicle is traveling, shearing force in the transverse direction of the block is generated and is concentrated on the end portions of the block. This state is illustrated in FIG. 53 which is a sectional view in the transverse direction of a tire having a block which is contacting the ground. In FIG. 53, "outer side" refers to an outside of the tire tread, and "central portion" refers to an inside of the tire tread. FIG. 54 illustrates how the shearing force varies with respect to positions in the transverse direction of the block when side force is input from the outside of the tire tread. As can be understood from this graph, the shearing force gradually decreases as it is directed toward the central portion of the tire tread. At the bottom portion of the narrow area as well (the portion represented by the broken lines), the shearing force concentrates at the end portion X. In the present invention, the length, in the circumferential direction of the tire, of the end portion of the narrow area is made longer than the length, in the circumferential direction of the tire, of the central portion of the narrow area in order to reinforce the portion on which the shearing force concentrates. In this way, the transverse rigidity of the end portion of the narrow area is increased, and deformation of the end portion is controlled. The concentration of stress on this area can thereby be decreased.

(2) In a case in which the depths of the grooves adjacent to the block are different and the sipes are deeper than either of the main grooves: FIG. 55A is a sectional view, in the transverse direction of the tire, of a block which is contacting the ground, and illustrates this type of case. When side force is imparted from the deeper groove b2, the entire block, i.e., the block from the bottom portion of the deeper groove, deforms. Therefore, it is difficult for stress to concentrate on the bottom portion X of the end of the narrow area. On the other hand, if side force is imparted from the more narrow groove b1 as shown in FIG. 55B, stress concentrates on the bottom portion X of the end of the narrow area, and cracks are easily formed. In the present invention, the length, in the circumferential direction of the tire, of the end portion of the narrow area at which the groove is shallow is made larger than the length of the central portion of the narrow area. Accordingly, as in above-described case (1), deformation of the land portion between the sipes can be controlled, and the concentration of stress on this area can be reduced.

In the above-described four aspects of the present invention, the block including one set of sipes has unique structures. These aspects may be appropriately combined so as to form a variety of pneumatic tires which can meet a variety of needs.

According to another aspect of the present invention, a pneumatic tire comprises a plurality of blocks, each having a narrow area interposed between one set of two sipes which extend substantially in a transverse direction of the tire and wide areas positioned respectively at both sides of the narrow area across the sipes, the pneumatic tire having a tire block pattern which is structured so that the narrow area of the block is aligned, in the transverse direction of the tire, with an area, which is more rigid than the narrow area, of another block which is adjacent to the block in the transverse direction of the tire.

By forming this type of block pattern on a tire, even if an extreme frictional force is applied to the tire, the frictional force does not concentrate exclusively on the narrow areas. Therefore, the sipe does not open excessively, and cracks do not form in the bottom of the sipe. Further, even if side force is applied and a complex force, which mainly comprises a component in the transverse direction of the tire, is applied to the narrow area, the deformation of the narrow area is mitigated by the area which is adjacent to and is more rigid than the narrow area. The formation of cracks at, in particular, both end portions of the narrow area can thereby be prevented. Accordingly, in the present invention, the formation of cracks in the narrow area can be effectively prevented. Further, the breaking off of the narrow area which results from cracks can be prevented.

It is preferable that the uniquely structured blocks of the four aspects of the present invention are applied to the pneumatic tire of the present invention having the above-described type of block pattern.

In the present invention, it is preferable that the relation between the average length TS in the circumferential direction of the tire of the narrow area of the block interposed between the sipes and the average length TL in the circumferential direction of the tire of the wide areas disposed respectively at both sides of the narrow area is such that $0.1 \leq TS/TL \leq 0.8$. It is particularly preferable that $0.2 \leq TS/TL \leq 0.5$. When the ratio TS/TL is greater than 0.8, the difference between the rigidities of the narrow area and the wide area becomes small. In a new tire or in a tire which has become worn, it is hard for the sipes to open during braking and during driving, and the edge effect is not obtained. When the ratio TS/TL is less than 0.1, the rigidity of the narrow area becomes too low, and the durability of the narrow area deteriorates. In a new tire or in a tire which has become worn, when the pneumatic tire contacts the ground during driving or braking, the block is subject to frictional force in a direction tangent to the outer circumference of the tire, and deforms. However, by setting TS/TL such that $0.1 \leq TS/TL \leq 0.8$, there is a difference in rigidities between the narrow area and the wide areas, and the narrow area deforms more than the wide areas. When the block is subject to frictional force, one of the sipes of the pair of sipes closes, and the other sipe opens. The running performance (driving performance and braking performance) improves due to the edge effect of the corner portion of the tread surface of the narrow area on the side of the sipe which opens.

According to another aspect of the present invention, a mold for vulcanizing a green tire comprises concave portions for forming block portions of a block pattern of a tire, a pair of blades for forming a pair of sipes being provided respectively at respective bottom portions of the concave portions so that the respective bottom portions of the concave portions are divided into an area between the blades and respective areas on both sides of the area between the blades, and at least one vent hole is provided in a bottom portion of the area between the blades.

By using a mold with the above-described structure, when unvulcanized rubber of the pneumatic tire flows into the concave portion for forming the narrow area, the air inside of the concave portion escapes through the vent hole. As a result, the flow of the unvulcanized rubber into the concave portion is not impeded. Therefore, the unvulcanized rubber spreads to the corners of the concave portion.

According to another aspect of the present invention, there is a method of manufacturing a pneumatic tire comprising a plurality of blocks, each having a narrow area interposed between one set of two sipes which extend substantially in a transverse direction of the tire and wide areas positioned respectively at both sides of the narrow area across the sipes, by using the above-described mold for vulcanizing. Bare areas are not formed in the blocks, and especially not in the narrow areas, of the pneumatic tire formed by this method.

BRIEF DESCRIPTION OF THE DRAWINGS

FIG. 48A and FIG. 48B are plan views of a block of a conventional pneumatic tire, wherein the block has at least two sipes.

FIG. 49A and FIG. 49B are plan views of a block of a conventional pneumatic tire, wherein the block has one set of two parallel sipes.

FIG. 55A and FIG. 55B are views illustrating deformation of a block when a side force is applied to a tire tread in which the depths of the main grooves adjacent the block are different, wherein FIG. 55A illustrates a case in which the side force is applied from the deeper main groove and FIG. 55B illustrates a case in which the side force is applied from the more shallow main groove.

DETAILED DESCRIPTION OF THE PREFERRED EMBODIMENTS

EMBODIMENT 1—1

Embodiment 1—1 of the present invention will be described in accordance with FIG. 1.

Figure 1:
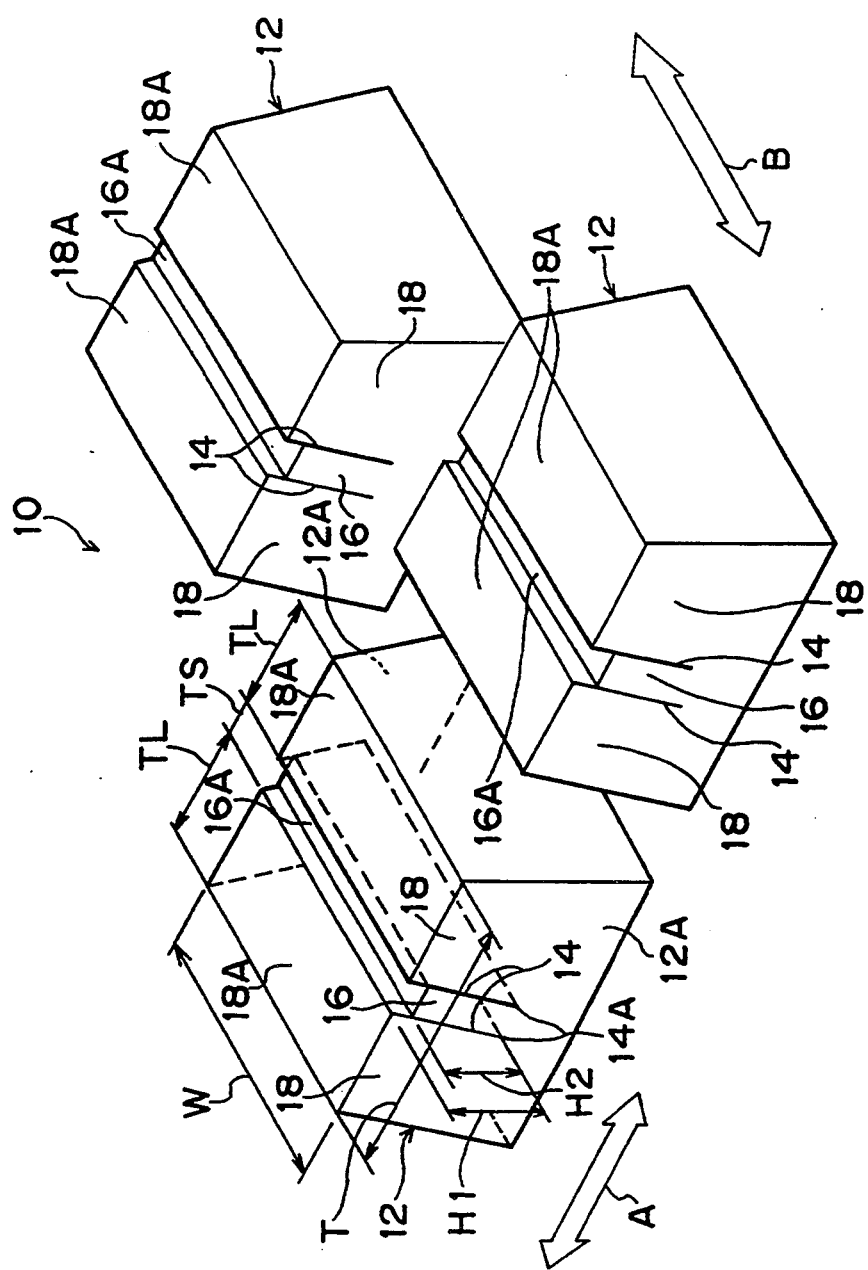
FIG. 1 is a perspective view illustrating a portion of a block pattern of a pneumatic tire of embodiment 1—1 of the present invention.

A pneumatic tire of the present embodiment has a block pattern, a portion of which is illustrated in FIG. 1. A block 12 is formed as a substantially square column. In this example, a dimension T of the block 12 in a circumferential direction of the tire is 30.5 mm, and a dimension W of the block 12 in a transverse direction of the tire (the direction of arrow B in FIG. 1) is 30 mm. The dimensions T and W are not limited to these values. However, the dimension T of the block 12 in the circumferential direction of the tire (the direction of arrow A in FIG. 1) is preferably set so that $15 \text{ mm} \leq T \leq 40$ mm, and more preferably set so that $20 \text{ mm} \leq T \leq 35$ mm. When the dimension T of the block 12 in the circumferential direction of the tire exceeds 40 mm, the ground contacting pressure of the block 12 decreases as the length of the block 12 in the circumferential direction of the tire increases. Therefore, undesirable effects result as it becomes difficult to obtain the edge effect, and driving performance and braking performance deteriorate. On the other hand, when the dimension T in the circumferential direction of the tire is less than 15 mm, the rigidity of the block 12 becomes too small. This case as well results in undesirable effects as it becomes difficult to obtain the edge effect, and driving performance and braking performance deteriorate.

Two sipes 14, which extend in straight lines along the transverse direction of the tire, are formed as one group in the block 12. In this example, the groove width of the sipe 14 is 0.5 mm. The groove width of the sipe 14 is not particularly restricted, and is preferably less than or equal to 1 mm and more preferably less than or equal to 0.6 mm.

Both longitudinal direction end portions of the sipe 14 extend to side walls 12A on the sides of the block 12 in the transverse direction of the tire. The block 12 is divided in the circumferential direction of the tire into three areas by the sipes 14. The area interposed between the pair of sipes 14 is a narrow area 16. Wide areas 18 are respectively provided at both sides, in the circumferential direction of the tire, of the narrow area 16, and are adjacent to the narrow area 16. In this example, a dimension TL of the wide area 18 in the circumferential direction of the tire is 13 mm, and a dimension TS of the narrow area 16 in the circumferential direction of the tire is 3.5 mm. The ratio TS/TL is approximately 0.27. The dimension TS is not particularly limited, but it is preferable that TS be in a range of 1.5 mm to 10 mm. It is especially preferable that TS be in a range of 2.5 mm to 7 mm.

In the present embodiment, a distance H1 from a bottom portion 14A of the sipe 14 to a tread surface 18A of the wide area 18 is 12 mm. A distance H2 from the bottom portion 14A of the sipe 14 to a tread surface 16A of the narrow area 16 is 10 mm. The distance H1 is not limited in particular, but it is preferable that H1 be set so that $7 \text{ mm} \leq H1 \leq 15$ mm. When the distance H1 is less than 7 mm, undesirable effects result in that the depth of the sipe 14 is insufficient in the final stages of wear of the tire, and the difference in the rigidities of the narrow area 16 and the wide area 18 becomes small. The distance H1 exceeding 15 mm is undesirable as the rigidity of the entire block 12 is insufficient. In the present embodiment, the tread surface 16A of the narrow area 16 is planar and is parallel to the tread surfaces 18A of the wide areas 18.

By making H2 shorter than H1, as the tire contacts the ground when it rotates, due to the difference between the distance from the center of rotation of the tire to the tread surface of the narrow area and the distance from the center of rotation of the tire to the tread surface of the wide area, there are cases in which the narrow area slidingly contacts the road surface and cases in which the narrow area does not contact the road surface. In the former case, the narrow area wears more quickly than the wide areas due to the narrow areas slidingly contacting the road surface. As a result, even when the block becomes worn, there is no protruding of only the narrow area. In the latter case (no contact), if, for example, $H2 << H1$, the narrow area does not contact the road surface from the initial stages of wear of the block to the intermediate stages thereof. Therefore, the narrow area does not protrude compared with the wide areas. After the intermediate stages of wear of the block, H2 is relatively small. Therefore, the rigidity of the narrow area is not as small as that of the wide area. As a result, there is no protruding of only the narrow area. Accordingly, in either of these cases, by making H2 smaller than H1, sufficient running performance is maintained until the final stages of wear.

Figure 56:
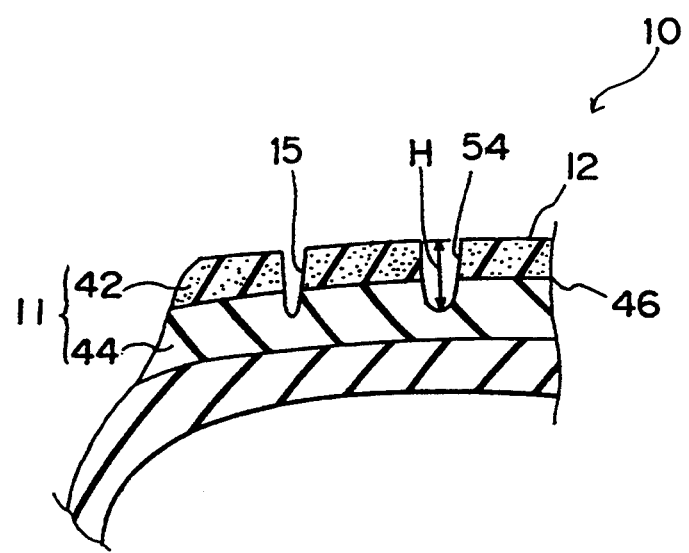
FIG. 56 illustrates a concrete example of a tread structure of a pneumatic tire of the present invention.

FIG. 56 illustrates a concrete example of a tread portion of a pneumatic tire of the present invention. FIG. 56 is a sectional view of a shoulder portion of the tread in the transverse direction of the tire. In order to simplify FIG. 56, the detailed structure of the blocks is not shown. A tread 11 is formed of two types of rubber such that there are two layers in the direction of thickness of the tread 11. A foamed rubber having independent bubbles is used for the cap side, i.e., an upper layer 42 (the layer on the road surface side), which contacts the road surface. An ordinary rubber, which has low exothermic character and which is not foamed, is used for the base side, i.e., a lower layer 44.

In the present embodiment, the ratio of the volume, which the foamed rubber of the upper layer 42 occupies, to the entire volume of the tread 11 is 26%. A boundary surface 46 of the upper layer 42 and the lower layer 44 is set at an approximate middle of a depth of a main groove 54 which is formed in the circumferential direction of the tire. In the present embodiment, the foaming ratio Vs of the foamed rubber of the upper layer 42 is 18%, the average bubble diameter is 25 μm, and the hardness is 64°. The hardness of the rubber of the lower layer 44 is 62°.

Figure 57:
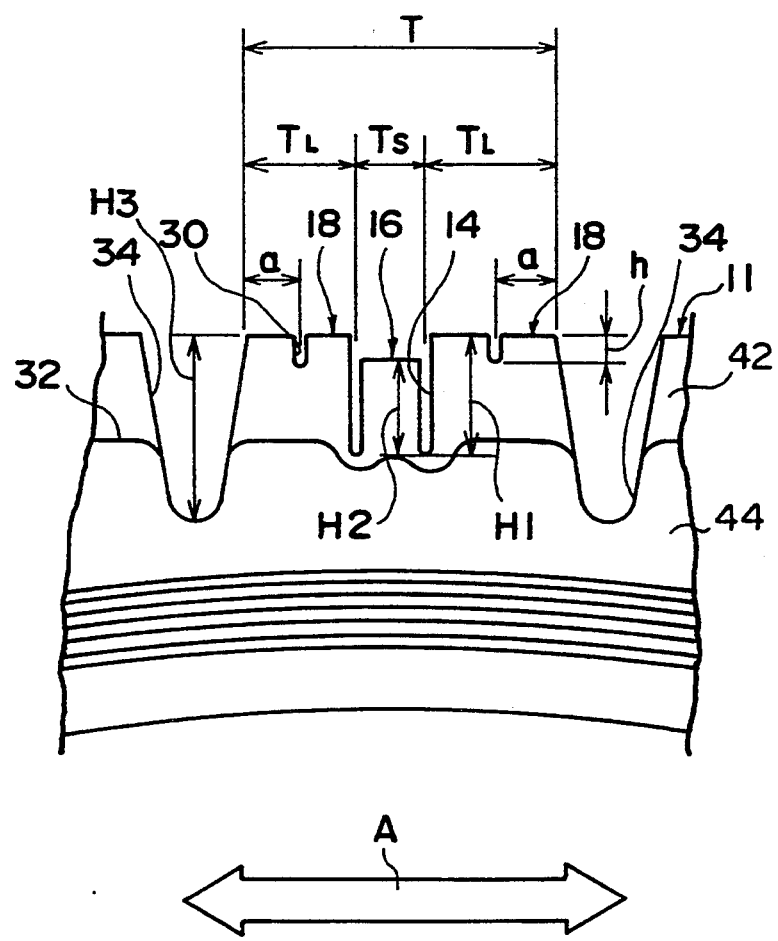
FIG. 57 is a sectional view illustrating a positional relationship of sipes within the block in FIG. 55 and a cap layer and a base layer.

FIG. 57 is a sectional view, in the circumferential direction of the tire, of the block 12 shown in FIG. 56. FIG. 57 illustrates the arrangement of the sipes within the block 12. As can be seen in the drawing, the sipes 14 are formed in the cap layer 42, and it is preferable that the bottoms of the sipes exist in a vicinity of the boundary between the cap layer 42 and the base layer 44. The tread structure is not limited to the structure illustrated in FIGS. 56 and 57, and a variety of materials and structures may be used.

In the pneumatic tire of the present invention, it is preferable to use foamed rubber as the tread material. In particular, it is preferable that the tread surface portion side of the tread be formed of a foamed rubber having a volume of at least 10% of the entire volume of the tread. It is preferable that the foamed rubber has a foaming ratio of 5% to 50%, independent bubbles of an average bubble diameter of 5 to 150 μm, and hardness in a range of 45° to 75°. By using the preferred foamed rubber, the on-ice performance can be improved and an excellent on-ice performance can be maintained over a long period of time due to the edge effect of the independent bubbles exhibited on the surface of the tread.

If the foamed rubber of the tread surface occupies less than 10% of the entire volume of the tread, the improved effect of the on-ice performance is small. Further, it is desirable that the hardness Hd of the foamed rubber is 45° to 70°. It is preferable that the hardness Hd is 50° to 70°, and it is even more preferable that the hardness Hd is 54° to 70°. When the hardness Hd of the foamed rubber is high, the bubbles do not collapse even under high ground contacting pressure, and on-ice performance improves. The hardness Hd is measured at room temperature according to JIS K6301. When the hardness Hd of the foamed rubber is less than 45°, the wear resistance deteriorates, and tread fatigue is generated. When the hardness Hd is greater than 70°, the tread becomes too hard, workability deteriorates, and there is much heat build-up.

It is desirable that the foaming ratio Vs of the foamed rubber is 5% to 50%, and it is preferable that Vs is 5% to 30%. The foaming ratio Vs of the foamed rubber is expressed as $Vs=(\rho_0/\rho_1-1)\times 100(\%)$, wherein $\rho_1$ is the density (g/cm$^3$) of the foamed rubber and $\rho_0$ is the density (g/cm$^3$) of the solid phase portion of the foamed rubber. If the foaming ratio Vs of the foamed rubber is less than 5%, the foamed rubber is not flexible at low temperatures. If Vs is greater than 50%, wear-resistance deteriorates, and wear-resistance on dry roads is insufficient in practice.

Further, it is desirable that the average bubble diameter of independent bubbles of the foamed rubber is 5 to 150 μm, and it is preferable that the average bubble diameter is 10 to 100 μm. If the average bubble diameter of the independent bubbles of the foamed rubber is less than 5 μm, the improved effect of the on-ice/on-snow performance is small. If the average diameter is greater than 150 μm, wear-resistance deteriorates greatly, so-called "fatigue-resistance" deteriorates, and deformation of the blocks and dulling of the sipes occur. On-snow performance also deteriorates. Further, cut-resistance deteriorates, which leads to breaking off of portions of the blocks. It is also difficult to obtain a stable configuration during manufacturing.

The foamed rubber is formed by adding a foaming agent to an ordinary rubber compound in which a certain part per weight of a certain carbon black is used and by adding heat and pressure in accordance with an ordinary method of manufacturing tires. Taking the manufacturability of the tire into account, it is preferable to use, for example, a system in which dinitrosopentamethylenetetraamine is used together with urea, or a benzenesulfonyl hydrazide derivative, in particular, oxy-bis-benzenesulfonyl hydrazide.

Further, natural rubber, polyisopropylene rubber, polybutadiene rubber, butyl rubber, and styrene/butadiene copolymerized rubber having low styrene content are examples of rubber components used in the tread. These components may be used separately, or a mixture of two or more of these polymers may be used. By using these polymers, the tread can have sufficient rubber elasticity at low temperatures.

EMBODIMENT 1-2

Another embodiment of a block used in the pneumatic tire related to the present invention will be explained in accordance with FIG. 2. Parts which are the same as those of embodiment 1—1 are denoted by the same reference numerals, and description thereof is omitted.

Figure 2:
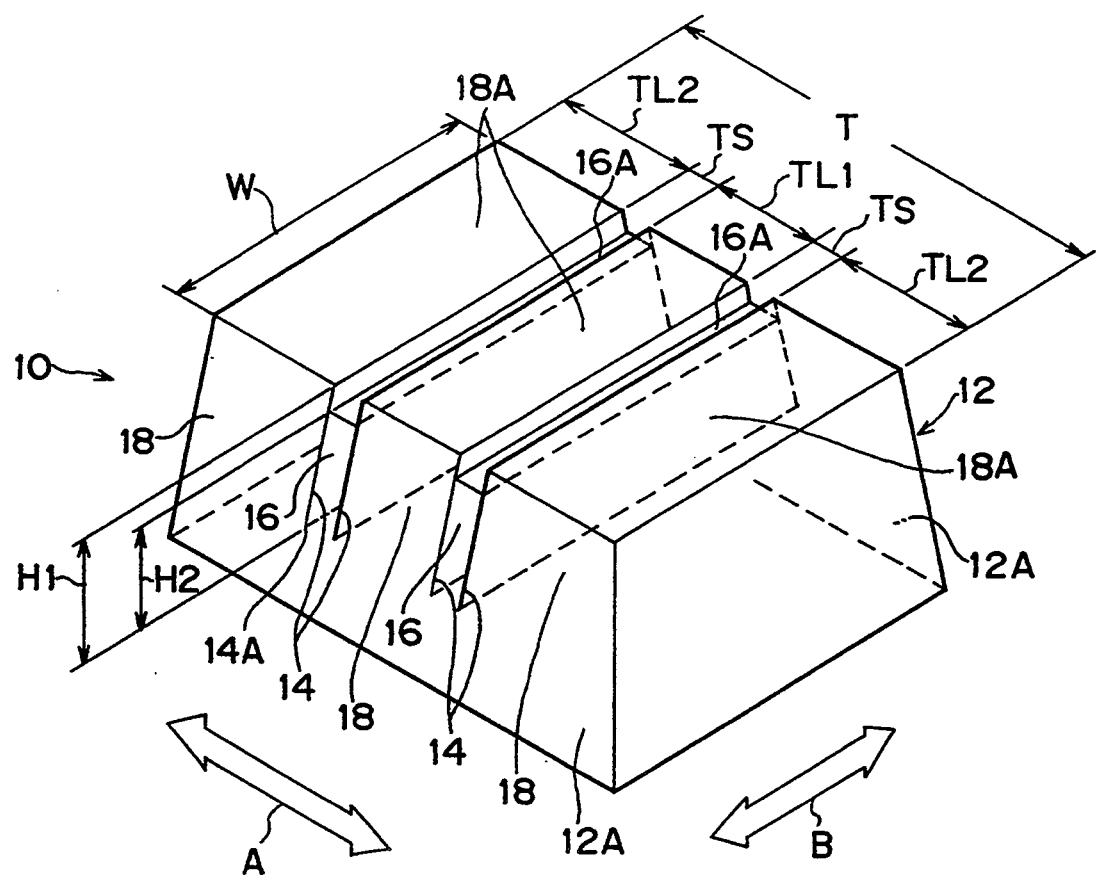
FIG. 2 is a perspective view illustrating a block, which has two sets of sipes, of a pneumatic tire of embodiment 1-2 of the present invention.

As shown in FIG. 2, in the present embodiment, two sets of sipes 14 are provided in the block 12 so as to be separated by a predetermined interval in the circumferential direction of the tire (the direction of arrow A in FIG. 2). Each set comprises a pair of sipes 14 which extend in straight lines in the transverse direction of the tire (the direction of arrow B in FIG. 2). In this example which is included within the scope of the present invention, the distance H1 from the bottom portion 14A of the sipe 14 to the tread surface 18A of the wide area 18 is 12 mm. The distance H2 from the bottom portion 14A of the sipe 14 to the tread surface 16A of the narrow area 16 is 10 mm. The ratio H2/H1 is 0.83. The dimension W of the block 12 in the transverse direction of the tire is 30 mm, and the dimension T of the block 12 in the circumferential direction of the tire is 40 mm. The dimension TL2 in the circumferential direction of the tire of the wide area 18 is 11 min. The wide areas 18 are located at both sides of the block 12 in the circumferential direction of the tire (the direction of arrow B in FIG. 2). A dimension TL1 in the circumferential direction of the tire of the wide area 18, which is located at a central portion in the circumferential direction of the tire of the block 12 and which is interposed between the two sets of sipes 14, is 10 mm. A dimension in the circumferential direction of the tire TS of the narrow area 16 is 3 mm. In this example, as in embodiment 1—1, even if the block 12 of the pneumatic tire 10 is worn, the narrow area 16 is controlled so as to protrude more than the wide areas 18 toward the radially outward side of the tire so that the maximum edge effect can be maintained until the final stages of wear.

EMBODIMENT 1-3

Next, embodiment 1-3 of the pneumatic tire related to the present invention will be described in accordance with FIG. 3. Parts which are the same as those of embodiment 1—1 are denoted by the same reference numerals, and description thereof is omitted.

Figure 3:
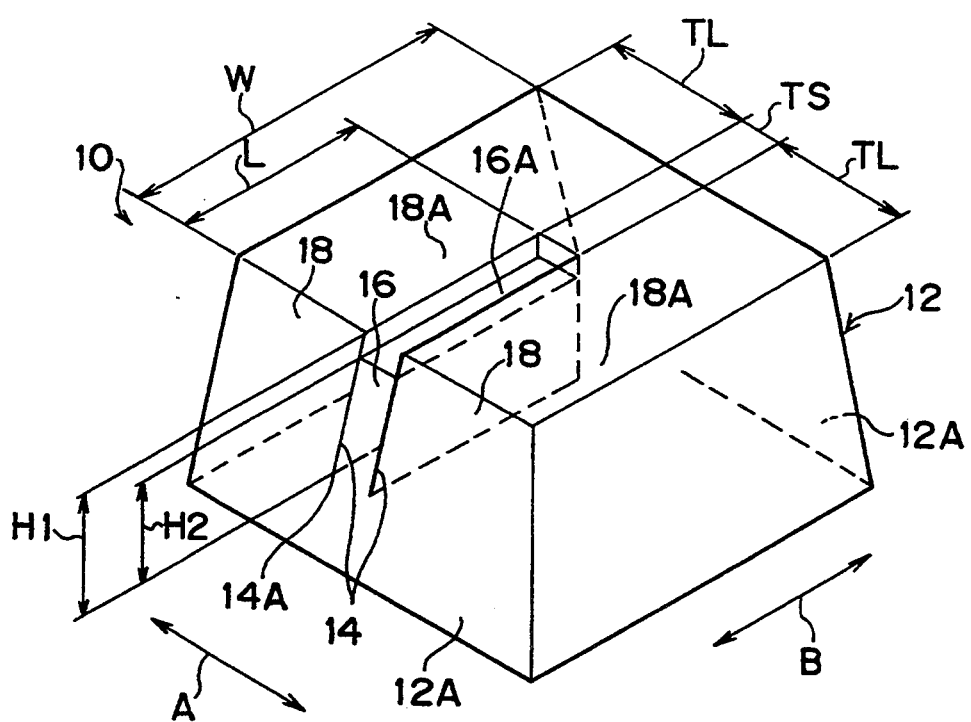
FIG. 3 is a perspective view illustrating a block of a pneumatic tire of embodiment 1-3 of the present invention.

As shown in FIG. 3, the present embodiment differs from embodiment 1—1 in that one of the ends of each sipe 14 extends to one of the side walls 12A of the block 12, but the other end of each sipe 14 does not extend to the other side wall 12A. In this example, the dimension W of the block 12 in the transverse direction of the tire is 30 mm, and the entire length L of the sipe 14 is 20 mm. In the present invention, it is not necessary for the pair of sipes 14 to extend from one of the side walls 12A to the other side wall 12A, but it is preferable that the entire length L of each of the pair of sipes 14 is greater than or equal to 50% of the dimension W of the block 12 in the transverse direction of the tire. If the entire length L of the sipe 14 is less than 50% of the dimension W of the block 12 in the transverse direction of the tire, the edge effect cannot be achieved by the sipe 14. All of the other dimensions of the block 12 are the same as those in embodiment 1—1. In the present embodiment as well, even if the block 12 of the pneumatic tire 10 becomes worn as in embodiment 1—1, the narrow area 16 is controlled so as to protrude more than the wide areas 18 toward the radially outward side of the tire so that the maximum edge effect can be maintained until the final stages of wear.

Next, an embodiment 1-4 of the present invention will be described in accordance with FIGS. 59 and 60. Parts which are the same as those of the embodiment 1—1 are denoted by the same reference numerals, and description thereof is omitted.

Figure 59:
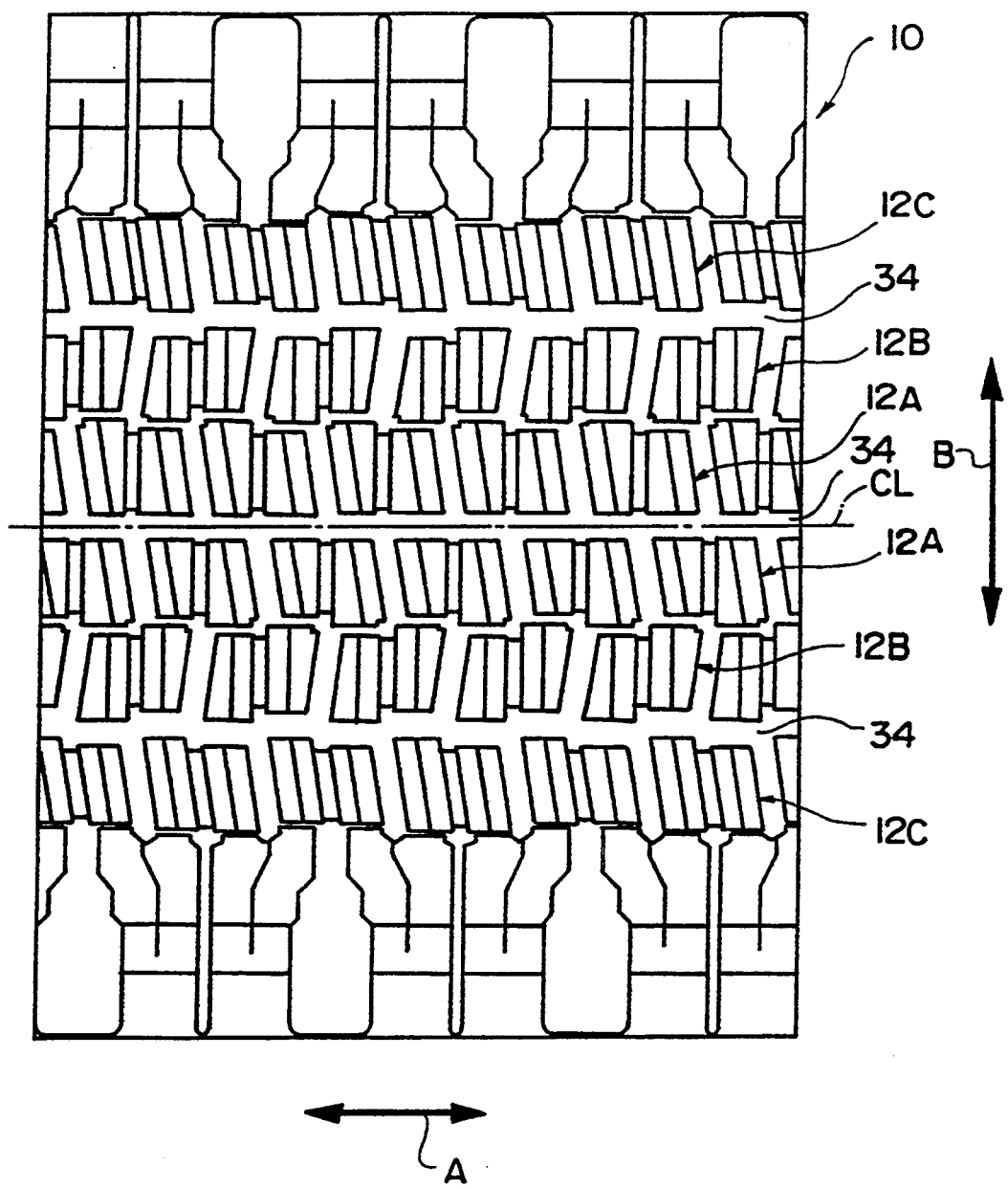
FIG. 59 illustrates a tread pattern in accordance with embodiment 1-4 of the present invention.

As shown in FIG. 59, the pneumatic tire 10 has blocks of three different configurations. The blocks are, from the equatorial plane CL side of the tire to the shoulder side, blocks 12A, blocks 12B, and blocks 12C.

Figure 60A:
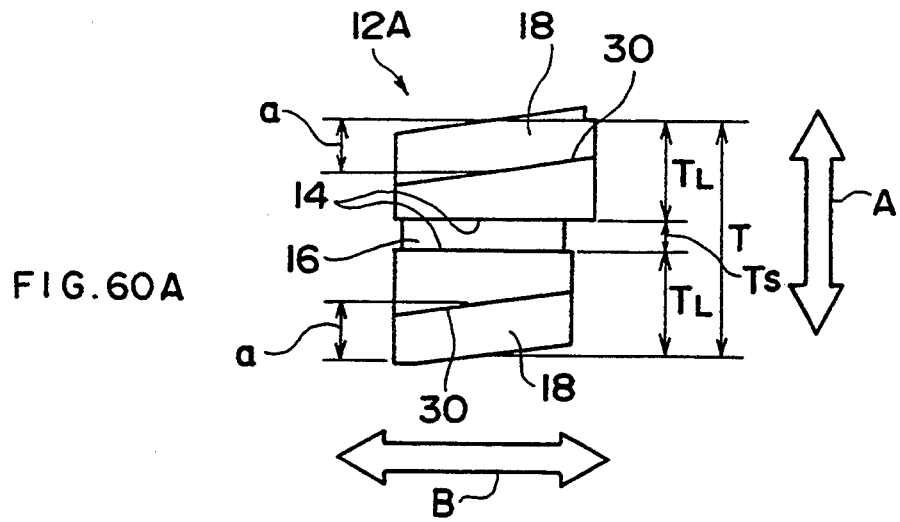
FIG. 60A is a plan view of a block illustrated in FIG. 59.

As can be seen from FIG. 60A, in the block 12A, the wide areas 18, which are the end portions of the block 12A in the circumferential direction of the tire, incline upward and to the right with respect to the transverse direction of the tire (the direction of arrow B in FIG. 60A). The longitudinal direction of the sipe 14 is the transverse direction of the tire (the direction of arrow B).

Figure 60B:
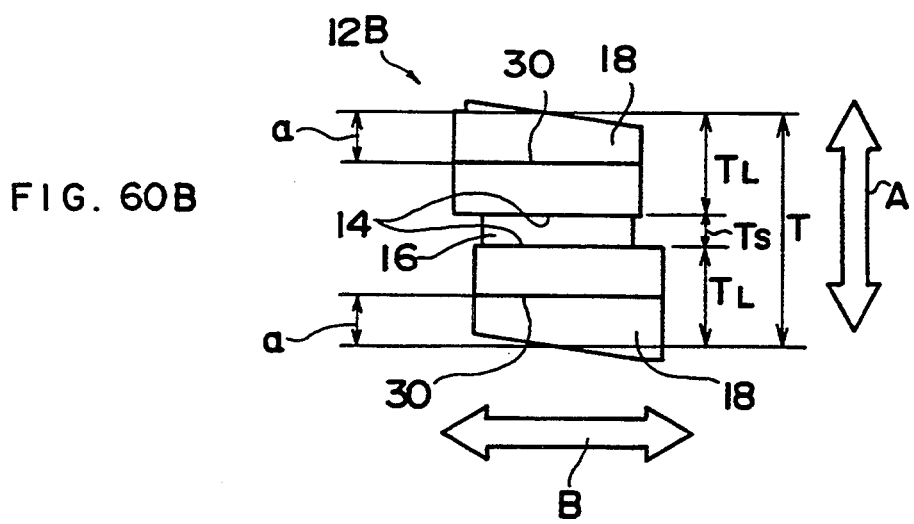
FIG. 60B is a plan view of another block illustrated in FIG. 59.

As illustrated in FIG. 60B, in the block 12B, the wide areas 18, which are the end portions of the block 12B in the circumferential direction of the tire, incline upward and to the left with respect to the transverse direction of the tire (the direction of arrow B). The longitudinal direction of the sipe 14 is the axial direction of the tire.

Figure 60C:
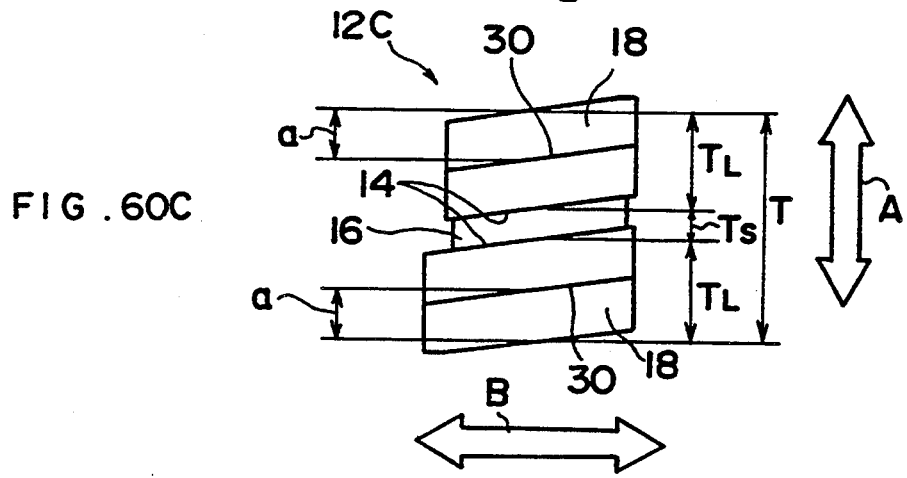
FIG. 60C is a plan view of another block illustrated in FIG. 59.

As shown in FIG. 60C, in the block 12C, the wide areas 18, which are the end portions of the block 12C in the circumferential direction of the tire, incline upward and to the right with respect to the axial direction of the tire. The longitudinal direction of the sipe 14 is inclined upward and to the right with respect to the axial direction of the tire.

An auxiliary sipe 30 (FIG. 57) is formed in each of the wide areas 18 of the block 12A so as to be parallel to the end portions of the block 12A in the circumferential direction of the tire. The auxiliary sipe 30 is formed in each of the wide areas 18 in the block 12B so as to be parallel to the sipes 14. The auxiliary sipe 30 is formed in each of the wide areas 18 of the block 12C so as to be parallel to the end portions of the block 12C in the circumferential direction of the tire.

In pneumatic tires having a variety of block structures such as those described above, it is preferable to provide auxiliary sipes 30 respectively in the wide areas in addition to the one set of two sipes (main sipes) which divide the block into the narrow area and the wide areas as illustrated in FIG. 57. It is preferable that the auxiliary sipes extend parallel to the main sipes as illustrated in FIG. 59.

When the tire is new, the tread surface is smooth. If the tire is not driven to a certain extent, roughness of the surface does not appear. In particular, in the initial stages of wear of the tire wherein the relation of H1 and H2 is H1<H2 according to the first aspect of the present invention, the narrow area is shorter than the wide areas. There are cases in which the coefficient of friction on ice is reduced because the ground contacting surface area of the block or the ground contacting pressure is reduced. Further, in regard to the sectional configuration of the tread, the shoulder portion is tapered and the angle of the groove is such that the width of the groove becomes wider toward the opening portion. Therefore, the ground contacting surface area when the tire is new is less than that when the tire is worn. When foamed rubber is used in the tread surface portion of the new tire, the tread surface portion which is forced into contact with the mold during vulcanization barely bubbles. Therefore, the roughness of the tire surface is markedly insufficient. The inventor of the present invention discovered that, in this type of case, the on-ice performance of the tire can be improved by providing auxiliary sipes which extend substantially parallel to the main sipes.

It is preferable that the auxiliary sipe is provided between the main sipe and the edge of the block and that the depth of the auxiliary sipe h2 is 10% to 45% of the depth h1 of the main sipe. By providing the auxiliary sipe, whose depth h2 is 10% to 45% of the depth h1 of the main sipe, substantially parallel to the main sipe, the braking performance, drivability, horizontal-sliding resistance, and cornering on ice-covered and wet roads can be compensated for by the edge effects of the auxiliary sipes until the point when the braking performance, drivability, horizontal-sliding resistance and cornering on ice-covered and wet roads are exhibited 100%. Further, because the depth h2 of the auxiliary sipe is 10% to 45% of the depth h1 of the main sipe, the rigidity of the block is not reduced. Consequently, cracks do not form, and portions of the block do not break off. The on-ice performance and wet performance do not deteriorate due to low rigidity of the block. It is especially preferable that the depth h2 of the auxiliary sipe is 25% to 40% of the depth h1 of the main sipe.

If the depth h2 of the auxiliary sipe is less than 10% of the depth h1 of the main sipe, before the edge effect is sufficiently exhibited by the auxiliary sipe, the auxiliary sipe disappears and the on-ice performance and the wet performance cannot be maintained. On the other hand, if the depth h2 of the auxiliary sipe is greater than 45% of the depth h1 of the main sipe, the rigidity of the block decreases markedly. The initially set on-ice performance, wet performance, and controllability deteriorate. Further, there is the fear that cracks may form in the rubber or portions may break off.

Average distance a is either the average of the distance between the auxiliary sipes, or the distance between the auxiliary sipe and the block edge, or the distance between the auxiliary sipe and the main sipe. It is preferable that the relation between the average distance a and the depth h2 of the auxiliary sipe is such that $0.5 \leq a/h2 \leq 4$. It is even more preferable that a/h2 is in a range of 1.35 to 2.5. If a/h2 is less than 0.5, the rigidity of the block is reduced excessively, and cracks may form in or portions may break off from the rubber. If a/h2 is greater than 4, little effect is achieved by providing the auxiliary sipes.

Given that the depth of the auxiliary sipe is h, and the average distance between the auxiliary sipe and the block edge or between the auxiliary sipe and the main sipe is a, in the pneumatic tire in which the relation H2 and H1 is $H2 \leq H1$ of the present invention, it is preferable that the conditions $0.8 = (H1-H2) < h < 2 \times (H1-H2)$ and $0.3 < h/a < 1.5$ are satisfied. By using these conditions, the rigidity of the block can be optimally maintained. If h is less than or equal to $0.8 \times (H1-H2)$ or if h/a is less than 0.3, the effect provided by the auxiliary sipe will deteriorate. If h is greater than or equal to $2 \times (H1-H2)$ or if h/a exceeds 1.5, the rigidity of the block decreases excessively, and there is the undesirable possibility that cracks may form in the rubber or lead to portions of the block breaking off.

If the auxiliary sipes are used in the tire of the present invention, it is preferable that the total length I of the auxiliary sipes projected on the main sipe is greater than or equal to 50% of the length L of one main sipe. It is even more preferable that the auxiliary sipes are provided respectively between the block edges and the main sipes and that the total length I of both of the auxiliary sipes projected on the main sipes is greater than or equal to 100% of the length L of one main sipe. If the total length I of the auxiliary sipes is less than 50% of the length L, the edge effect of the auxiliary sipes is insufficient.

Further, the configuration of the main sipes and the auxiliary sipes is not limited to straight lines. Zigzag configurations, undulated configurations and the like may be employed.

Figure 10:
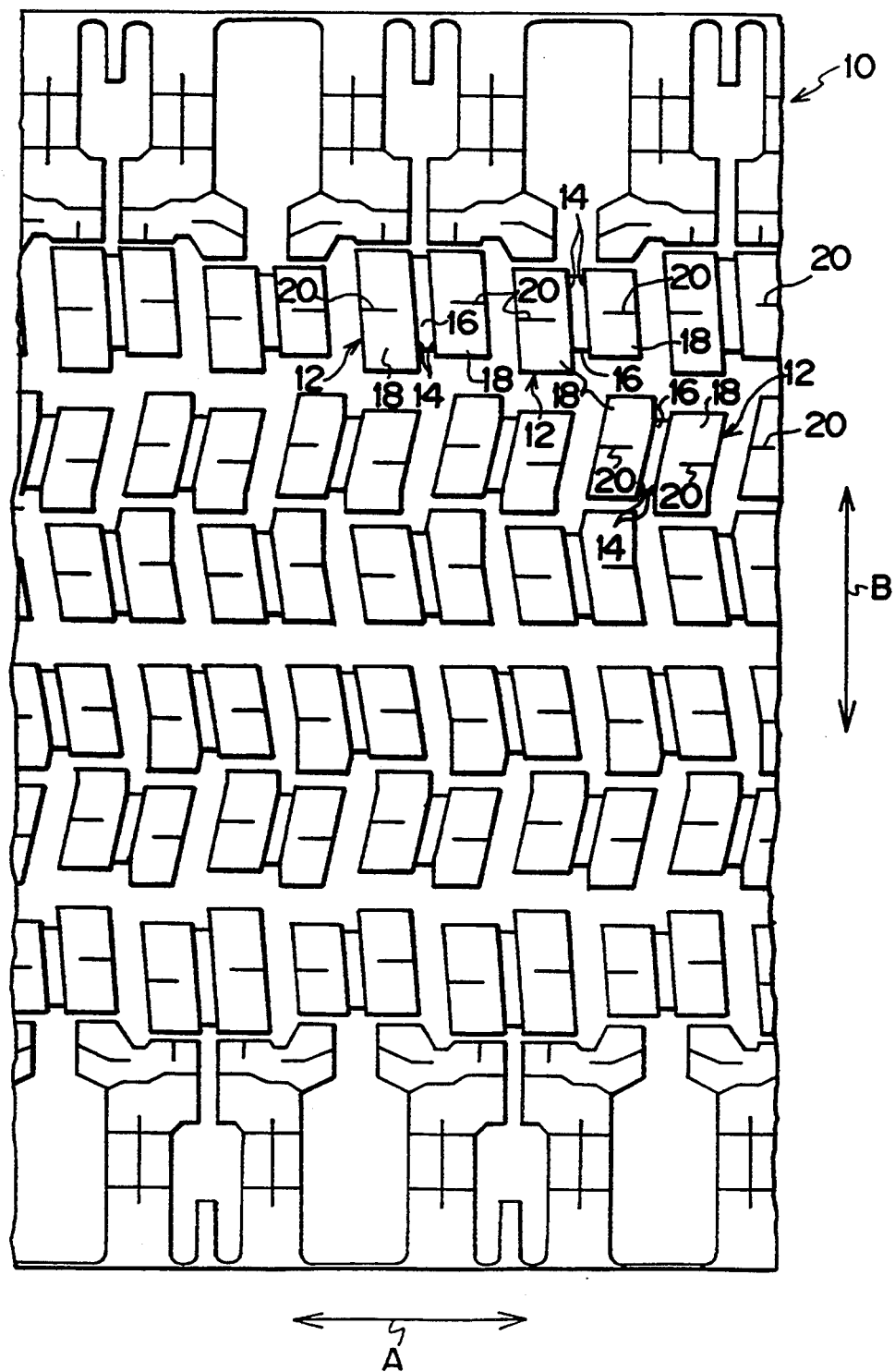
FIG. 10 illustrates another concrete example of a block pattern of a pneumatic tire of the present invention.

Further, as shown in FIG. 10, circumferential direction sipes 20, which extend substantially in the circumferential direction of the tire, can be provided in the wide areas. Horizontal slipping on ice-covered or snow-covered roads can effectively be prevented by the circumferential direction sipes. Given that the average depth of the circumferential direction sipes is h, and the length, in the transverse direction of the tire, of the block portion which is defined by the circumferential direction sipe and circumferential direction main groove is I, it is preferable that $0.8 \leq I/h \leq 3.0$.

The block portion defined by the circumferential direction sipe and the circumferential direction main groove is the portion interposed, in the axial direction of the tire, between the circumferential direction sipe and the circumferential direction main groove. The length I, in the axial direction of the tire, of this portion is expressed as an average value of the distances, in the axial direction, from the circumferential direction sipes to the circumferential direction main grooves.

If I/h is less than 0.8, the horizontal rigidity of the block divided by the sipes is reduced, and there is excessive bending of the narrow area so that the edge effect cannot be exhibited. Further, if I/h is greater than 3.0, the horizontal rigidity becomes too large and the excessive bending of the narrow area is reduced so that the edge effect is lost as the edges do not bite into the water membrane. In either of these cases, horizontal sliding cannot be prevented. It is even more preferable that $1.0 \leq I/h \leq 2.2$.

It is preferable that the average depth h of the circumferential direction sipes is 15% to 75% of the depth H of the circumferential direction main groove, and it is even more preferable that the average depth h is 20% to 60% of the depth H. If the average depth h of the circumferential direction sipes is 15% to 75% of the depth H of the circumferential direction main groove, the rigidity of the block can be maintained, and horizontal sliding can be prevented. If the average depth h of the circumferential direction sipes is less than 15% of the depth H of the circumferential direction main groove, the circumferential direction sipes will not be able to sufficiently prevent horizontal sliding. Further, if the average depth h of the circumferential direction sipes is greater than 75% of the depth H of the circumferential direction main groove, the rigidity of the block decreases, and controllability deteriorates. Further, the movement of the sipes becomes large, and cracks may form in the bottoms of the sipes or portions of the block may break off.

The circumferential direction sipes may be provided in all of the blocks on the tread, or may be provided in the blocks of only one section of the tread, e.g., the shoulder portion.

The dimension T in the circumferential direction of the tire of the respective blocks 12A, 12B, 12C (FIG. 59) of the present embodiment is on average 30.5 mm. The dimension W in the transverse direction of the tire of the respective blocks 12A, 12B, 12C is on average 30 mm. Further, the dimension TL in the circumferential direction of the tire of the wide area 18 of the respective blocks 12A, 12B, 12C is on average 13 mm, whereas the dimension TS in the circumferential direction of the tire of the narrow area 16 is on average 3.5 mm. Further, in the respective blocks 12A, 12B, 12C, the dimension HI is 11 mm, the dimension H2 is 8 mm, a depth h of the auxiliary sipe 30 is 3 mm, and an average distance a between the auxiliary sipe 30 and the edge of the block is 6.25 mm.

In the pneumatic tire of embodiment 1–4, the distance from the tread surface of the narrow area to the center of rotation of the tire is different than the distance from the tread surface of the wide area to the center of rotation of the tire. Further, the block generally has a trapezoidal configuration and is tapered at the shoulder portions. Therefore, when the tire is new, the ground contacting surface area and the ground contacting pressure are small compared with those from the intermediate stages to the final stages of wear of the tire. However, the edge effects of the auxiliary sipes 30 provided in the blocks 12A, 12B, 12C can compensate for the insufficient ground contacting surface area from the time when the tire is new to the first stages of wear. The edge effects of the sipes 14 can be obtained, and also good braking performance and good driving performance can be obtained on ice-covered or wet road surfaces.

As the tread 11 wears due to use, the auxiliary sipes 30 gradually disappear. However, at the time when the auxiliary sipes 30 are disappearing, the ground contacting surface area of the tread 11 is gradually increasing. Therefore, good braking performance and good driving performance on ice-covered or wet road surfaces can be obtained until the final stages of wear due to the effect of the increase of the ground contacting surface area and due to the edge effect of the sipe 14.

In this way, in the pneumatic tire 10 of the present embodiment, the edge effect of the auxiliary sipes 30 compensates for the insufficient ground contacting surface area and insufficient ground contacting pressure from the time when the tire is new to the initial stages of wear. Constant, good driving performance and braking performance can thereby be obtained from the time when the tire is new to the final stages of wear of the tire.

Figure 4:
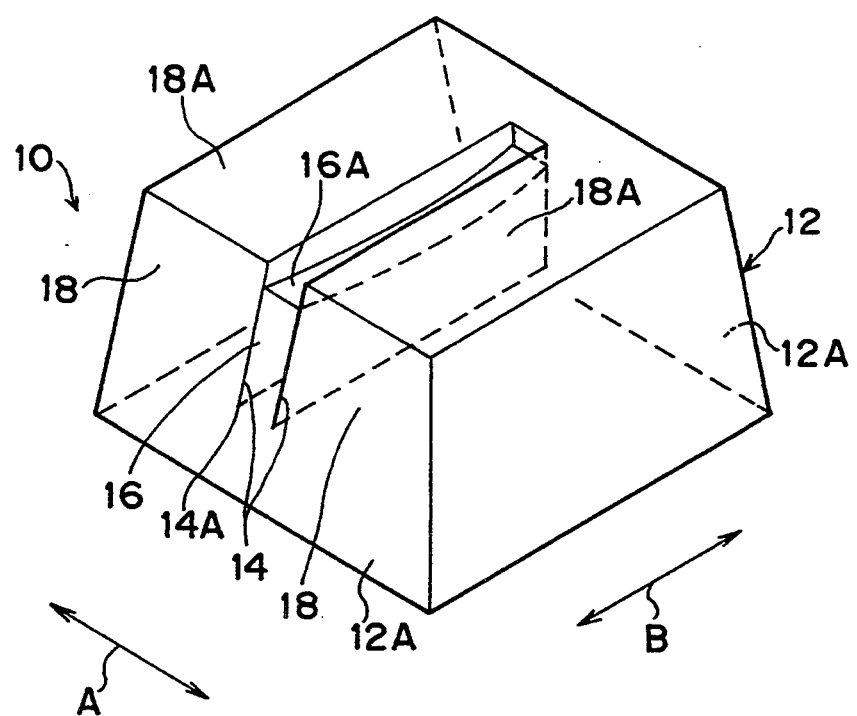
FIG. 4 is a perspective view illustrating a block of a pneumatic tire of embodiment 1-4 of the present invention.
Figure 5:
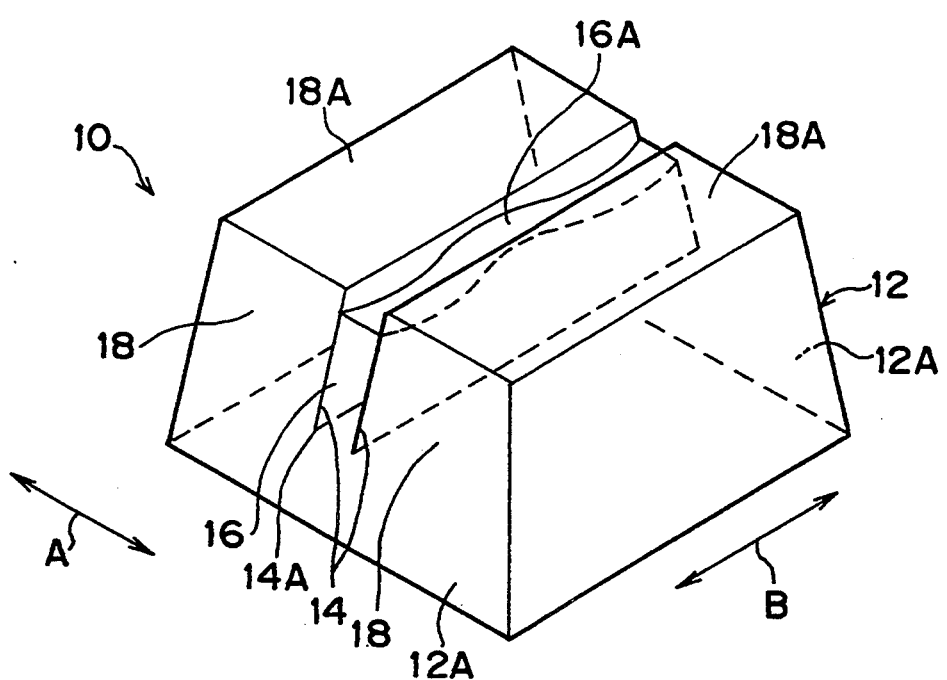
FIG. 5 is a perspective view illustrating a block of a pneumatic tire of embodiment 1-5 of the present invention.

In the above-described embodiments, the tread surface 16A of the narrow area 16 and the tread surfaces 18A of the wide areas 18 are parallel. However, the present invention is not limited to the same. The tread surface 16A of the narrow area 16 may be formed, as is illustrated in FIG. 4. such that the tread surface 16A is sunk in an arc-shaped configuration toward the center of rotation of the tire. Alternatively, the tread surface 16A may be wave-shaped as shown in FIG. 5.

Figure 6:
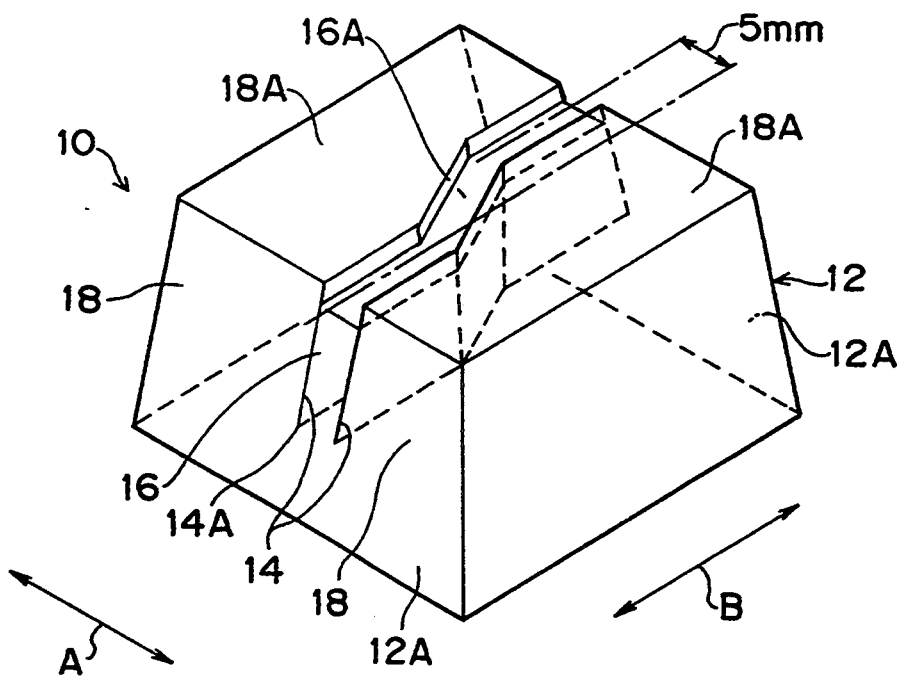
FIG. 6 illustrates a variation of a block of a pneumatic tire of the present invention, wherein sipes are bent at a middle of the block.

Further, in embodiments 1—1 through 1-3, the longitudinal directions of the sipes 14 are straight lines. However, the present invention is not limited to the same. As shown in FIG. 6, longitudinally intermediate portions of the sipes 14 may be bent so that the longitudinal directions of the sipes 14 on one side of the center are offset, in the circumferential direction of the block, from the longitudinal directions of the sipes 14 on the other side of the center. (In the embodiment illustrated in FIG. 6, the sipes 14 are offset by 5 mm in the circumferential direction of the block). Further, the sipes 14 may be provided so as to form wave shapes or curves when the tread is viewed from above. (These configurations are not shown in the drawings).

In the above-described embodiments, the pair of sipes 14 is parallel, but the present invention is not limited to the same. It suffices if the sipes 14 are not parallel.

In embodiments 1—1 through 1-3, the pair of sipes 14 is arranged so as to extend in the transverse direction of the tire. However, the present invention is not limited to the same. It suffices that the longitudinal directions of the pair of sipes 14 are set within a range of 0° to 45° with respect to the transverse direction of the tire.

Figure 7:
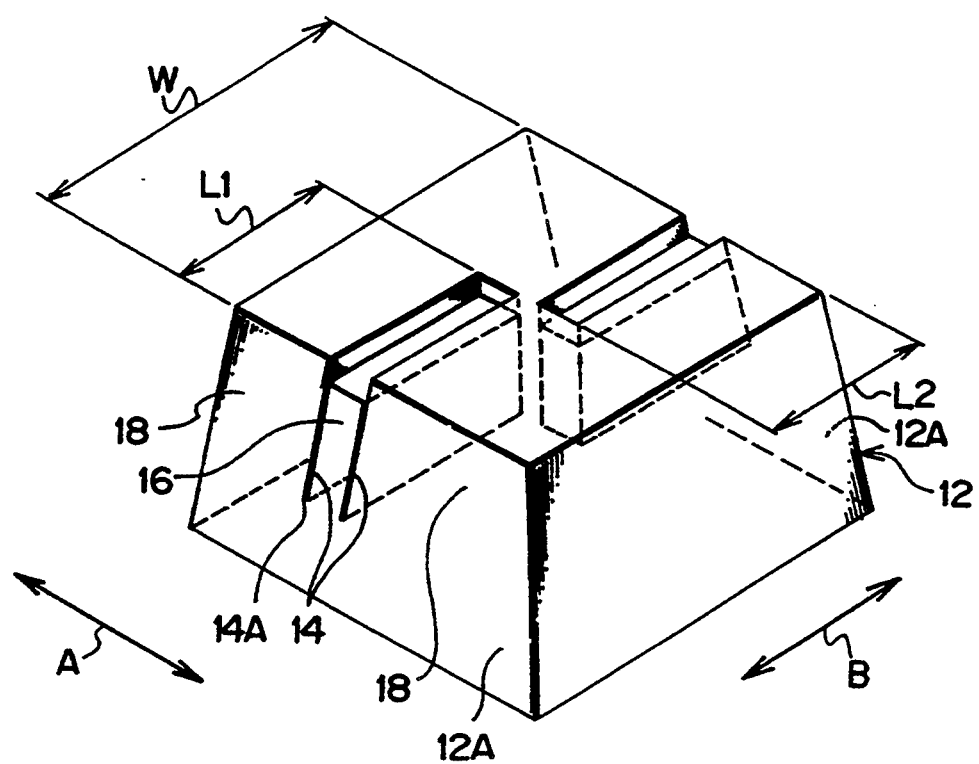
FIG. 7 illustrates a variation of a block of a pneumatic tire of the present invention, wherein the block has two sets of sipes.

In embodiment 1-3 (see FIG. 3), one set of a pair of the sipes 14 is provided per block 12. However, the present invention is not limited to the same. Two sets may be provided per block 12 (see FIG. 7), or two or more sets may be provided per block 12. In this case, it is preferable that the entire length L of the pair of sipes 14 (L1+L2) is greater than or equal to 50% of the dimension W of the block 12 in the transverse direction of the tire (the direction of arrow B in FIG. 7).

Figure 8:
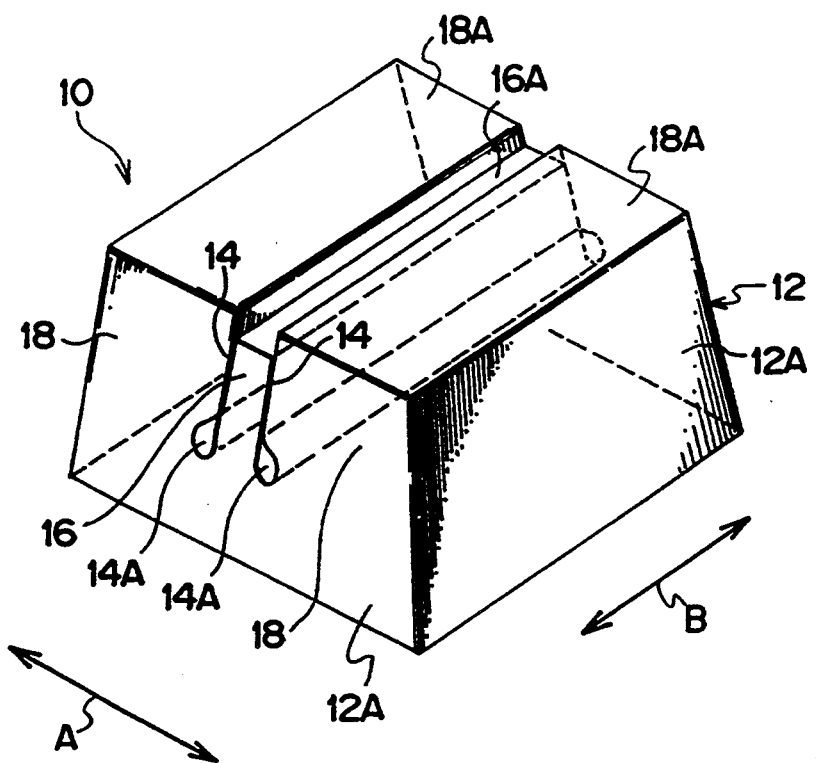
FIG. 8 illustrates a variation of a block of the pneumatic tire of the first embodiment of the present invention, wherein expanded portions are formed respectively at bottoms of sipes.

Moreover, as illustrated in FIG. 8, the bottom portions 14A of the sipes 14 may be formed so as to have substantially circular cross sections which swell in directions moving away from each other. Due to this structure, stress does not concentrate on the bottom portion 14A when the sipe 14 opens. Consequently, the formation of cracks in the bottom portions 14A is prevented.

Figure 9:
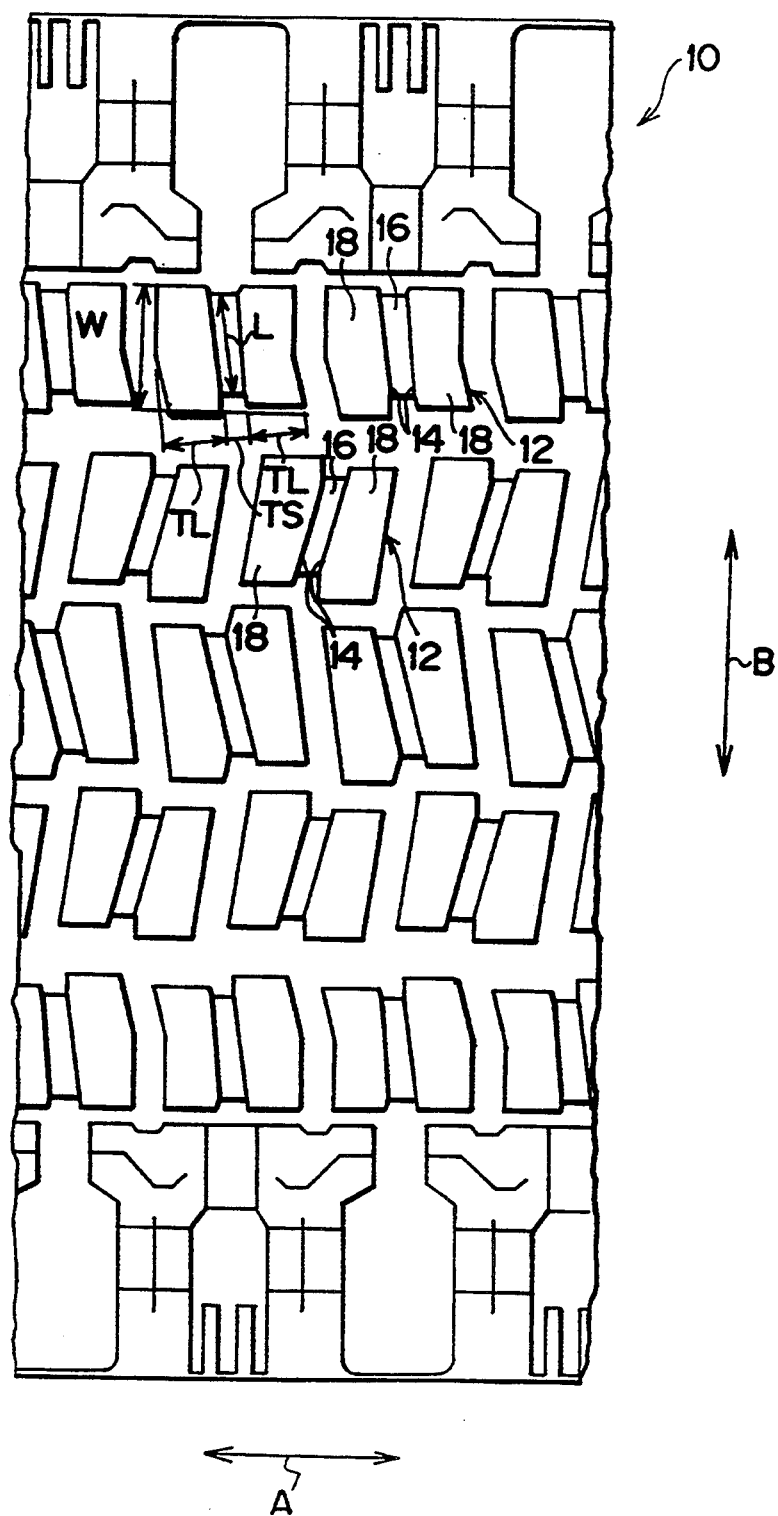
FIG. 9 illustrates a concrete example of a block pattern of a pneumatic tire of the present invention.

In embodiment 1—1 of the present invention, if H2<H1, it is not necessary that the block be shaped as a square column. As shown in FIG. 9, the block 12 may be formed such that the longitudinal dimension L of the narrow area 16 is smaller than the average dimension W in the longitudinal direction of the wide areas 18. For example, when the longitudinal dimension of the narrow area 16 is 50% to 95% of the longitudinal dimension of the wide area 18, cracks, which are easily formed in the transverse direction end portions (main groove openings in the circumferential direction) of the bottom of the sipes by side force input, can be prevented because in this structure, the wide areas 18 bear the input and the burden placed on the narrow area 16 is decreased.

In embodiment 1—1 of the present invention, if H2<H1, as shown in FIG. 10, circumferential sipes 20, which extend in the circumferential direction of the tire (the direction of arrow A in FIG. 10), may be formed at both sides in the circumferential direction of the tire of the block 12, in addition to the pair of sipes 14, It is preferable that the circumferential sipes 20 be provided in at least one of the sides of the block 12 in the circumferential direction of the tire and that the circumferential sipes 20 be inclined from 0° to 45° with respect to the circumferential direction. Due to this structure, performance of the tire with respect to horizontal sliding improves.

Figure 11A:
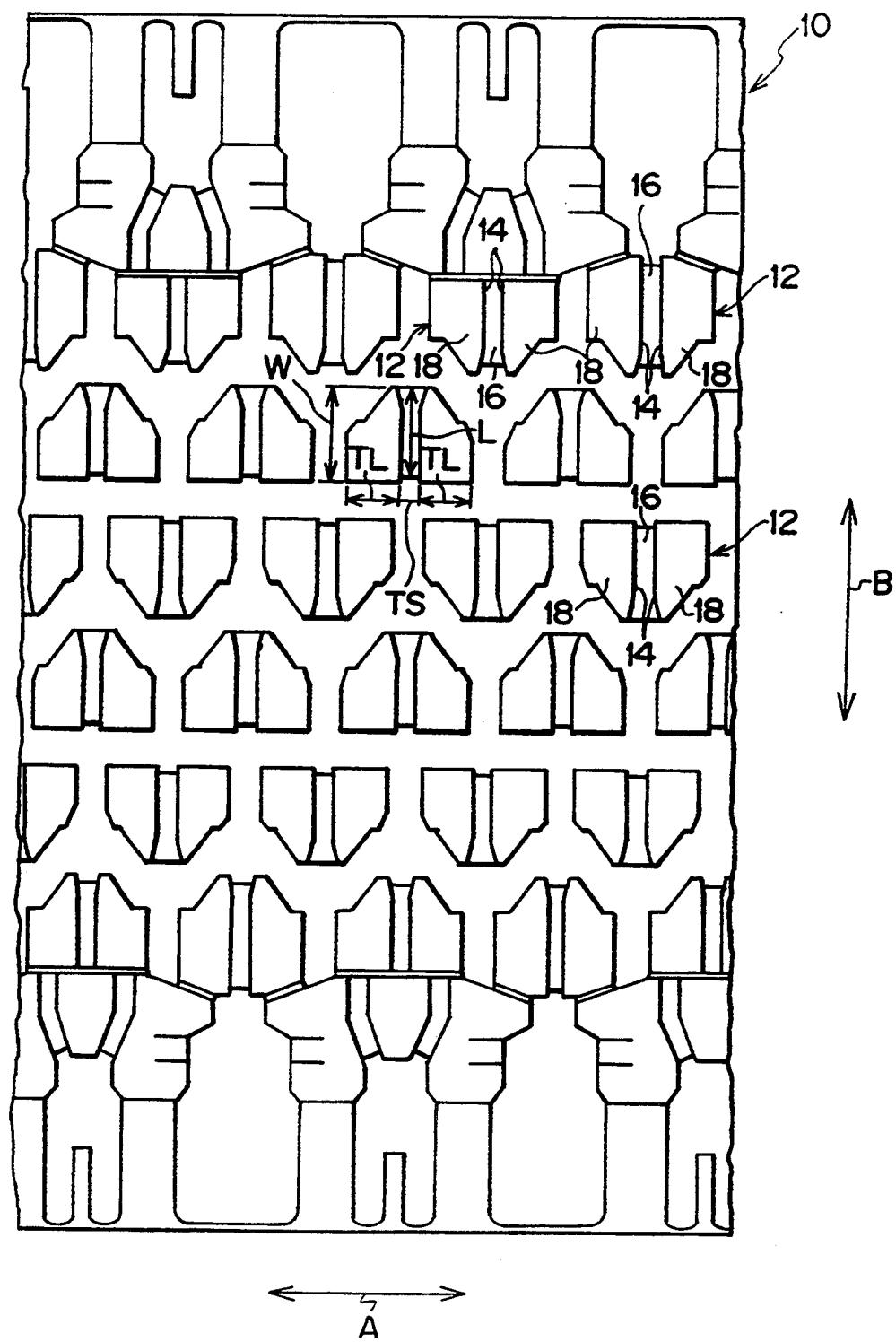
FIG. 11A illustrates another concrete example of a block pattern of a pneumatic tire of the present invention.
Figure 11B:
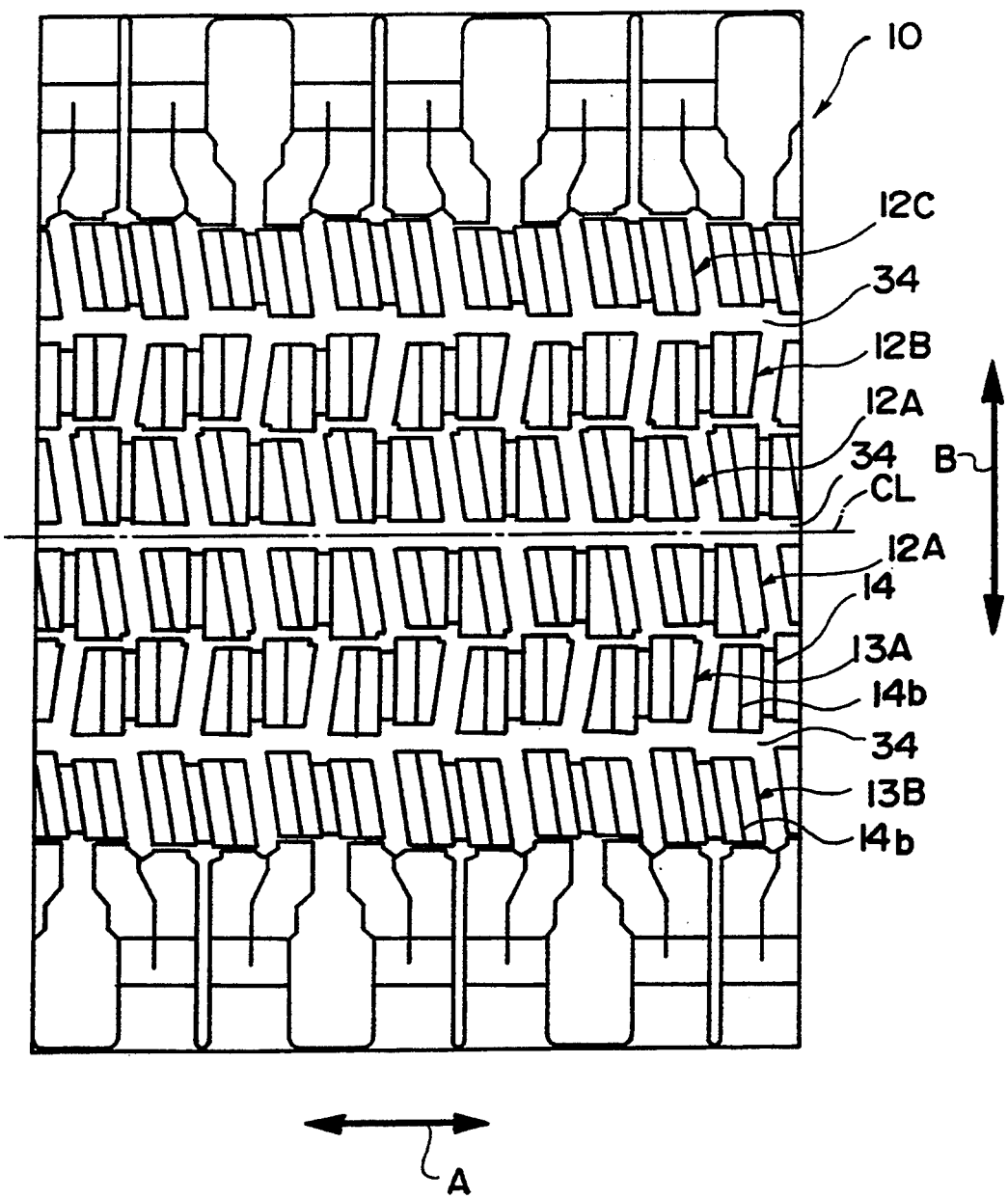
FIG. 11B illustrates another concrete example of a block pattern of a pneumatic tire of the present invention, wherein the blocks have auxiliary sipes.

In the above embodiment, the block 12 has a substantially rectangular configuration, but the present invention is not limited to the same. If the relation H2<H1 of embodiment 1—1 of the present invention is satisfied, the block 12 may be formed as shown in FIG. 11 so as to have a trapezoidal shape as seen from above the tread. In the present invention, the configuration of the block 12 is not particularly limited to these shapes.

EXPERIMENTAL EXAMPLE

Figure 44:
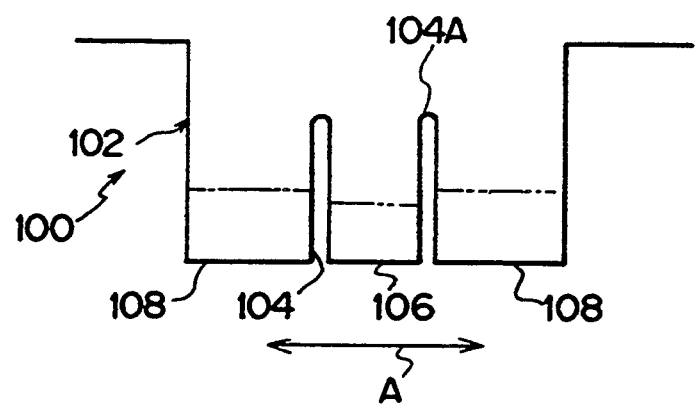
FIG. 44 is a sectional view, in a circumferential direction of a tire, of a tire having a conventional block.
Figure 45:
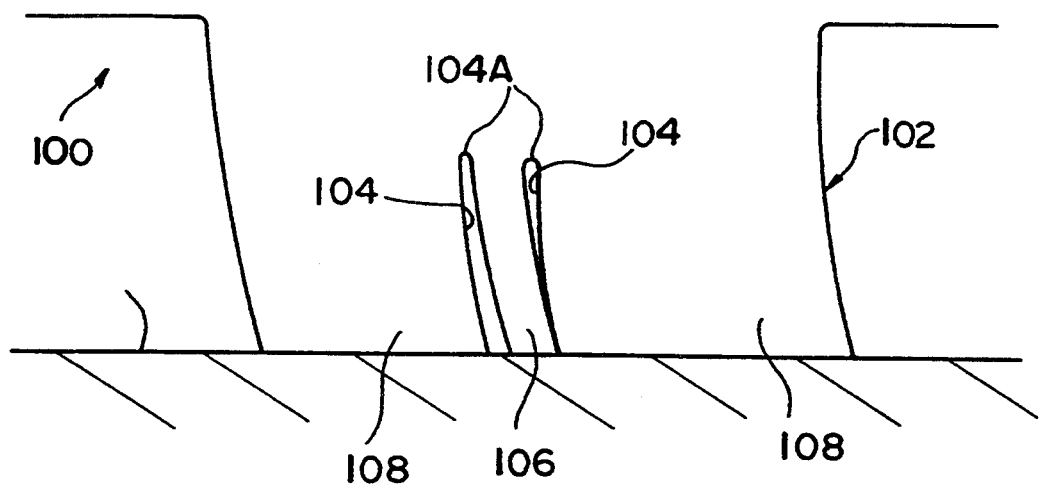
FIG. 45 illustrates a state in which a narrow area and wide areas of the tire block illustrated in FIG. 44 are deformed when the tire block is subject to frictional force in a direction tangential to the outer circumference of the tire.
Figure 45:
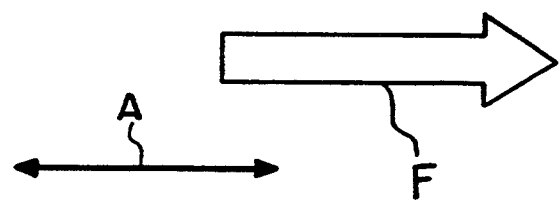
Figure 46:
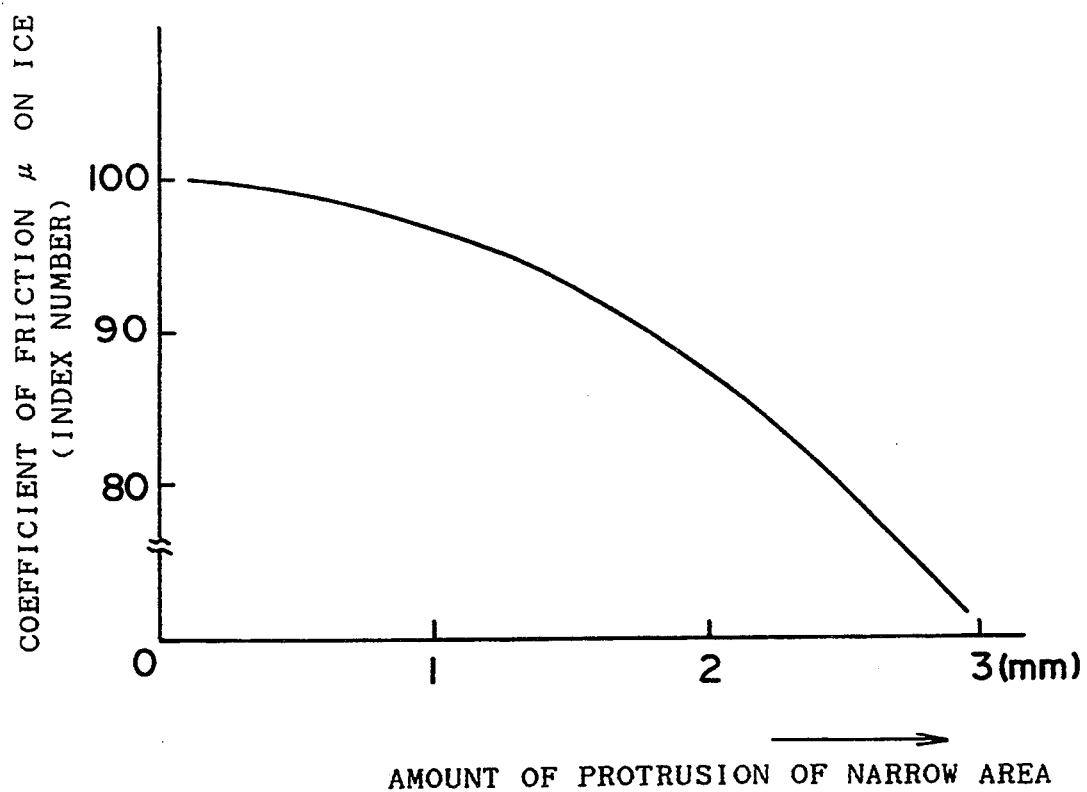
FIG. 46 is a graph illustrating the relation between a coefficient of friction on ice and an amount of protrusion of the narrow area.

Table 1 shown below gives the results of an experiment that was performed using conventional pneumatic tires (the pneumatic tire illustrated in FIG. 44) and the pneumatic radial tires of the present invention. Seven types of tires were filled to standard internal pressure and were placed, respectively, on all of the wheels of trucks (two doors, four wheels) having constant loads. The stopping distances on ice of the trucks when the tires were new and the stopping distances on ice when the trucks were driven so that the blocks were worn to 50% of the depths of the sipes were measured with respect to all of the types of tires. The results of this experiment are given in Table 1. In the table, the measured value of the stopping distance of the conventional pneumatic radial tire is 100. Smaller numbers indicate shorter stopping distances. The wear ratio is 100% when the wide areas are worn to the bottoms of the sipes. In Table 1, Embodiment (A) of the Present Invention is the pneumatic tire of embodiment 1—1, and Embodiment (B) of the Present Invention is the pneumatic tire of embodiment 1—1 wherein the dimension H2 of the block is 11.5 mm. Embodiment (C) of the Present Invention is the pneumatic tire of embodiment 1-2, and Embodiment (D) of the Present Invention is the pneumatic tire of embodiment 1-3. The conventional example is the pneumatic tire of embodiment 1-1 wherein the dimension H2 of the block is 12 mm, i.e., there is no difference between the tread surfaces of the block when the tire is new. The comparative example is the pneumatic tire of embodiment 1—1 wherein the dimension of the block H2 is 7.5 mm. Embodiment (E) of the Present Invention is the pneumatic tire of embodiment 1-4.

TABLE 1

|  | Embodiment (A) of the Present Invention | Embodiment (B) of the Present Invention | Embodiment (C) of the Present Invention | Embodiment (D) of the Present Invention | Embodiment (E) of the Present Invention | Conventional Example | Comparative Example |
| --- | --- | --- | --- | --- | --- | --- | --- |
| H1 (mm) | 12 | 12 | 12 | 12 | 12 | 12 | 12 |
| H2 (mm) | 10 | 11.5 | 10 | 10 | 10 | 12 | 7.5 |
| Wear ratio (%) until | 90 | 50 | 90 | 90 | 90 | 0 | 100 |

TABLE 1-continued

|  | Embodiment (A) of the Present Invention | Embodiment (B) of the Present Invention | Embodiment (C) of the Present Invention | Embodiment (D) of the Present Invention | Embodiment (E) of the Present Invention | Conventional Example | Comparative Example |
| --- | --- | --- | --- | --- | --- | --- | --- |
| tread surface of narrow area and tread surfaces of wide areas become the same height |  |  |  |  |  |  |  |
| Dimension of protrusion (mm) of narrow area when wear ratio is 100% | 0.2 | 0.7 | 0.2 | 0.2 | 0.2 | 1.5 | 0 |
| Stopping distance (index number) on ice of truck when wear ratio is 50% | 87 | 91 | 87 | 90 | 87 | 100 | 103 |
| Stopping distance (index number) on ice of truck when tire is new | 106 | 102 | 107 | 103 | 95 | 100 | 106 |

As can be seen from the experimental results given in Table 1, the protruding of the narrow area of the pneumatic tire 10 of the present invention is controlled. As a result, after the blocks have been worn to 50% of the depths of the sipes, the stopping distance of a vehicle equipped with the pneumatic tires 10 of the present invention is shorter than the stopping distance of a vehicle equipped with conventional pneumatic tires.

EMBODIMENT 2-1

Embodiment 2-1 of a pneumatic tire of the present invention will be described hereinafter. In this embodiment, the pneumatic tire has blocks in which expanded portions are formed at the bottom portions of the sipes and in which the relation of a shortest distance L between the expanded portions and an average distance TS of a narrow area in the circumferential direction of the tire is such that $0.7 \leq L/TS \leq 1.5$.

Figure 12:
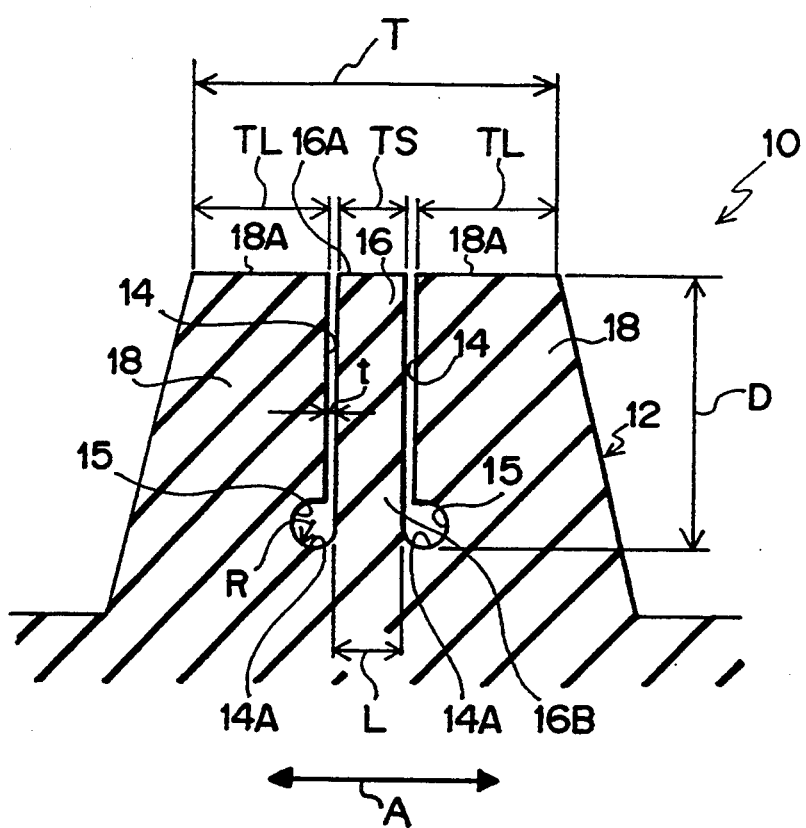
FIG. 12 is a sectional view of a block of a pneumatic tire of embodiment 2-1 of the present invention, wherein expanded portions are formed respectively at bottoms of sipes.

FIG. 12 is a sectional view in the circumferential direction of the tire of a block of the pneumatic tire of the present invention. The block 12 is shaped as a substantially square column.

One set of the pair of sipes 14 is formed in the block 12 so as to extend parallel in straight lines along the transverse direction of the tire (the front-to-back direction in FIG. 12).

Both longitudinal end portions of the respective sipes 14 extend to the side walls 12A on the sides of the block 12 in the transverse direction of the tire. The block 12 is divided by the sipes 14 into three areas in the circumferential direction of the tire. The area interposed between the pair of sipes 14 is the narrow area 16. The areas disposed adjacent to the narrow area 16 at both sides of the narrow area 16 in the circumferential direction of the tire (the direction of arrow A in FIG. 12) are the wide areas 18.

The bottom portions 14A of the sipes 14 include enlarged portions 15 which are enlarged so that the cross sections thereof in the circumferential direction of the tire are circular. The center of the radius of curvature of the enlarged portion 15 is positioned more toward the wide area 18 than the center line of the sipe 14. In the present embodiment, the groove width of the sipe 14 is 0.5 mm, and the radius of curvature R of the enlarged portion 15 is 1.5 mm. It is preferable that the radius of curvature R of the enlarged portion of the sipe be generally within a range of 0.5 mm to 2 mm.

In the present embodiment, the dimension W of the block 12 in the transverse direction of the tire is 30 mm. The dimension TL of the wide area 18 in the circumferential direction of the tire is 14 mm, and the dimension TS of the narrow area 16 in the circumferential direction of the tire is 5 mm. The ratio TS/TL is approximately 0.36. For the reasons described in embodiment 1—1, it is preferable that the dimension T in the circumferential direction of the tire of the block 12 is set so that $15 \text{ mm} \leq T \leq 40 \text{ mm}$, and it is more preferable that $20 \text{ mm} \leq T \leq 35 \text{ mm}$. It is preferable that the groove width of the sipe is generally less than or equal to 1 mm, and it is especially preferable that the groove width is less than or equal to 0.6 mm.

The tread portion of the tire of the present embodiment is structured similarly to that of embodiment 1—1.

EMBODIMENT 2—2

Figure 13:
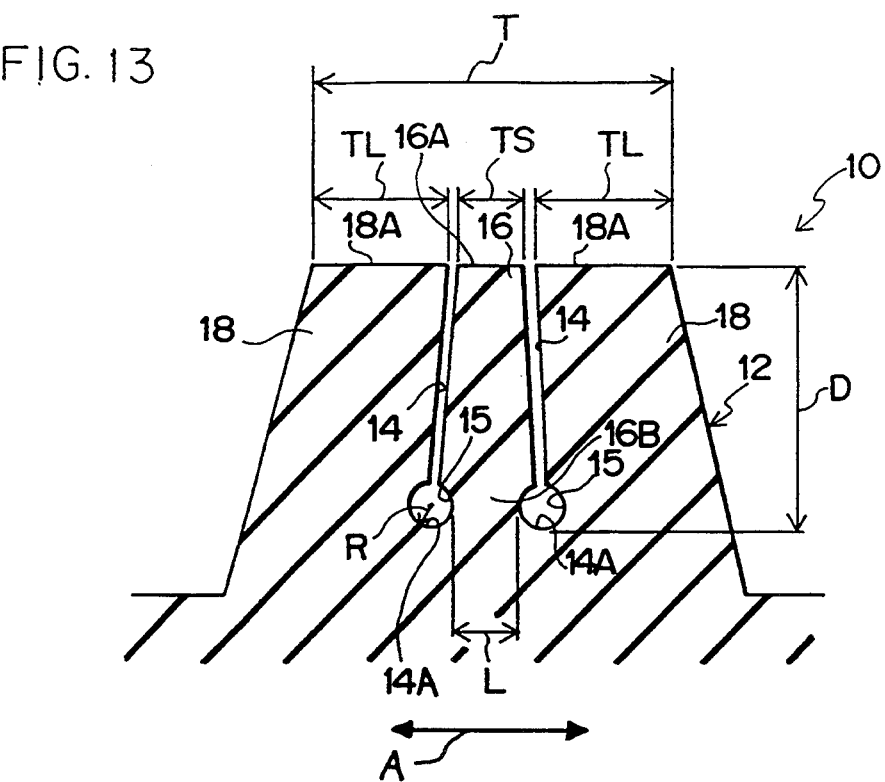
FIG. 13 is a sectional view of a block of a pneumatic tire of embodiment 2—2 of the present invention, wherein expanded portions are formed respectively at bottoms of sipes.

Referring to FIG. 13, embodiment 2—2 of the present invention will be described. Parts which are the same as those of embodiment 2-1 are denoted by the same reference numerals, and description thereof is omitted.

FIG. 13 is a sectional view, in the circumferential direction of the tire, of the block of the pneumatic tire of the present invention. FIG. 13 illustrates a variation of embodiment 2-1.

As the sipes 14 the present embodiment extend toward their respective bottom portions 14A, the sipes 14 are inclined in directions moving away from each other. The bottom portions of the sipes are enlarged in circular shapes whose centers are on the center lines of the grooves of the sipes. These enlarged portions extend in the transverse direction of the tire (towards the rear in FIG. 13). In this example, the shortest distance L between the expanded portions is 5 mm, TS is 5 mm, and the ratio L/TS is 1.0.

In this example as well, the ratio L/TS is within the scope of the present invention. Therefore, when the tire is removed from the mold, the narrow area 16 does not remain in the vulcanization mold. Further, during braking and the like, with the tire of the present embodiment, even when the sipe 14 opens and the edge effect occurs, the stress applied to the bottom portion 14A is dispersed by the expanded portion 15. Therefore, cracks can effectively be prevented from forming from the bottom portions 14A.

EMBODIMENT 2-3

Figure 14:
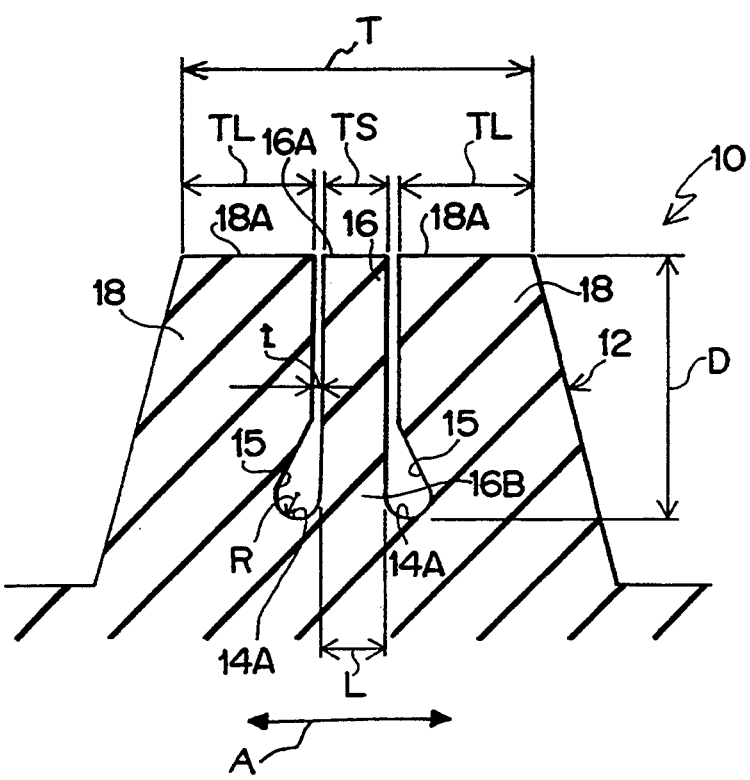
FIG. 14 is a sectional view of a block of a pneumatic tire of embodiment 2-3 of the present invention, wherein expanded portions are formed respectively at bottoms of sipes.

Next, embodiment 2-3 of the present invention will be described in accordance with FIG. 14, which is a sectional view, in the circumferential direction of the tire, of a block. Parts which are the same as those of embodiment 2-1 are denoted by the same reference numerals, and description thereof is omitted.

The pair of sipes 14 in the present embodiment are provided so as to be parallel. The expanded portions 15 are formed so as to swell in substantial tear or water-drop shapes toward the respective wide areas 18.

In the present embodiment, the shortest distance L between the bottom portions 14A of the pair of sipes 14 is 5 mm, and the dimension TS of the narrow area 16 is 5 mm. The ratio L/TS is 1. Therefore, there is no weakening of the portion 16B at which the narrow area 16 is rooted to the block 12, and the narrow area 16 does not remain in the vulcanization mold. Further, the enlarged portions 15 are formed in substantial tear or water-drop shapes. Therefore, compared with the pneumatic tires of embodiments 2-1 and 2—2, the pneumatic tire equipped with this block is more easily removed from blades (unillustrated) of the vulcanization mold which form the enlarged portions 15. In the same way as embodiments 2-1 and 2-2, because stress, which is applied to the bottom portion 14A when the sipe 14 opens, is dispersed by the expanded portion 15, the formation of cracks in the bottom portion 14A can be effectively prevented.

EMBODIMENT 2-4

Figure 15:
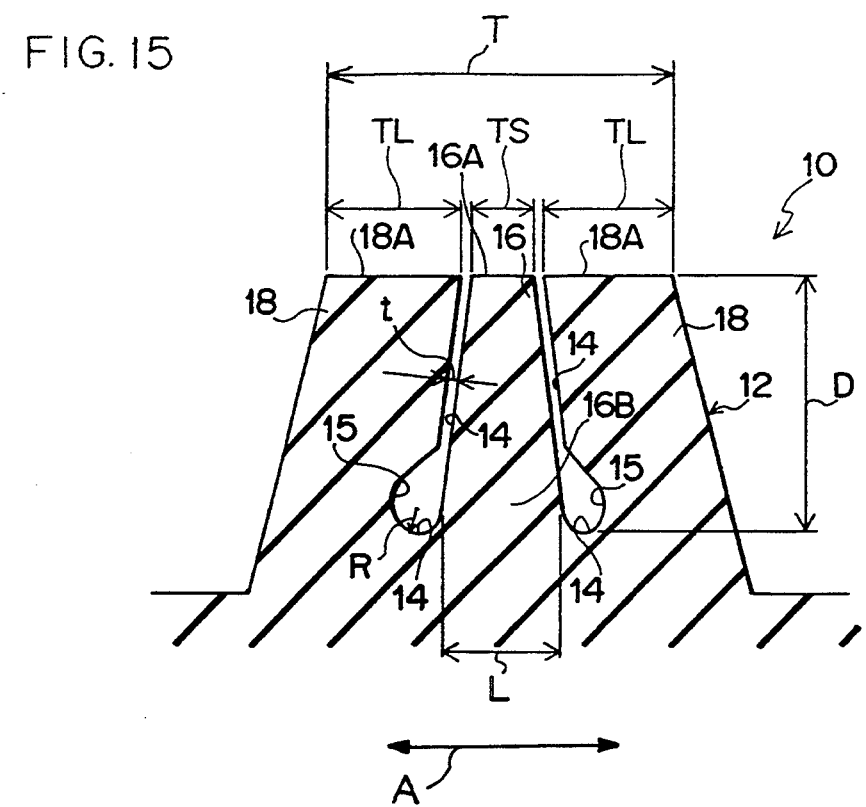
FIG. 15 is a sectional view of a block of a pneumatic tire of embodiment 2-4 of the present invention, wherein expanded portions are formed respectively at bottoms of sipes.

Next, embodiment 2-4 of the present invention will be described in accordance with FIG. 15, which is a sectional view, in the circumferential direction of the tire, of a block of the tire. Parts which are the same as those of embodiment 2-1 are denoted by the same reference numerals, and description thereof is omitted.

In the present embodiment, as the sipes 14 extend toward their respective bottom portions 14A, the sipes 14 are inclined in directions of moving away from each other. The bottom portions 14A swell in substantial tear or water-drop shapes toward the wide areas 18 so as to form the expanded portions 15.

In the present embodiment, the shortest dimension L between the bottom portions 14A of the pair of sipes 14 is 7.5 mm, and the dimension TS of the narrow area 16 is 5 mm. The ratio L/TS is 1.5. As a result, as in the second embodiment, there is no weakening of the portion 16B at which the narrow area 16 is rooted to the block 12, and the narrow area 16 can be easily removed from the vulcanization mold and does not remain therein. Further, because stress, which is applied to the bottom portion 14A when the sipe 14 opens, is dispersed by the expanded portion 15, cracks can be effectively prevented from forming from the bottom portion 14A.

EMBODIMENT 2-5

Figure 16:
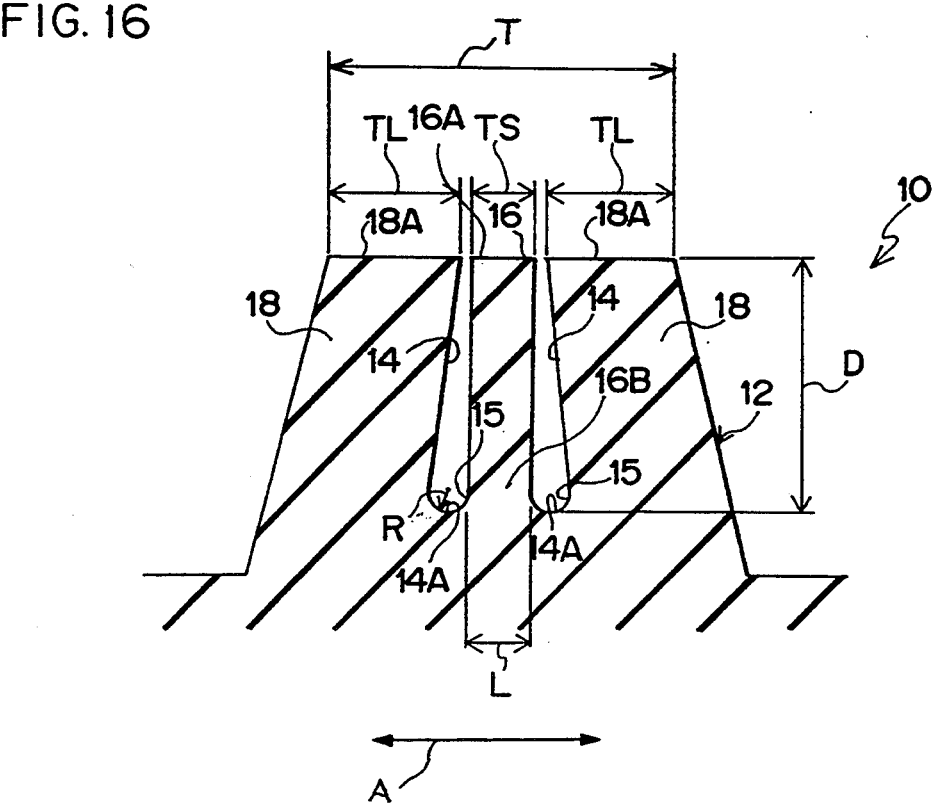
FIG. 16 is a sectional view of a block of a pneumatic tire of embodiment 2-5 of the present invention, wherein expanded portions are formed respectively at bottoms of sipes.

Next embodiment 2-5 of the present invention will be described in accordance with FIG. 16, which is a sectional view of a block of the tire. Parts which are the same as those of embodiment 2-1 are denoted by the same reference numerals, and description thereof is omitted.

In the present embodiment, as the sipes 14 extend toward their respective bottom portions 14A, the sipes 14 are inclined in directions of moving away from each other. Further, the groove widths of the sipes 14 gradually increase as the sipes 14 extend toward the bottom portions 14A. The bottom portions 14A of the expanded portions 15 are formed as half-circles. The shortest dimension L between the bottom portions 14A of the pair of sipes 14 is 5 mm, and the dimension TS of the narrow area 16 is 5 mm. The ratio L/TS is 1.0.

In the present embodiment as well, the ratio L/TS of the shortest dimension L between the bottom portions 14A of the pair of sipes 14 to the width TS of the narrow area 16 is set so that $0.7 \leq L/TS \leq 1.5$. Therefore, the advantages obtained in above-described embodiments 2-1 through 2-4 are also obtained in the present embodiment.

Figure 17:
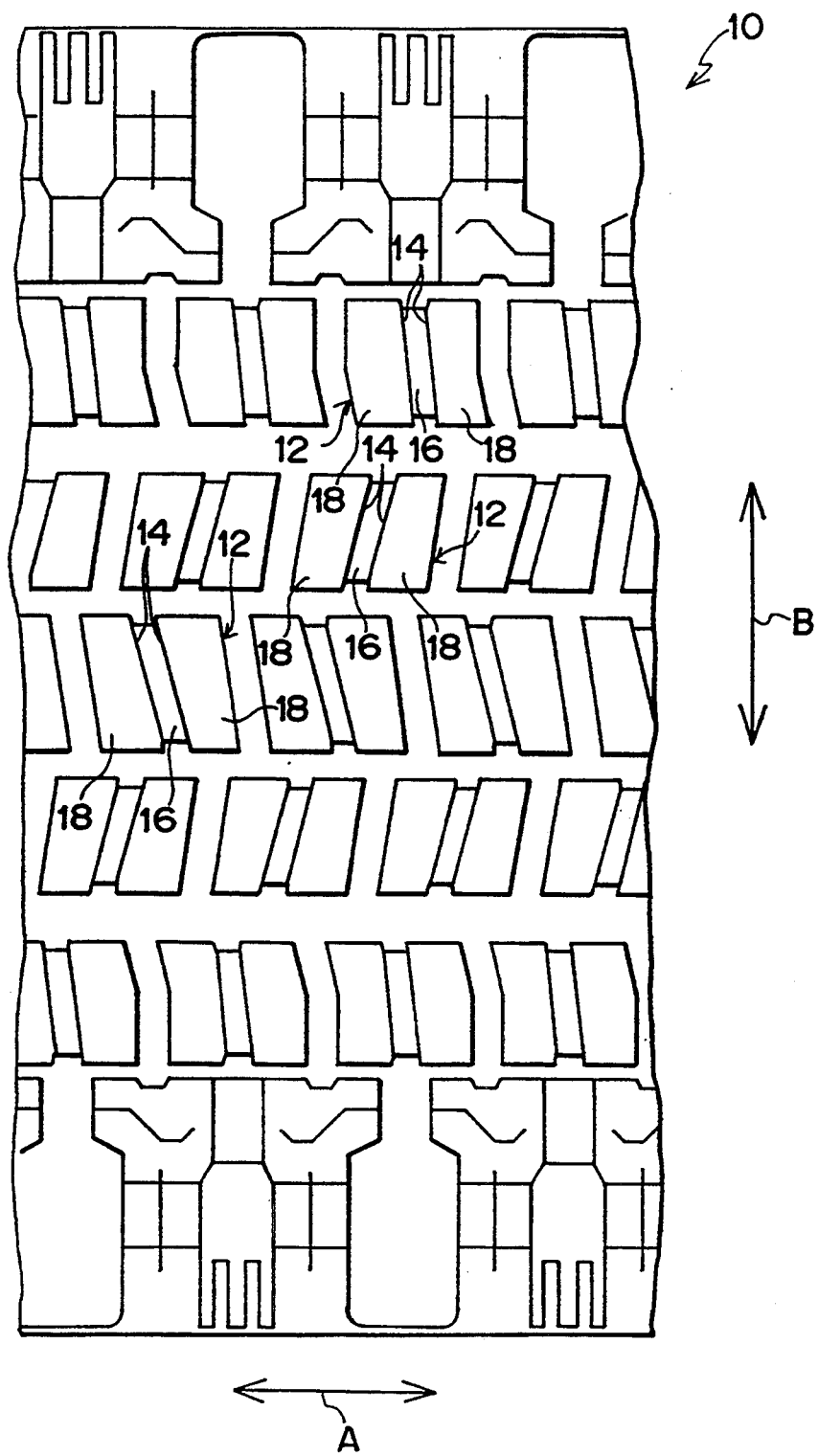
FIG. 17 illustrates a concrete example of a block pattern of a pneumatic tire of the present invention.
Figure 18:
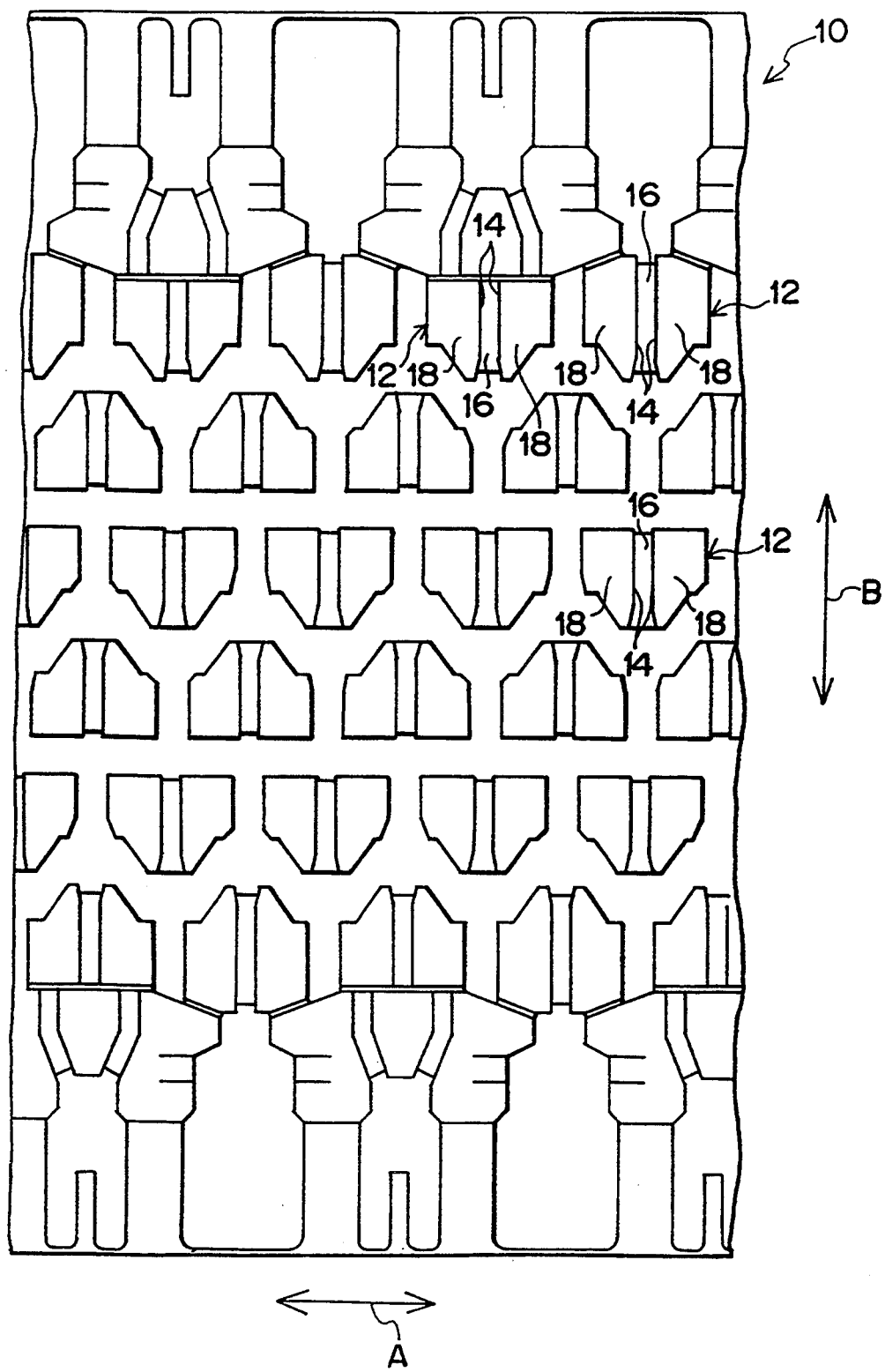
FIG. 18 illustrates another concrete example of a block pattern of a pneumatic tire of the present invention.

Further, in embodiments 2-1 through 2-5, the block 12 is rectangular as seen from above the tread. However, the present invention is not limited to the same. As shown in FIG. 17, the block 12 may be structured such that the longitudinal dimension of the narrow area 16 is shorter than that of the wide area 18. Alternatively, as shown in FIG. 18, the block 12 may have a trapezoidal configuration. However, the planar configuration of the block 12 is not limited to these shapes.

In each of the above-described embodiments, one set of a pair of sipes is provided per block. However, the present invention is not limited to the same, and two or more sets of the pairs of sipes may be provided in each block.

A tire equipped with blocks having the specific structures shown in the above-described second embodiment can be easily manufactured by using molds in which blades corresponding to the above sipe structures are formed.

EXPERIMENTAL EXAMPLE

Figure 19:
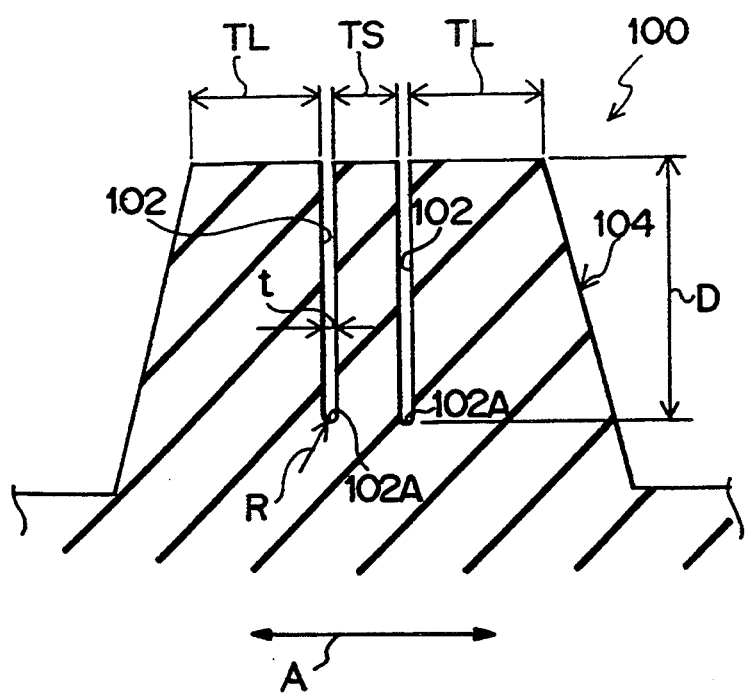
FIG. 19 is a sectional view of a block of a conventional pneumatic tire.
Figure 47A:
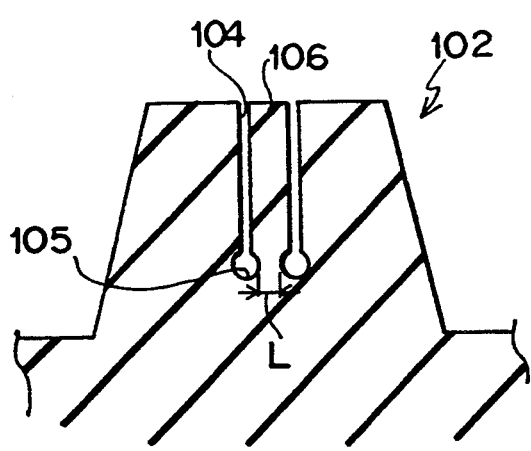
FIG. 47A is a sectional view in the circumferential direction of the tire of a block when enlarged portions are respectively provided at the bottoms of a pair of sipes.
Figure 47B:
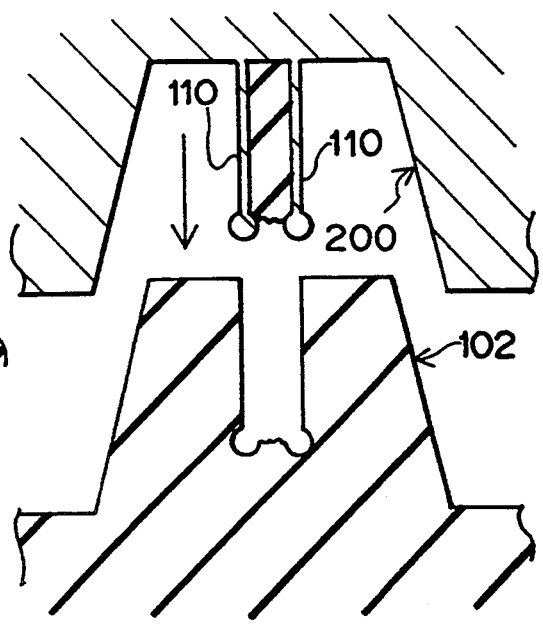
FIG. 47B illustrates a state in which the rubber of the narrow area remains in the mold when the block shown in FIG. 47A is removed from the mold.
Figure 50:
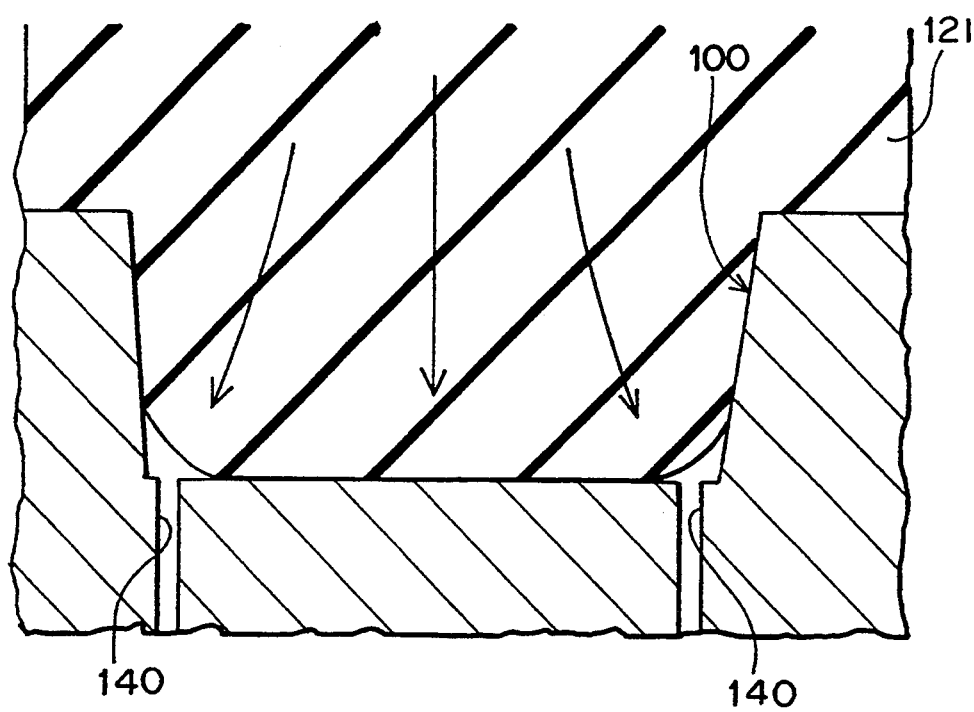
FIG. 50 illustrates a state in which crude rubber is filled in a mold for vulcanizing a conventional tire.
Figure 51:
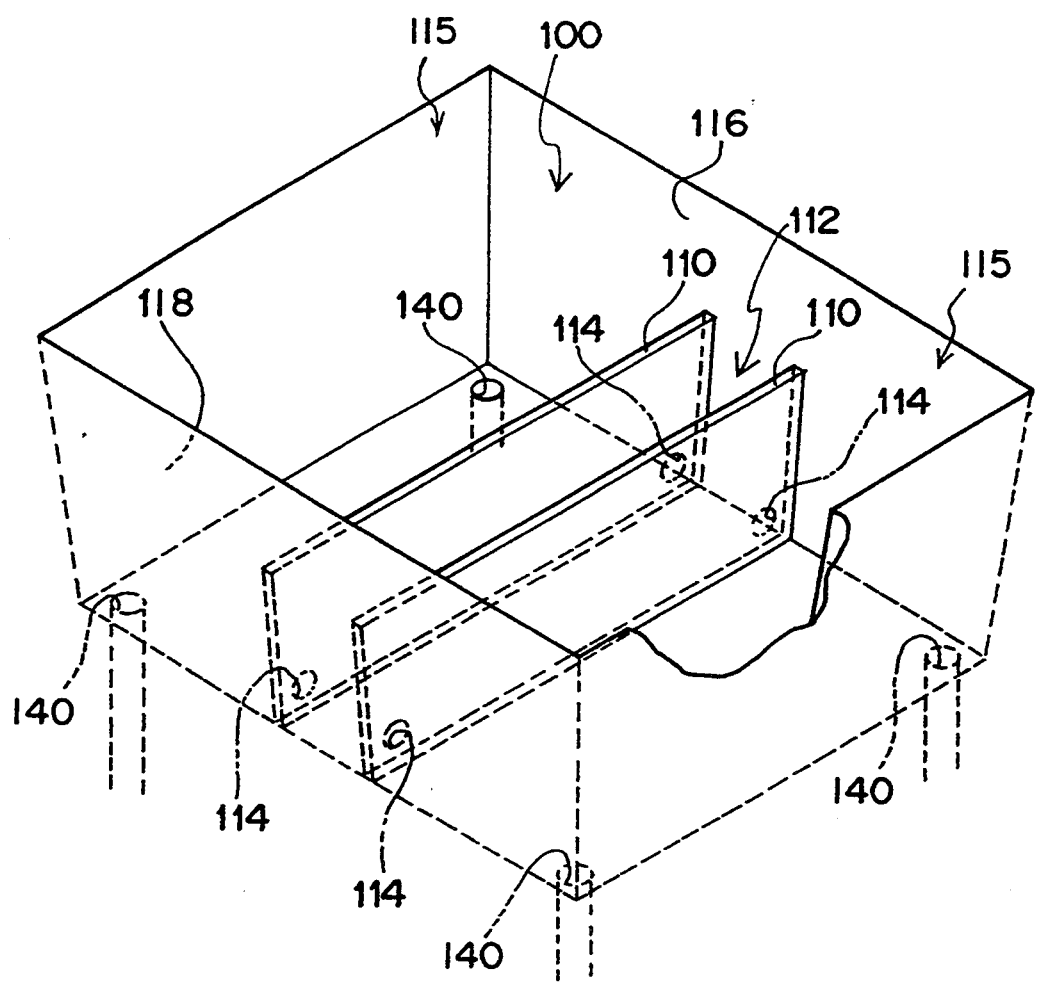
FIG. 51 illustrates a conventional mold for forming a block having one set of two sipes.
Figure 52:
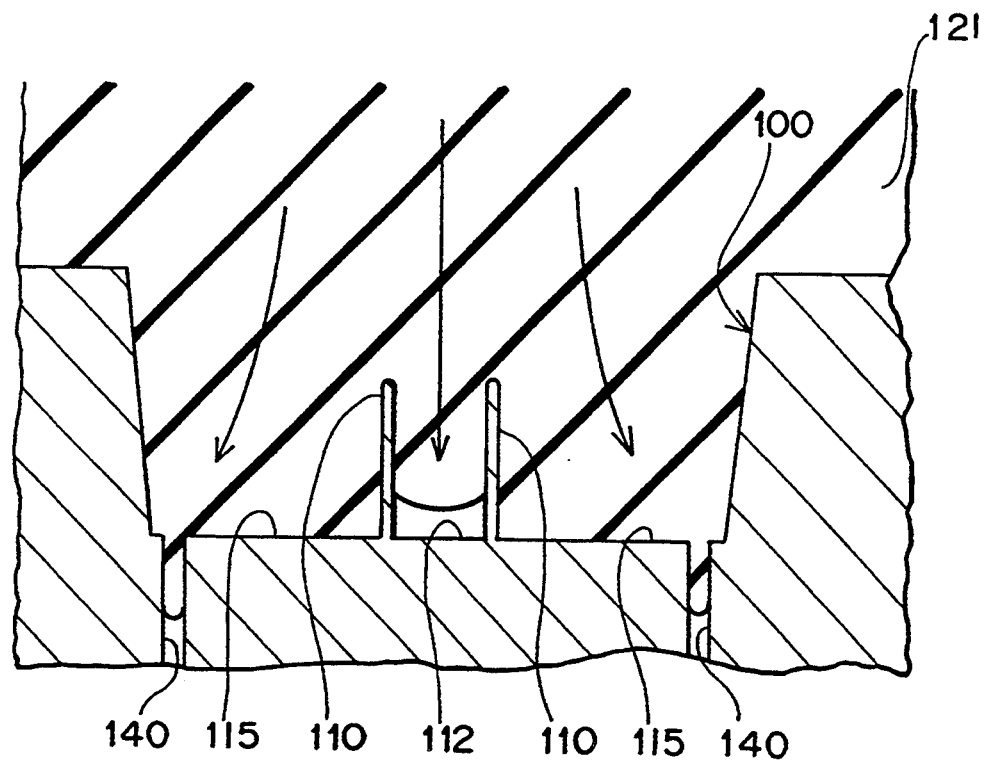
FIG. 52 illustrates a state in which crude rubber is filled in the mold in FIG. 51.
Figure 53:
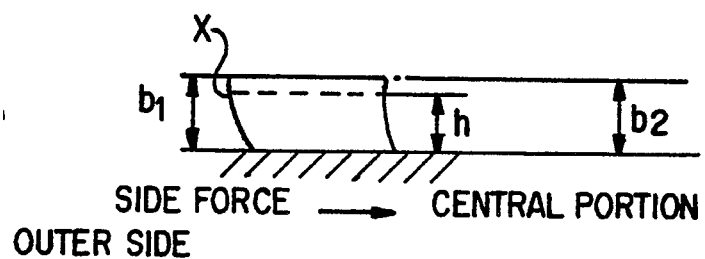
FIG. 53 is a view illustrating deformation of a block when a side force is applied to a tire tread in which the depths of the main grooves adjacent the block are equal.
Figure 54:
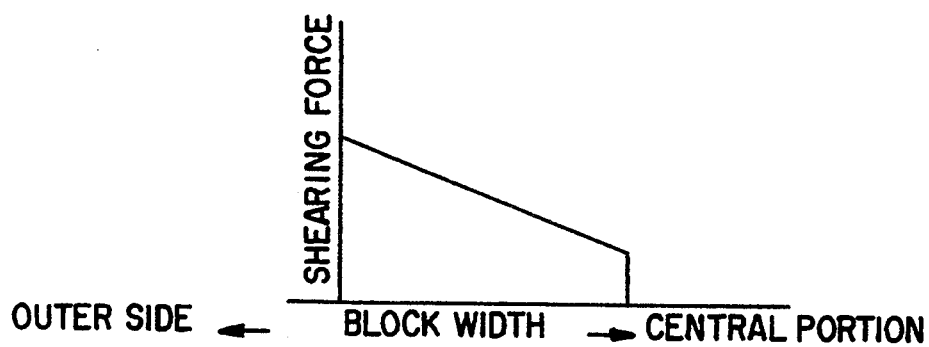
FIG. 54 is a graph illustrating the magnitude of a shearing force with respect to positions in the transverse direction of the block.
Figure 55A:
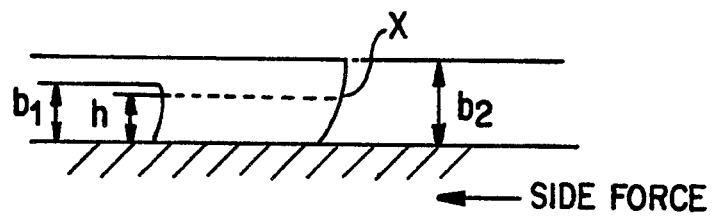
Figure 55B:
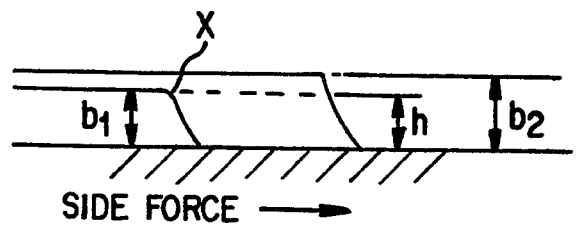

Table 2 shows the results of an experiment performed using six tires: conventional tire A (a pneumatic tire having blocks of the shape shown in FIG. 19), comparison tire B (a pneumatic tire having blocks of the shape shown in FIG. 47A), comparison tire (a pneumatic tire having blocks of the shape shown in FIG. 13), tire A of the present invention (a pneumatic tire having blocks of the shape shown in FIG. 13 of the embodiment 2—2), tire B of the present invention (a pneumatic tire having blocks of the shape shown in FIG. 13 of the embodiment 2—2), tire C of the present invention (a pneumatic tire having blocks of the shape shown in FIG. 12 of the embodiment 2—1). Tires of these six types were filled to standard internal pressure and were placed on all of the driving wheels of six respective ten-ton trucks having constant loads. These ten-ton trucks were actually driven, and the distance driven until a crack formed in the bottom portion of a sipe was measured. The results of this experiment are given in Table 2. The size of all of the tires used in the experiment was 10.00R20. Six-hundred and twenty four (624) caramel-shaped blocks, which were identically shaped except for the structures of the sipes which differed for each type of tire, were provided on each tire.

Further, when the pneumatic tires used in Table 2 were removed from vulcanization molds, the number of rubber pieces left between the blades, which are provided in the vulcanization mold and which are used to form the sipes, and the proportion of rubber pieces left were calculated. The results of these calculations are shown in Table 3.

TABLE 2

|  | TL (mm) | TS (mm) | Depth of Sipe (mm) | Width of Sipe (mm) | Sipe Bottom Radius R (mm) | L (mm) | L/TS (mm) | Distance Run until Crack Appears (km) |
| --- | --- | --- | --- | --- | --- | --- | --- | --- |
| Conventional Tire A | 14 | 5 | 10 | 0.5 | 0.25 | 5 | 1.0 | 5000 |
| Comparison Tire B | 14 | 5 | 10 | 0.5 | 1.5 | 2.5 | 0.5 | 18000 |
| Tire A of the Present Invention | 14 | 5 | 10 | 0.5 | 1.5 | 3.5 | 0.7 | No cracks |
| Tire B of the Present Invention | 14 | 5 | 10 | 0.5 | 1.5 | 7.5 | 1.5 | No cracks |
| Tire C of the Present Invention | 14 | 5 | 10 | 0.5 | 1.5 | 5 | 1.0 | No cracks |
| Comparison Tire | 14 | 5 | 10 | 0.5 | 1.5 | 8.5 | 1.7 | 7000 |

TABLE 3

|  | Total Number of Blocks per Tire | Number of Pieces of Rubber Left in Mold | Proportion of Pieces of Rubber Left in Mold (%) |
| --- | --- | --- | --- |
| Conventional Tire A | 624 | 0 | 0 |
| Comparison Tire B | 624 | 18 | 2.9 |
| Tire A of the Present Invention | 624 | 0 | 0 |
| Tire B of the Present Invention | 624 | 0 | 0 |
| Tire C of the Present Invention | 624 | 0 | 0 |
| Comparison Tire | 624 | 0 | 0 |

It can be understood from the experimental results shown in Table 2 that in the pneumatic tire of the present invention, the formation of cracks from the bottom portions of the sipes can be prevented. Table 3 shows that when the pneumatic tire of the present invention is removed from a vulcanization mold, the narrow area does not remain in the vulcanization mold and can be removed reliably and smoothly therefrom.

EMBODIMENT 3

Figure 20A:
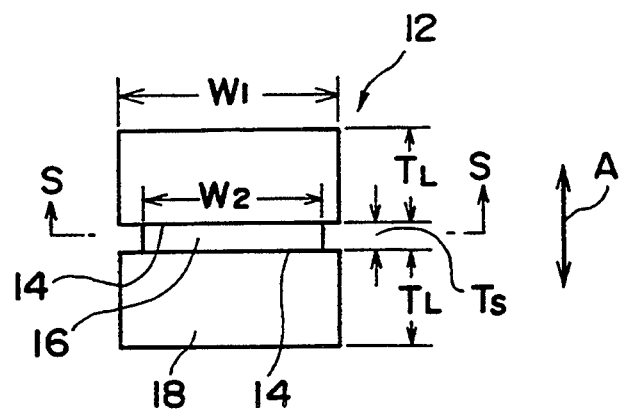
FIG. 20A is a plan view of a block of a pneumatic tire of a third embodiment of the present invention.

FIG. 20A is a plan view of a concrete example of a single block formed on the surface of the pneumatic tire of the present invention. A pair of sipes 14 are formed in the center of the block 12 along the transverse direction of the tire so as to be parallel to each other. The block 12 is divided by the pair of sipes 14 into a land portion which is interposed between the sipes 14, i.e., the narrow area 16, and the wide areas 18 located respectively on both sides of the narrow area 16. A width W2 of the narrow area 16 is 18 ram, and a width W1 of the block 12 is 24 min. The ratio W2/W1 is 0.75.

Figure 20B:
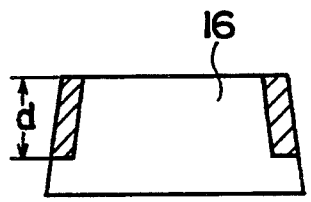
FIG. 20B is a sectional view taken along line s—s of FIG. 20A.

FIG. 20B is a sectional view of the narrow area 16 taken along line S—S of FIG. 20A. The sectional configuration of the narrow area 16 is trapezoidal. The depth of the sipe 14 is represented by d. The hatched portions show a wall surface of the wide area 18 which appears behind the narrow area 16.

Figure 20C:
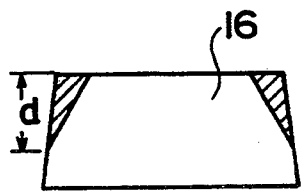
FIG. 20C illustrates a variation of the sectional view of the block illustrated in FIG. 20B.

The narrow area can be formed so as to have the sectional configuration illustrated in FIG. 20C instead of that in FIG. 20B. The sectional configuration of the narrow area in the transverse direction of the tire is not limited in particular to the configurations illustrated in FIGS. 20B and 20C. Further, the planar configurations of the narrow area and the wide areas are not limited to those shown in FIG. 20A.

Figure 21:
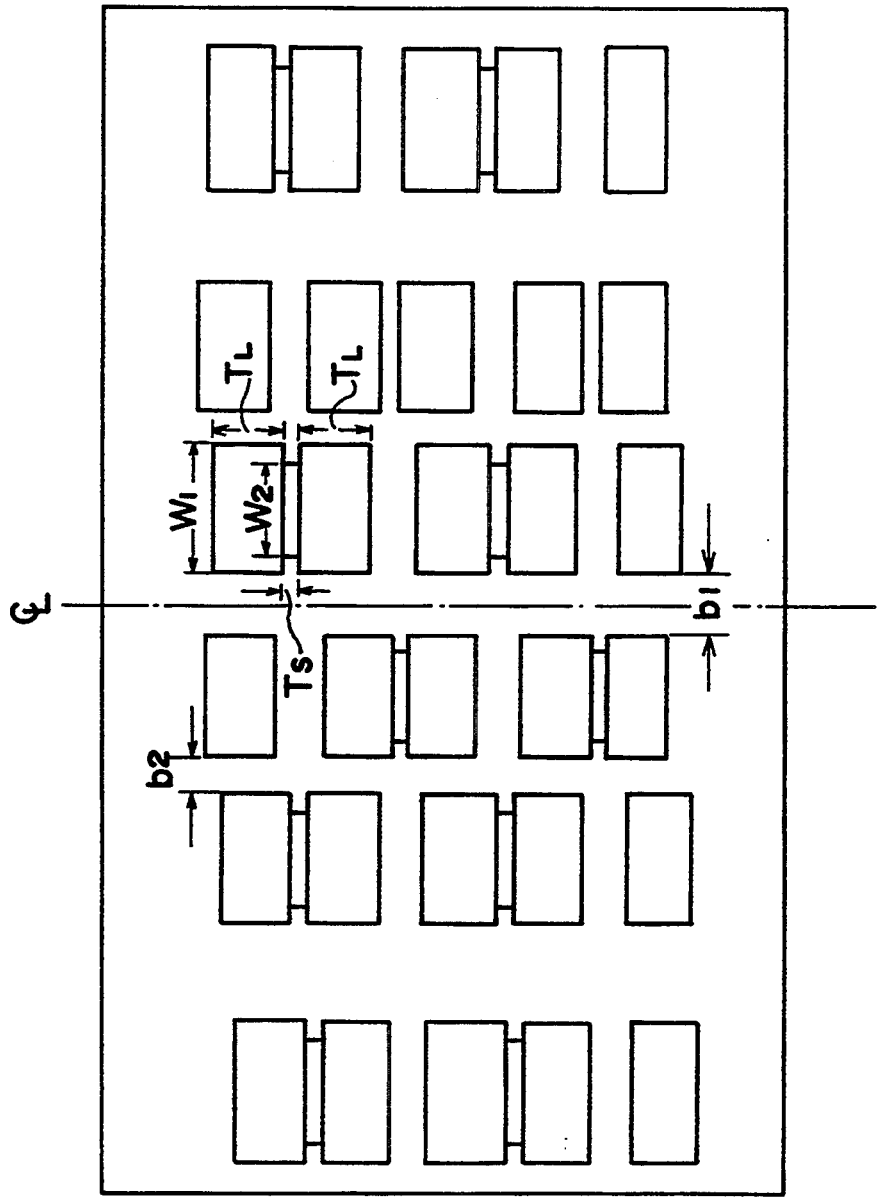
FIG. 21 illustrates a concrete example of a block pattern of a pneumatic tire of the present invention.
Figure 22:
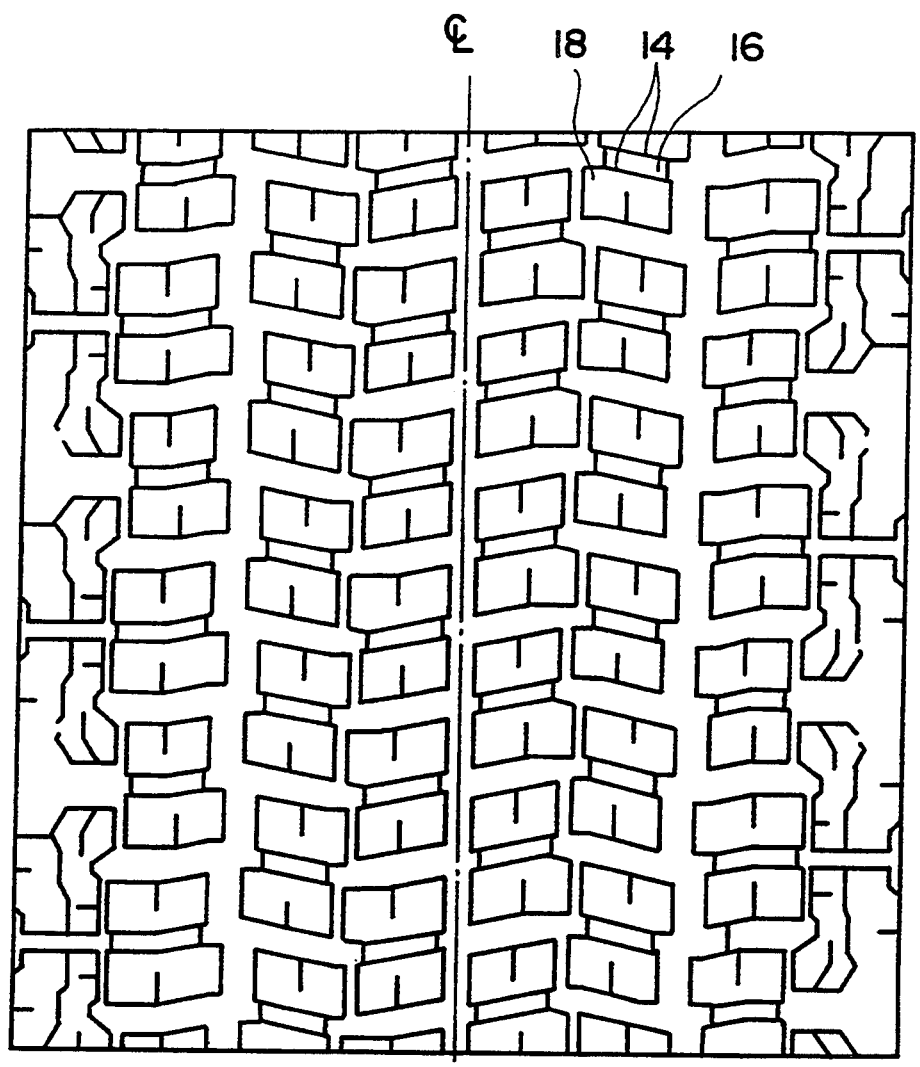
FIG. 22 illustrates another concrete example of a block pattern of a pneumatic tire of the present invention.
Figure 23:
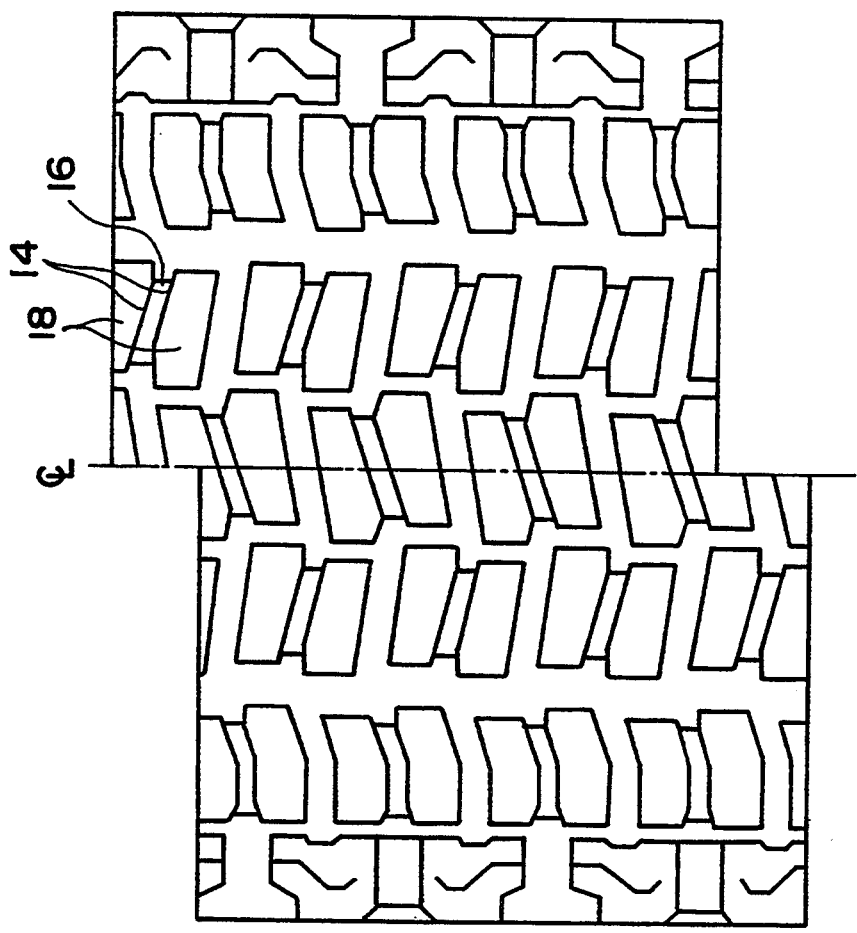
FIG. 23 illustrates another concrete example of a block pattern of a pneumatic tire of the present invention.

FIG. 21 illustrates a concrete example of a tread pattern of the tire of the present invention which is formed from blocks in which both the narrow area and the wide areas are rectangular. In each of the blocks, the sipes are parallel to each other and parallel to the transverse direction of the tire. Detailed dimensions of the block are listed below. This tread pattern, in which a main groove b1 and auxiliary grooves b2 have the dimensions shown below, is applied to a 11R22.5 size tire. The same type of foamed rubber as that used in the first embodiment is used in this tread.

width W1 of a single block: 24 mm
width W2 of narrow area: 18 mm
length TL of a single block: 10 mm
distance TS between sipes: 5 mm
width b1 of circumferential direction main groove: 20 mm
width b2 of circumferential direction auxiliary groove: 20 mm
depth d of sipe: 11 mm FIGS. 22 and 23 illustrate other concrete examples of the block pattern of the tire of the present invention wherein W1/W2 is within the scope of the present invention. In these drawings, the block pattern includes various polygons which may be formed by a combination of various lines. For example, the sipes of blocks which are shaped other than rectangles may be formed by straight lines inclined with respect to the transverse direction of the tire. Alternatively, the sipes may be formed by lines which, along the transverse direction of the tire, become inclined curves at their middle sections, and then become straight lines. Further, the sipes may be inclined in one direction. There exists a variety of possibilities for the sipes.

An experiment was performed using tires having the block pattern such as that shown in FIG. 21 in which the width W1 of a single block is 24 mm and the length TL of the block is 10 mm. Several different tires having different distances TS between adjacent sipes and different widths W2 of the land portions between the sipes were manufactured. The tire size was 11R22.5. The tires were placed on vehicles which were driven 20,000 km. The development of cracks at the bottoms of the sipes was observed, and the results were compared. The results of this experiment are given in Table 4.

TABLE 4

|  | Conventional Tire | Embodiment 1 | Embodiment 2 | Embodiment 3 | Comparative Example 1 | Comparative Example 2 |
| --- | --- | --- | --- | --- | --- | --- |
| Distance TS Between Sipes (mm) | 10 | 5 | 2.5 | 6 | 5 | 5 |

TABLE 4-continued

|  | Conventional Tire | Embodiment 1 | Embodiment 2 | Embodiment 3 | Comparative Example 1 | Comparative Example 2 |
| --- | --- | --- | --- | --- | --- | --- |
| Width W2 of Land Portion Between Sipes (mm) | 24 | 18 | 22 | 20 | 24 | 23 |
| W1 | 24 | 24 | 24 | 24 | 24 | 24 |
| W2/W1 | 1 | 0.75 | 0.92 | 0.83 | 1 | 0.96 |
| Cracks at Bottom of Sipes | Yes | No | No | No | Yes | Yes |

It can be seen from Table 4 that cracks did not occur in the bottoms of the sipes of the pneumatic tires of the present invention, in which the relation $0.5 \leq W2/W1 \leq 0.95$ is satisfied, even after the vehicles on which the tires were used were actually driven 20,000 km. Accordingly, the breaking off of portions of the narrow area of the block due to the formation of cracks can be prevented.

EMBODIMENT 4-1

Figure 24:
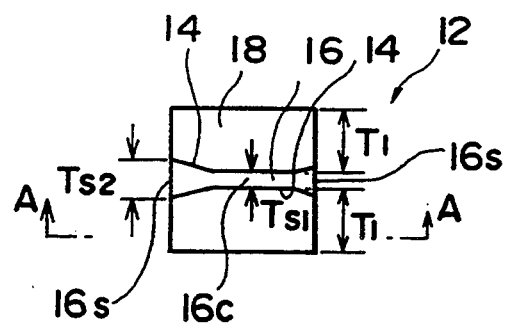
FIG. 24 is a plan view of a block of a pneumatic tire of embodiment 4-1 of the present invention.
Figure 25:
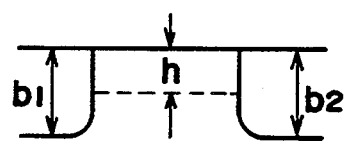
FIG. 25 is a sectional view taken along line A—A of FIG. 24.

Embodiment 4-1 of the present invention will be described with reference to FIGS. 24 and 25. FIG. 24 is a plan view of a concrete example of a single block used in the tire of the present invention. The block 12 is divided into the narrow area 16 and the wide areas 18 by the two sipes 14. The width in a vicinity of an end portion of the narrow area 16 gradually becomes larger compared to the width TS1 of a central portion of the land area between the sipes 14, and becomes the maximum width TS2 at the end portion. FIG. 25 is a sectional view of the wide area 18 taken along line A—A of FIG. 24. In cross section, the depths of the main groove b1 and the auxiliary groove b2 are the same.

EMBODIMENT 4-2

Figure 26:
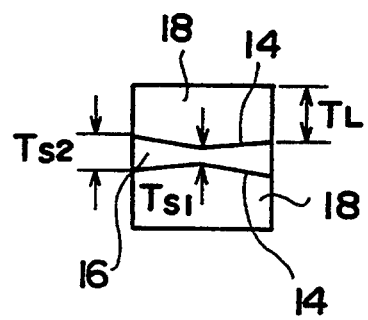
FIG. 26 is a plan view of a block of a pneumatic tire of embodiment 4-2 of the present invention.

FIG. 26 illustrates another concrete example of a single block used in the tire of the present invention, and is a plan view of the block. The width of the narrow area 16 gradually becomes larger from the central portion of the narrow area 16 to the side end thereof, i.e., the width gradually increases from TS1 to TS2.

EMBODIMENT 4-3

Figure 27A:
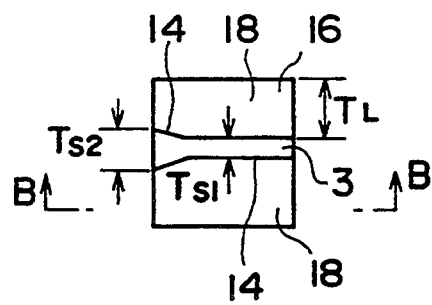
FIG. 27A is a plan view of a block of a pneumatic tire of embodiment 4-3 of the present invention.
Figure 27B:
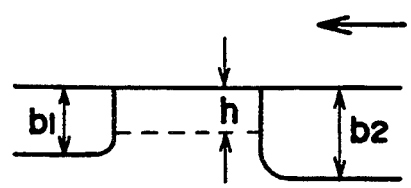
FIG. 27B is a sectional view taken along line B—B of FIG. 27A.

FIG. 27A illustrates another concrete example of a block of a tire of the present invention, and is a variation of FIG. 24. Only one end portion of the narrow area 16 becomes wider toward the side end. FIG. 27B is a sectional view of the block taken along line B—B of FIG. 27A. The depths b1 and b2 of the grooves at the sides of the block are different. The depth h of the sipe 14 is more shallow than the depth b1 of the more shallow groove. Accordingly, by using the block configuration illustrated in FIGS. 27A and 27B, the formation of cracks in the bottom portions of the auxiliary grooves of the narrow area 16 can be prevented.

Figure 28:
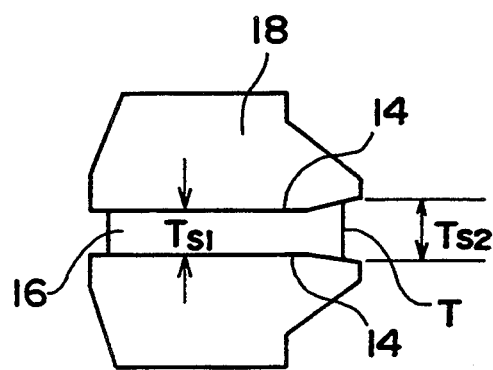
FIG. 28 illustrates a variation of the blocks of embodiments 4-1 through 4-3.

The configuration of the block in the present embodiment is not limited to those shown in embodiments 4-1 through 4-3, and a variety of configurations can be used. For example, a block having a configuration such as that illustrated in FIG. 28 may be used. In this case, the circumferential direction length TS2 of the side end is wider than the circumferential direction length TS1 of the central portion. The circumferential direction length widens from the middle to an end portion of the narrow area 16.

The configuration of the sipes is not limited to those shown in the embodiments 4-1 through 4-3. Various configurations such as jagged lines, polygonal lines, and the like may be used in the above-described structures in which the side ends have wide widths.

Figure 29:
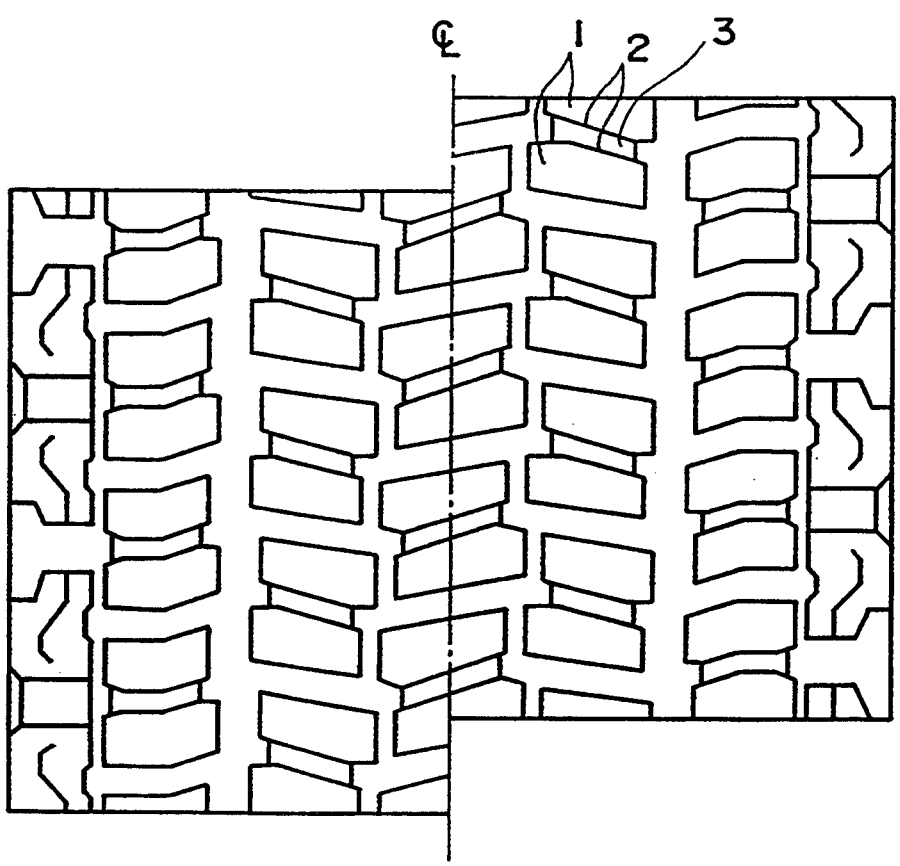
FIG. 29 illustrates a concrete example of a block pattern of a pneumatic tire of the present invention.

FIG. 29 illustrates a concrete example of a tread pattern of the tire of the present invention in which blocks of various configurations included in the variations of the fourth embodiment are combined.

Tables 5A and 5B show the results of an experiment performed using standard tires having conventional tread patterns and tires having the tread patterns of the embodiments illustrated in FIGS. 24 and 27. The tires were placed on vehicles, and a braking test on ice-covered roads and a 20,000 km running test were performed.

In these experiments, foamed rubber such as that used in embodiment 1-1 was used in the tread. The tire size was 10.00R20. The tires having these tread patterns were attached to 7.00T×20 rims and were placed on vehicles. Thereafter, load of 2700 kg was placed on the tires which were inflated to internal pressures of 7.25 kgf/cm$^2$. While the vehicles were driven at speeds of 20 km/h on ice of $-5°$ C., they were subjected to sudden braking. The distance from the point when the brakes were hit to the point where the vehicle stopped was measured for each vehicle.

The results of this experiment are shown in Tables 5A and 5B. The inverses of these measurements are expressed as index numbers indicating on-ice performance. In this experiment, the index number 100 represents a braking distance of 39.2 m.

TABLE 5A

| Type of Tire- | Standard Tire | Tire 1 of Embodiment | Tire 2 of Embodiment |
| --- | --- | --- | --- |
| Depth b1 of Main Groove | 20 | 20 | 15 |
| Depth b2 of Auxiliary Groove | 20 | 20 | 20 |
| Width TS1 of Narrow Area (central portion) | 3 | 3 | 3 |
| Width TS2 of Narrow Area (end portion) | 3 | 4.5 | 4.5 |
| On-Ice Performance | 100 | 99 | 100 |

TABLE 5B

| State of Tire After 20,000 km of Running | | | |
| --- | --- | --- | --- |
| Type of Tire | Standard Tire | Tire 1 of Embodiment | Tire 2 of Embodiment |
| Cracks at end portion of narrow-width land | Breaking off of portions | No cracks | No cracks |

TABLE 5B-continued

| | State of Tire After 20,000 km of Running | | |
|---|---|---|---|
| Type of Tire | Standard Tire | Tire 1 of Embodiment | Tire 2 of Embodiment |
| portion | | | |

It can be understood from Tables 5A and 5B that in the pneumatic tire of the present invention, the formation of cracks in the bottom portion of the narrow area of the block and the breaking off of portions of the block can be effectively prevented.

EMBODIMENT 5-1

Figure 30:
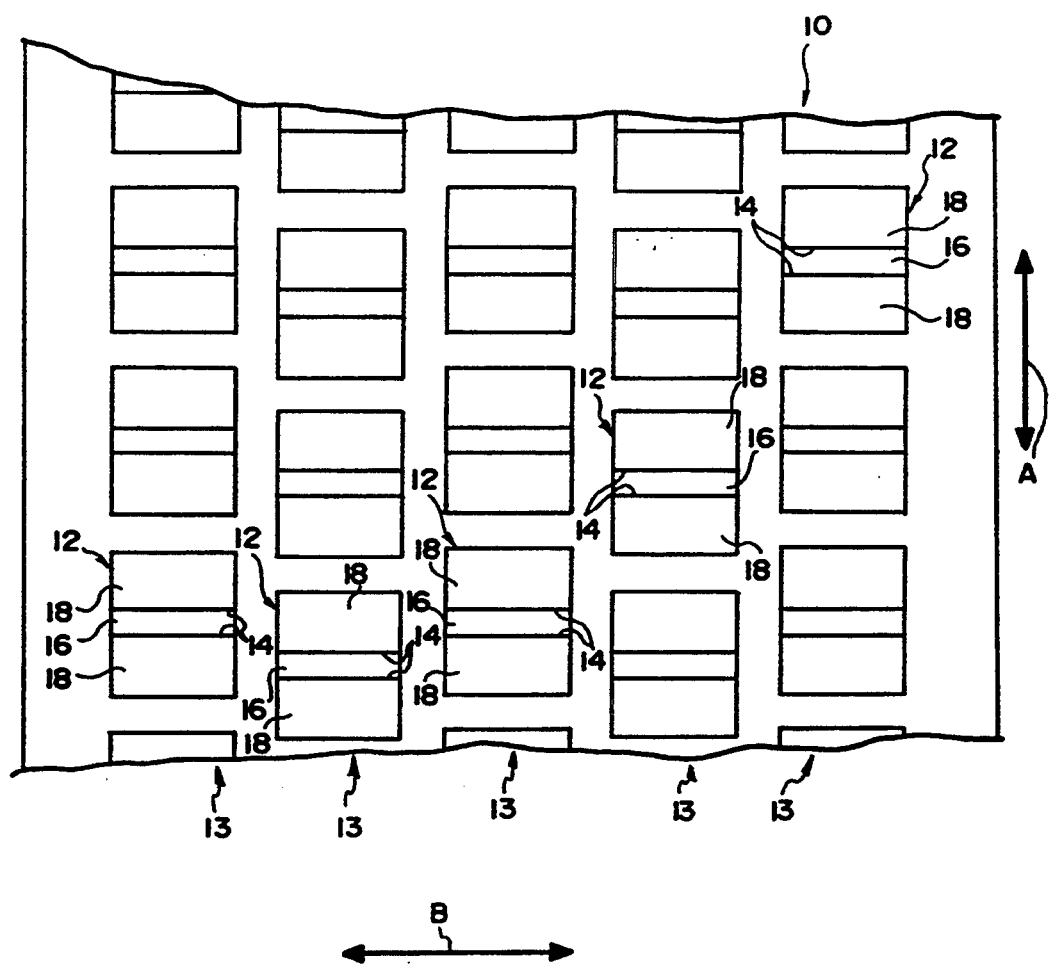
FIG. 30 illustrates a block pattern of a pneumatic tire of embodiment 5-1 of the present invention.
Figure 31:
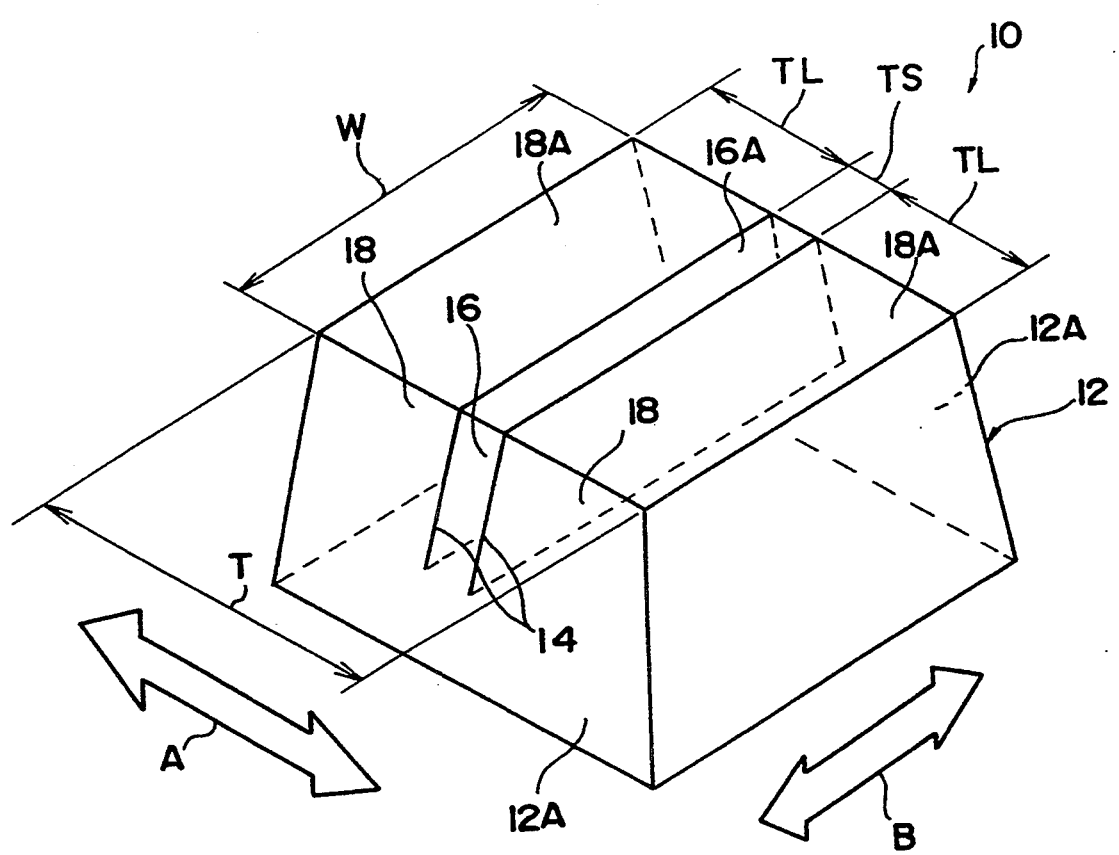
FIG. 31 is an enlarged perspective view of a block in FIG. 30.

A concrete example of a tread pattern of the pneumatic tire of the present invention is illustrated in FIG. 30. In the tread, five block rows 13, each of which is formed of a plurality of the blocks 12, are provided along the transverse direction of the tire (the direction of arrow B in FIG. 30). The blocks 12 of each block row 13 are disposed so as to be spaced apart at predetermined intervals along the circumferential direction of the tire (the direction of arrow A in FIG. 30). FIG. 31 is an enlarged perspective view of a block of the tread pattern shown in FIG. 30. As illustrated in FIG. 31, the block 12 is formed as a substantially square column. The same type of foamed rubber such as that used in embodiment 1—1 is used in this tread.

The pair of sipes 14 are formed in a circumferentially central portion of the block 12 so as to extend as straight lines in the transverse direction of the tire.

Both end portions in the longitudinal direction of the sipes 14 extend to the side walls 12A of the block 12 in the transverse direction of the tire. The block 12 is divided by the sipes 14 into three areas in the circumferential direction of the tire. The area interposed between the pair of sipes 14 is the narrow area 16. The areas on both sides of the narrow area 16 in the circumferential direction of the tire are wide areas 18 which are adjacent to the narrow area 16. The wide areas 18 are more rigid than the narrow area 16 due to the difference between the surface area of the wide area 18 and the surface area of the narrow area 16.

The dimensions of the block are as described below.

Dimension W in the transverse direction of the tire (the direction of arrow B in FIG. 31): 34 mm Groove width TS of sipe: 0.5 mm Dimension TL of wide area 18 in the circumferential direction of the tire: 14 mm Dimension TS of narrow area 16 in the circumferential direction of the tire: 5 mm TS/TL: approximately 0.36

As illustrated in FIG. 30, the block row 13, having blocks with the above dimensions, is staggered by a predetermined dimension in the circumferential direction of the tire with respect to the block rows 13 adjacent thereto. The narrow areas 16 of the blocks of one block row 13 are disposed so as to be aligned, in the transverse direction of the tire, with the wide areas 18 of the blocks of the adjacent rows 13. In this way, the narrow areas 16 and the wide areas 18, which are more rigid than the narrow areas 16, are disposed alternately in the transverse direction of the tire. Therefore, even when an extreme frictional force is applied to the tire, the force is not concentrated exclusively on the narrow areas 16. As a result, the sipes 14 do not open excessively, and cracks do not form in the bottom portions 14A thereof. Further, even if a side force F is applied to the block and a complex force, which is comprised mainly of a horizontal direction component, is applied to the narrow area 16, the amount of deformation is mitigated and decreased by the rigid wide areas 18. The formation of cracks particularly in both end portions of the narrow area 16 can thereby be prevented. In this way, the formation of cracks in the narrow area 16 and the breaking off of portions due to cracks can be effectively prevented by the present invention.

The blocks illustrated in FIGS. 2, 12, 20 and 24 may be used in the present embodiment instead of the blocks used in the above description.

EMBODIMENT 5-2

Figure 32:
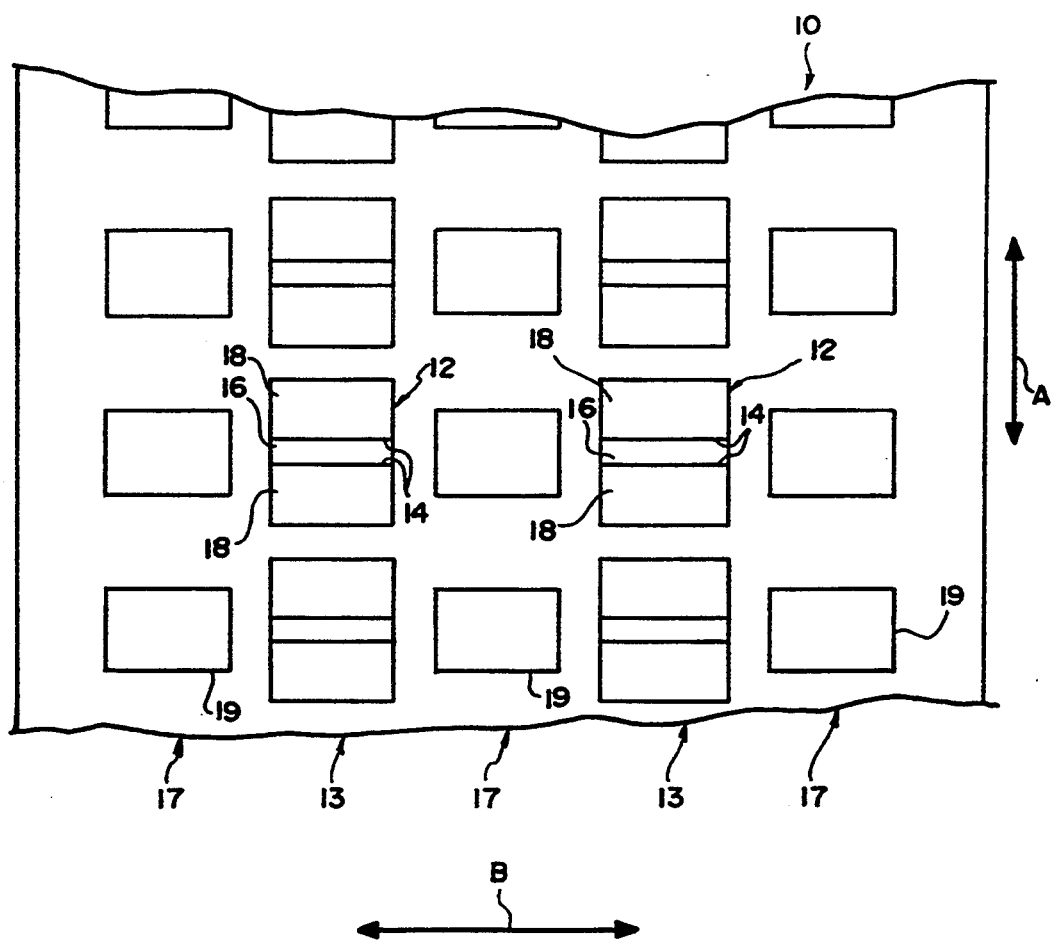
FIG. 32 illustrates a block pattern of a pneumatic tire of embodiment 5-2 of the present invention.

Another concrete example of a tread pattern, in which narrow areas and areas which are more rigid than the narrow areas are provided alternately in the transverse direction of the tire, is illustrated in FIG. 32. Parts which are the same as those of embodiment 5-1 are denoted by the same reference numerals, and description thereof is omitted.

As shown in FIG. 32, in the tread pattern of the present embodiment, the block rows 13, in which the blocks have the pairs of sipes 14, and block rows 17, which include blocks 19 shaped as square columns and having no sipes, run along the circumferential direction of the tire (the direction of arrow A in FIG. 32) and are provided alternately in the transverse direction of the tire (the direction of arrow B in FIG. 32). The blocks 19 are aligned, in the transverse direction of the tire, with the narrow areas 16 of the blocks of the block row 13. The blocks having the sipes are structured as the block illustrated in FIG. 2. The dimension in the transverse direction of the tire of the block 19, which does not have sipes, is substantially equal to the dimension in the transverse direction of the tire of the block 12. The dimension of the block 19 in the circumferential direction of the tire is longer than the dimension of the narrow area 16 in the circumferential direction of the tire. Therefore, the blocks having no sipes are more rigid than the narrow areas 16.

In the pneumatic tire 10 having the above-described block patterns, portions having higher rigidity than the narrow areas 16, i.e., the blocks 19 which have no sipes, are disposed at the transverse direction sides of the narrow areas 16. Therefore, in the present embodiment, just as in the pneumatic tire 10 of embodiment 5-1, even when an extreme frictional force is applied to the tire, the force is not concentrated exclusively on the narrow areas 16. Therefore, the sipe 14 does not open excessively, and cracks do not form in the bottom portion 14A of the sipe 14. Further, even if a side force F is applied and a complex force, which is comprised mainly of a horizontal direction component, is applied, the amount of deformation is mitigated and reduced by the areas having high rigidity (the blocks 19 which have no sipes). The formation of cracks at. in particular, both end portions of the narrow area 16 is thereby prevented. In the present embodiment as well, the formation of cracks in the narrow area and the breaking off of portions of the narrow area resulting from cracks can be effectively prevented.

EMBODIMENT 5-3

Next, embodiment 5-3 of the present invention will be described in accordance with FIG. 33. Parts which are the same as those of embodiment 5-1 are denoted by the same reference numerals, and description thereof is omitted.

Figure 33:
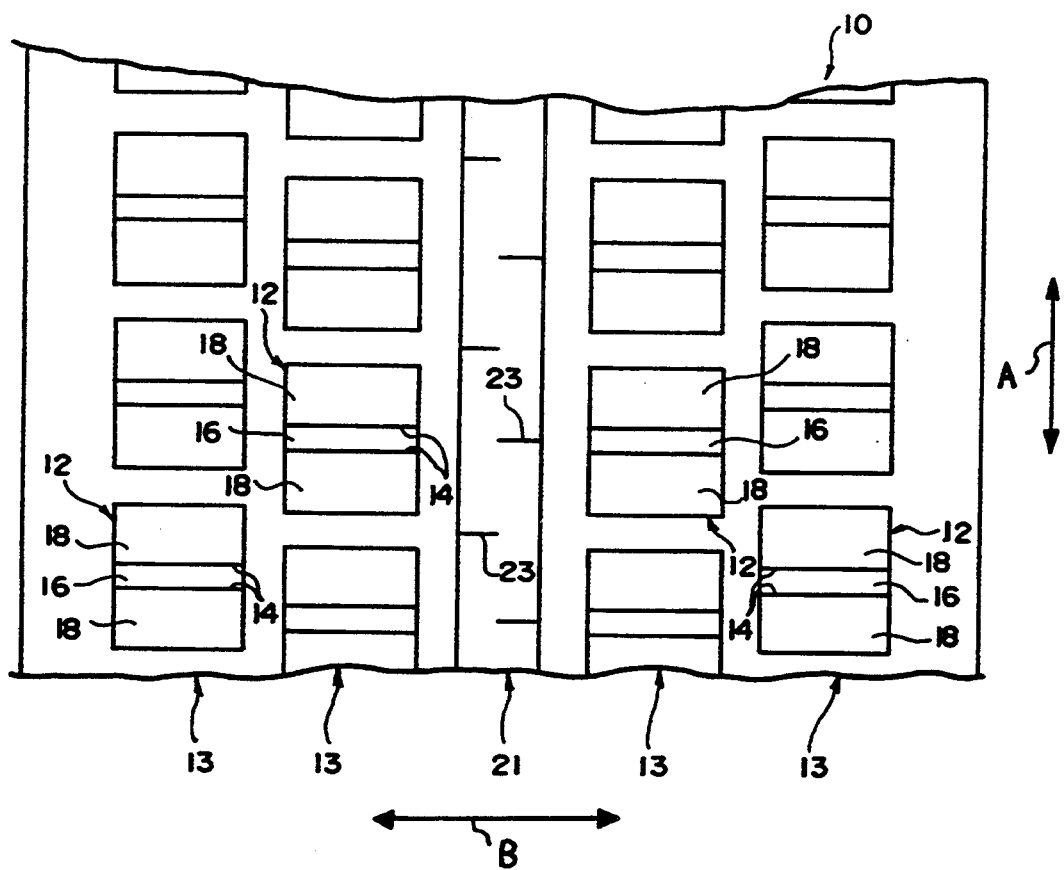
FIG. 33 illustrates a block pattern of a pneumatic tire of embodiment 5-3 of the present invention.

As shown in FIG. 33, a rib 21, which extends in the circumferential direction of the tire (the direction of arrow A in FIG. 33) and which serves as a rigid area, is provided in the center of the pneumatic tire 10 of the present invention in the transverse direction thereof (the direction of arrow B in FIG. 33). Short sipes 23, which extend from the side surfaces of the rib 21 in the transverse direction of the tire toward the tread center, are disposed alternately in the rib 21 along the circumferential direction of the tire. The rigidity of the rib 21 with respect to the transverse direction of tire is greater than that of the narrow area 16.

Accordingly, in the pneumatic tire 10 of the present embodiment, portions having higher rigidity than the narrow areas 16, i.e., the wide areas 18 and the rib 21, are disposed at the transverse direction sides of the narrow areas 16. Therefore, just as in the pneumatic tire 10 of embodiment 5-1, even when an extreme frictional force is applied to the tire, the force is not concentrated exclusively on the narrow areas 16. Therefore, the sipe 14 does not open excessively, and cracks do not form in the bottom portion 14A of the sipe 14. Further, even if a side force F is applied and a complex force, which is comprised mainly of a horizontal direction component, is applied, the amount of deformation is mitigated and reduced by the areas having high rigidity (the wide areas 18 and the rib 21). The formation of cracks at, in particular, both end portions of the narrow area 16 is thereby prevented. In the present embodiment as well, the formation of cracks in the narrow area 16 and the breaking off of portions due to cracks can be effectively prevented.

EMBODIMENT 5-4

Next, embodiment 5-4 of the present invention will be described in accordance with FIG. 34. Parts which are the same as those of embodiment 5-1 are denoted by the same reference numerals, and description thereof is omitted.

Figure 34:
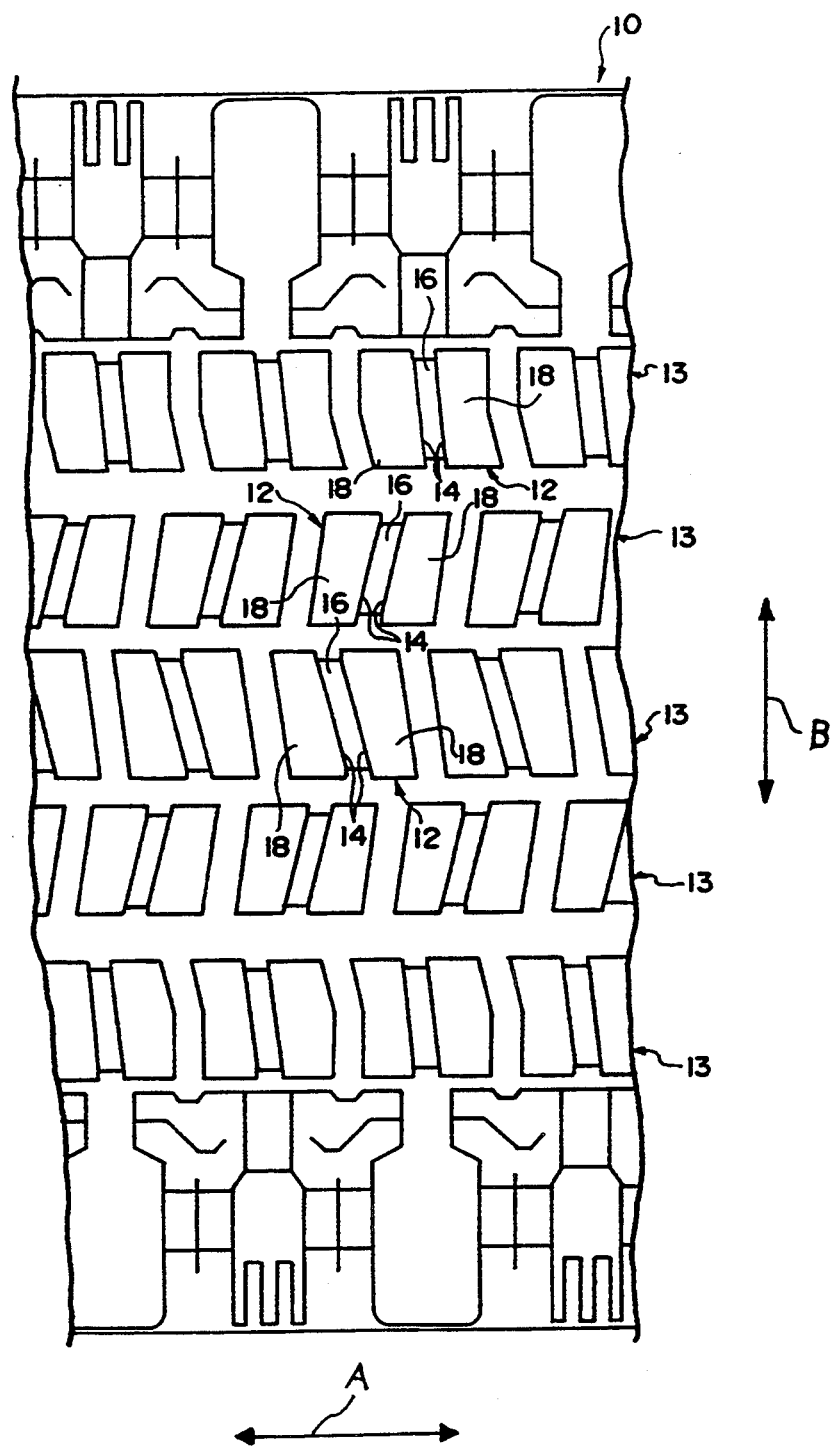
FIG. 34 illustrates a concrete example of a block pattern of a pneumatic tire of embodiment 5-4 of the present invention.

As shown in FIG. 34, the blocks 12 which are adjacent to each other in the transverse direction of the tire (the direction of arrow B in FIG. 34) are disposed so that the wide area 18 of one of the blocks 12 is located at the side, in the transverse direction of the tire, of the narrow area 16 of another block 12. In other words, the blocks 12 are disposed so as to be staggered in the circumferential direction of the tire with respect to the adjacent blocks 12. The blocks used in this example are those of the third and fourth embodiments in which the dimension of the narrow area 16 in the transverse direction of the tire is slightly smaller than the dimension of the wide area 18 in the transverse direction of the tire and in which the sipes 14 are slightly inclined with respect to the transverse direction of the tire. It is preferable that the longitudinal directions of the sipes formed in the blocks are inclined from 0° to 30° with respect to the transverse direction of the tire. When the longitudinal dimension of the narrow area is 50% to 95% of the longitudinal dimension of the wide area, the formation of cracks, which form easily in the transverse direction end portions of the bottom portions of the sipes due to the input of side force, can be prevented.

The same advantages as those obtained by embodiment 5-1 can be derived by using the pneumatic tire of embodiment 5-4.

The blocks used in embodiments 5-1 through 5-4 may be structured in the same way as the blocks shown in the second embodiment in which the bottom portions 14A of the sipes 14 are formed having substantially circular cross-sectional configurations which swell in directions of moving away from each other. Due to this structure, stress is not concentrated on the bottom portion 14A when the sipe 14 opens, and the formation of cracks from the bottom portions 14A is prevented.

In each of the above-described embodiments, one set of a pair of sipes is formed in each block. However, the present invention is not limited to the same, and two or more sets, each having one pair of sipes, may be provided per block. In the blocks of the above embodiments, circumferential sipes which extend in the circumferential direction of the tire, such as those illustrated in FIG. 10, can be formed at both sides of the block in the circumferential direction of the tire. In these cases as well, it is necessary to provide portions which are more rigid than the narrow areas (the rib, the blocks with no sipes, the wide areas of the block, and the like) at transverse direction sides of the narrow areas.

EXPERIMENTAL EXAMPLE

Figure 35:
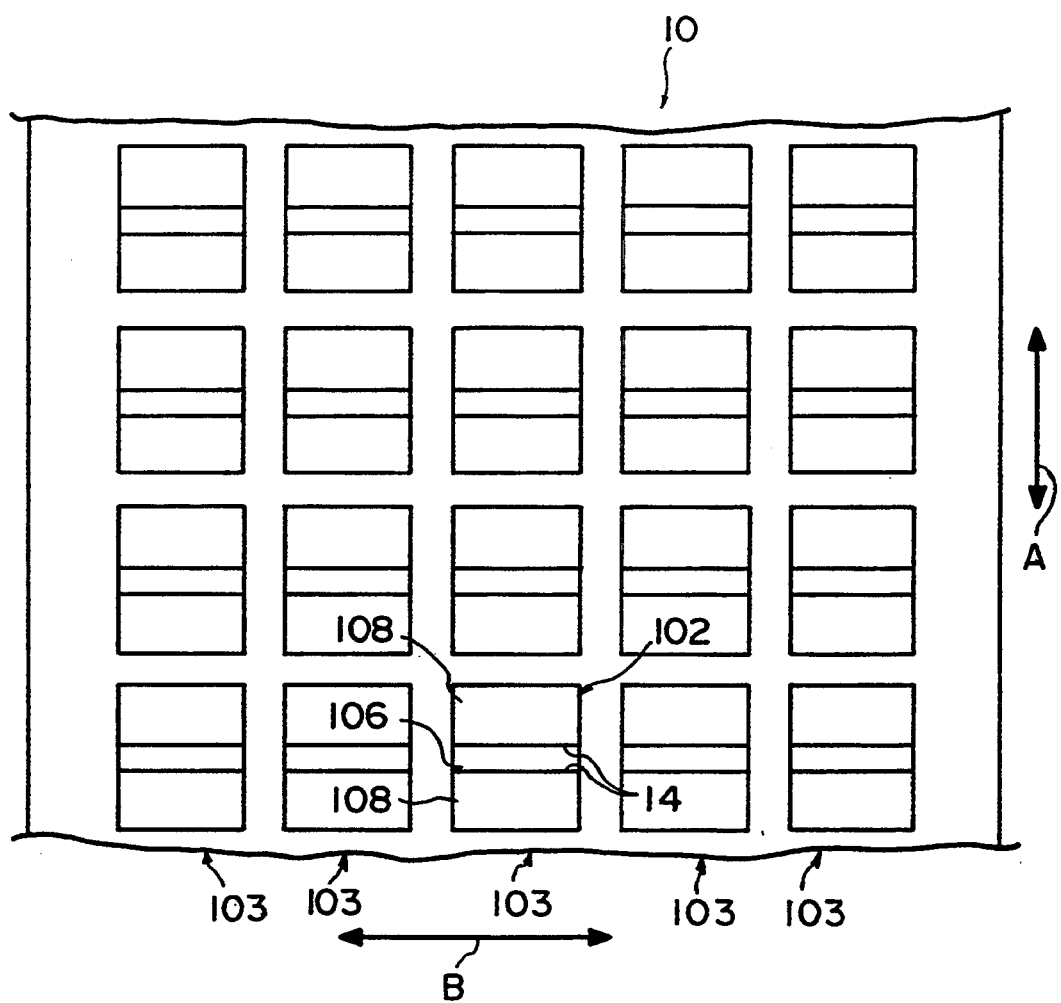
FIG. 35 illustrates a block pattern of a tire of a comparative example used in an experiment of the fifth embodiment of the present invention.
Figure 36:
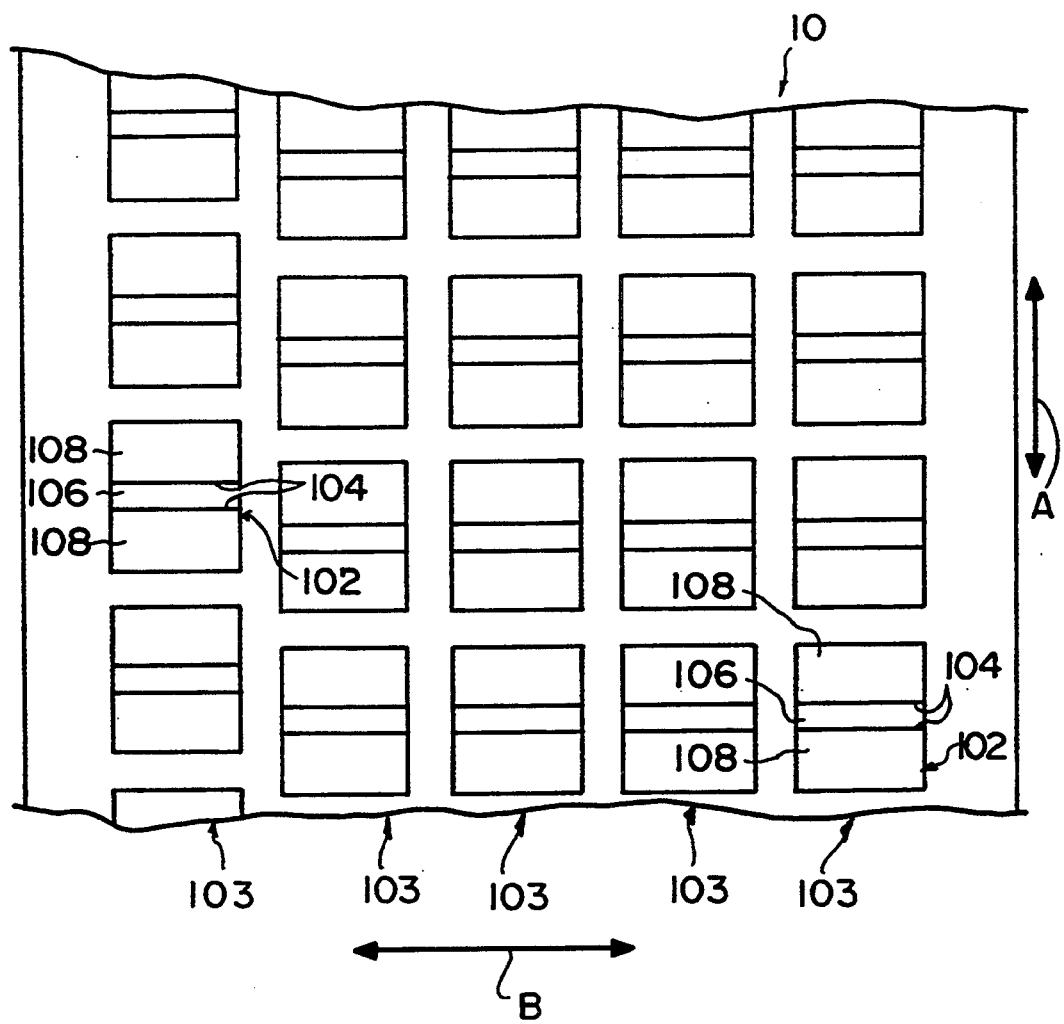
FIG. 36 illustrates a block pattern of a tire of another comparative example used in an experiment of the fifth embodiment of the present invention.
Figure 37:
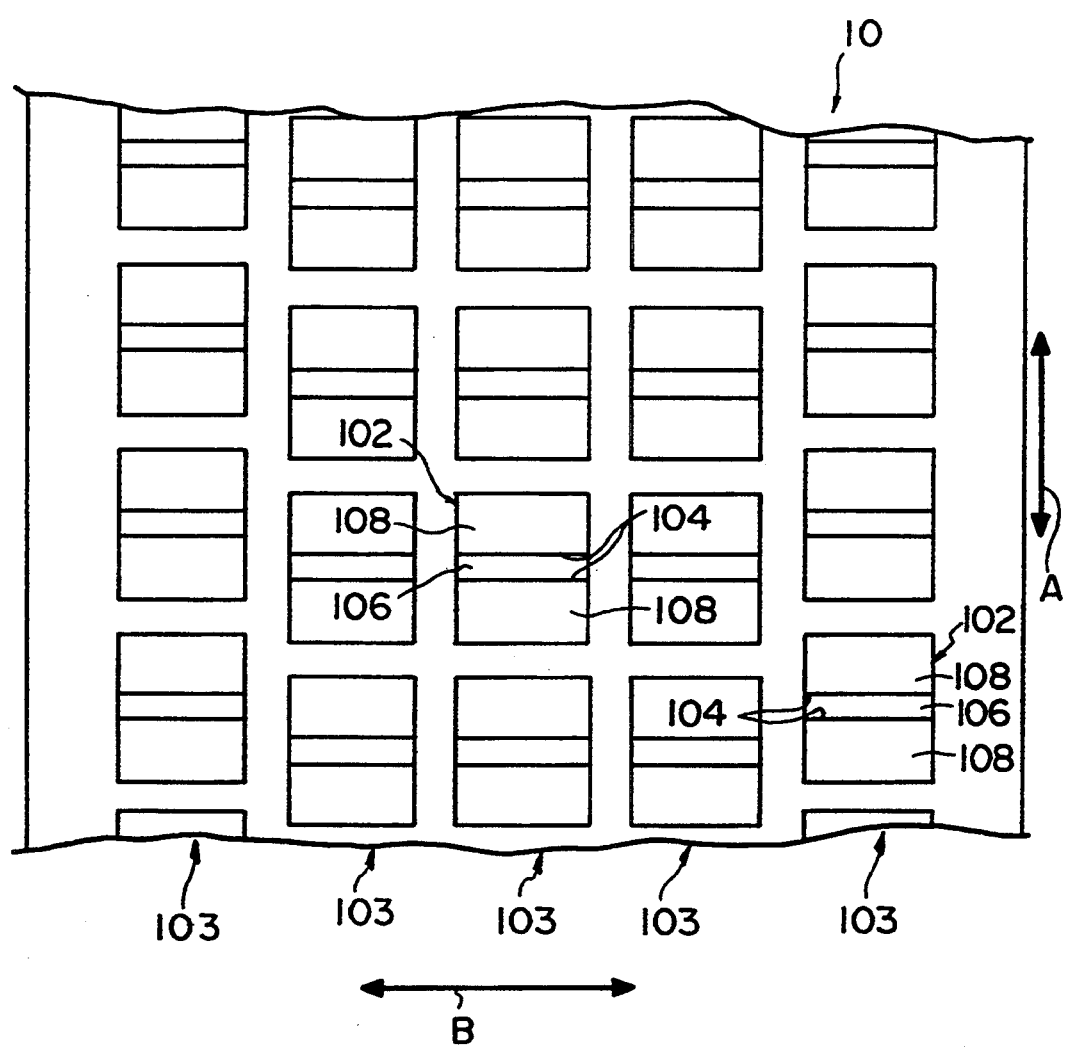
FIG. 37 illustrates a block pattern of a tire of another comparative example used in an experiment of the fifth embodiment of the present invention.

Comparative example tire 1, comparative example tire 2, comparative example tire 3 and the pneumatic tire of the present invention were each filled to standard internal pressure. These pneumatic tires were placed on the front wheels of respective trucks having constant ten-ton loads. After the ten-ton trucks were driven 10,000 km, the number of cracks which had appeared in the narrow areas were counted. Comparative example tire 1 is a pneumatic tire in which the narrow areas 106 of the blocks 102 are arranged in one row in the transverse direction of the tire as shown in FIG. 35. As shown in FIG. 36, comparative example tire 2 is a pneumatic tire in which the narrow areas 106 of the blocks 102 of the block rows 103 are arranged in one row in the transverse direction of the tire with the exception of the block row 103 on one transverse direction side of the tire. As shown in FIG. 37, in the pneumatic tire of comparative example 3, the narrow areas 106 of the three central block rows 103 are arranged in one row in the transverse direction of the tire, and the narrow areas 106 of the block rows 103 on the transverse direction sides of the tire are staggered in the circumferential direction of the tire with respect to the narrow areas 106 of the three central block rows 103. The tire of the present invention is a pneumatic tire having the tread pattern illustrated in FIG. 35. The size of all the tires used in the experiment was 10.00R20. The size of the blocks and the number of blocks per tire was the same in all of the tires. The results of this experiment are given below in Table 6.

TABLE 6

| Type of Tire | Tire 1 of the Present Invention | Comparative Example Tire 1 | Comparative Example Tire 2 | Comparative Example Tire 3 |
| --- | --- | --- | --- | --- |
| Number of Cracks/ Number of Narrow | 0/265 | 58/265 | 44/265 | 20/265 |

TABLE 6-continued

| Type of Tire | Tire 1 of the Present Invention | Comparative Example Tire 1 | Comparative Example Tire 2 | Comparative Example Tire 3 |
| --- | --- | --- | --- | --- |
| Areas | | | | |

It can be understood from the experimental results given in Table 6 that in the pneumatic tire of the present invention, the formation of cracks from the narrow areas is prevented.

EMBODIMENT 6-1

Figure 38:
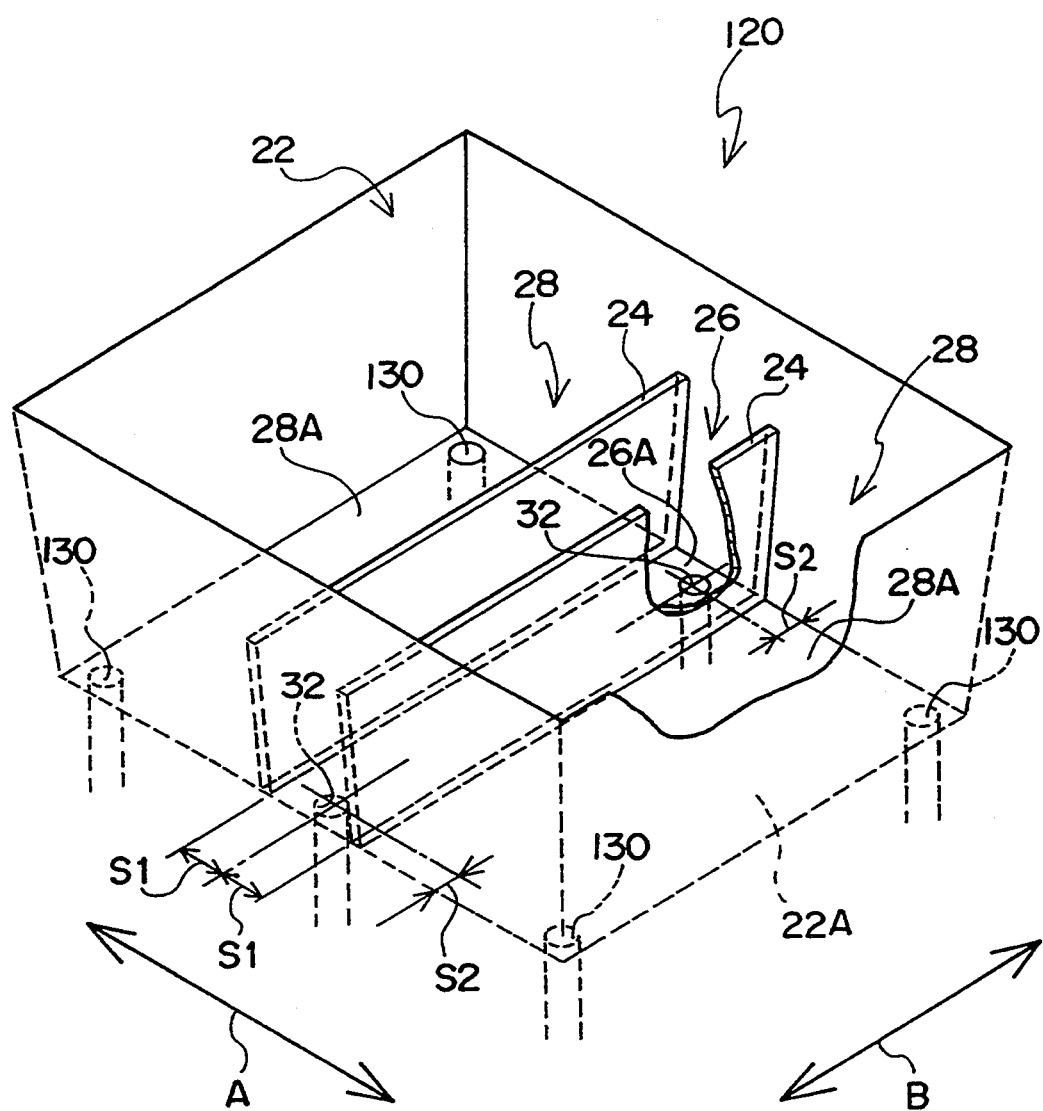
FIG. 38 illustrates a mold for vulcanization forming a pneumatic tire of embodiment 6-1 of the present invention.

A vulcanization mold used for manufacturing the pneumatic tire of the present invention will be described. FIG. 38 is a perspective view of a mold for vulcanization which is used in the present invention to form the pneumatic tire 10. As shown in FIG. 38, concave portions 22, which are shaped as substantial square columns and are used for forming the blocks 12, are provided in a forming surface of a mold 120. Blades 24, which are used to form the sipes 14, are provided in the concave portions 22. The blades 24 are formed as a pair of thin plates which extend parallel to each other along the transverse direction of the tire (the direction of arrow B in FIG. 38). As a result, the concave portion 22 is divided into three areas by the pair of blades 24. A concave portion 26 is provided between the pair of blades 24, and concave portions 28 are provided respectively at outer sides of the pair of blades 24. The concave portion 26 is a section for forming the narrow area, and the concave portions 28 are sections for forming the wide areas.

Vent holes 130 are provided in bottom surfaces 28A of the wide area forming concave portions 28 in the vicinities of corner portions of a bottom surface 22A of the concave portion 22. These vent holes 130 communicate with the air outside the mold 120. The vent holes 130 are formed so as to have circular cross sections. It is preferable that the total sectional area of the vent holes 130 per one wide area forming concave portion 28 is at least 1 mm². It is more preferable that the total sectional area of the vent holes 130 per one wide area forming concave portion 28 is greater than or equal to one percent of the surface area of the bottom surface 28A of one wide area forming concave portion 28, i.e., the surface area of the tread surface of one wide area 18 of the block 12.

Vent holes 32 are provided in the bottom surface 26A of the narrow area forming concave portion 26 at vicinities of both end portions in the transverse direction of the tire (the direction of arrow B). The vent holes 32 communicate with the air outside the mold 120. In the present embodiment, the vent holes 32 are formed so as to have circular cross-sectional configurations wherein the diameter d of the hole is 1.2 mm. Further, the distance S2 from the position of the vent hole 32 to the edge portion of the bottom surface 26A in the transverse direction of the tire is 3 mm. The vent hole 32 is positioned in the middle of the blades 24 (the distance S1 from the vent hole 32 to the blade 24 is 3 mm). It is preferable that the total sectional area of the vent holes 32 per one narrow area forming concave portion 26 is greater than or equal to 1 mm². It is more preferable that the total sectional area of the vent holes 32 per one narrow area forming concave portion 26 is greater than or equal to one percent of the surface area of the bottom surface 26A of one narrow area forming concave portion 26, i.e., the surface area of the tread surface of one narrow area 16 of the block 12. If two or more vent holes 32 are provided, it is preferable that they be spaced apart from each other as far as possible.

Figure 58:
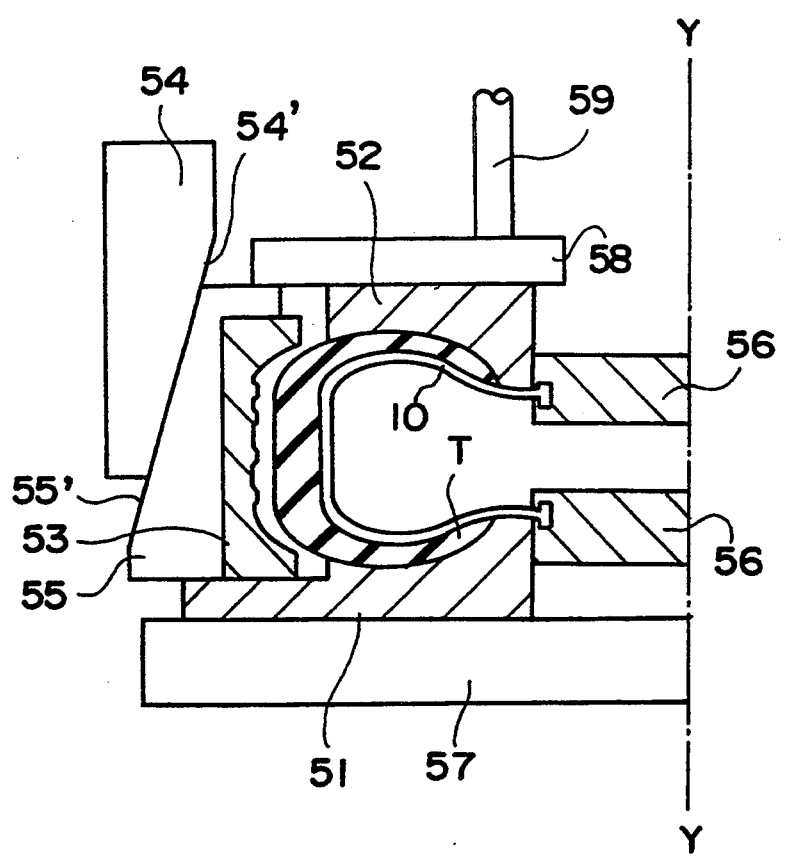
FIG. 58 is a sectional view of an apparatus for vulcanizing used in a method of manufacturing a pneumatic tire of the present invention.

Next, a method of manufacturing the pneumatic tire of the present invention will be described. FIG. 58 is a sectional view of principal parts of an apparatus for vulcanizing a green tire. The apparatus is equipped with the mold 120 of the present invention having the structure illustrated in FIG. 38. The apparatus is comprised mainly of molds 51 and 52, which support the side portions of the tire, a mold 53, which supports the tread side of the tire and forms a predetermined block pattern, and a machine stand base 56 which fixes an expandable vulcanizing bag 50. The molds 51 and 52 are fixed respectively to lower platen 57 and upper platen 58. The mold 53 is divided into a plurality of parts which are respectively attached to segments 55 into which the green tire 34 is divided in the circumferential direction. A plurality of concave portions structured such as those shown in FIG. 38 are provided in the inside surface of the mold 53 so as to form a predetermined tread pattern. The upper platen 58 is attached to a piston rod 59 of a fluid cylinder so that the mold 52 moves vertically along with the vertical motion of the piston rod 59. An outer ring 54 has an inclined surface 54' which can move vertically. The outer ring 54 contacts and engages with respective inclined surfaces 55' of the segments 55. In this device, first, when the upper side mold 52 is at its upper standby position, the green tire is inserted into and maintained in the vulcanizing bag 50. Next, the piston rod 59 is lowered, and the upper side mold 52 is made to contact the green tire. Then, the outer ring 54 is lowered, and the mold 53 is pushed against the green tire by the segments 55 being moved horizontally towards the central axis Y—Y of the vulcanization forming device. Accordingly the tread pattern is formed, and as the vulcanization of the green tire progresses, the pneumatic tire is formed. The vulcanization forming apparatus used in the method of the present invention is not limited to that illustrated in FIG. 58. The pneumatic tire of the present invention can be manufactured using any of a variety of vulcanization forming apparatuses.

Figure 39:
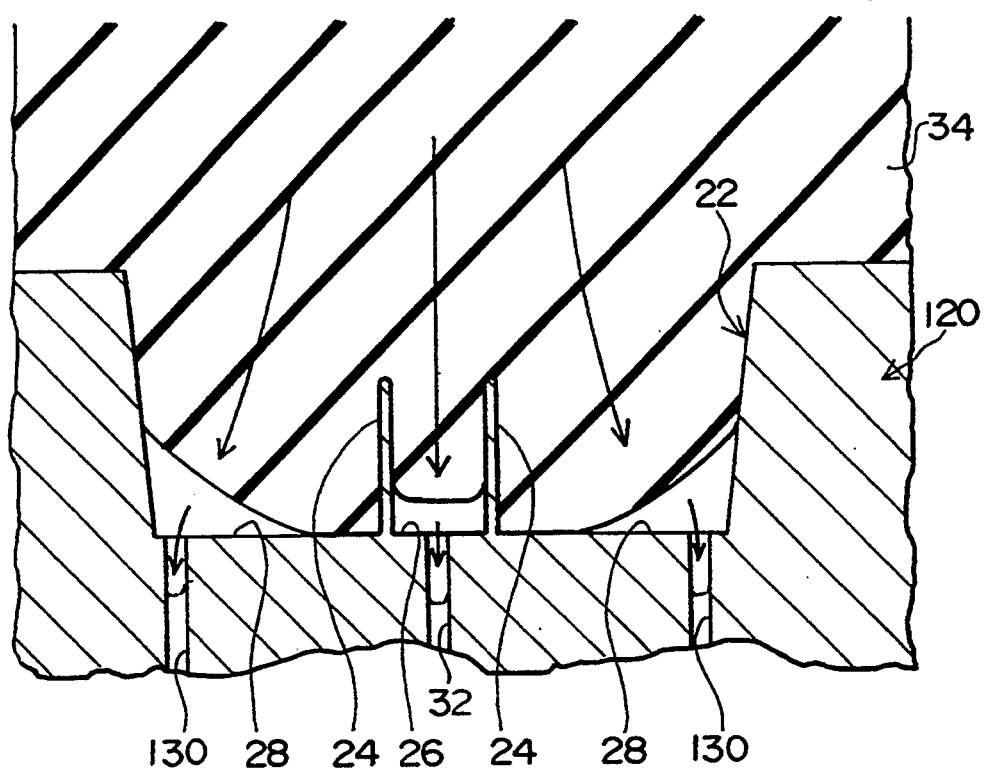
FIG. 39 illustrates a state in which rubber is filled in the mold illustrated in FIG. 38.
Figure 39:

In accordance with the method of the present invention, an unvulcanized green tire is placed in the mold 120 of the present invention illustrated in FIG. 38. Next, the interior of the unvulcanized green tire is pressurized by an unillustrated bladder which is disposed within the green tire. FIG. 39 illustrates a state in which the green tire is inserted in the mold. In the drawing, the rubber 34 of the green tire is inserted in the concave portion 22. The air in the concave portion 22 is pushed out to the outside air through the vent holes 30 and the vent holes 32. The rubber 34 of the green tire reaches the corners of the bottom surface 26A of the narrow area forming concave portion 26 and the corners of the bottom surfaces 28A of the wide area forming concave portions 28, and can be tightly pressed against the inner surfaces of the mold. Thereafter, the green tire within the mold 120 for vulcanization is vulcanized for a predetermined period of time at a predetermined temperature. Accordingly, bare areas are not formed in the blocks 12 of the pneumatic tire 10 formed by the method of manufacturing a pneumatic tire of the present invention.

EMBODIMENT 6-2

Figure 40:
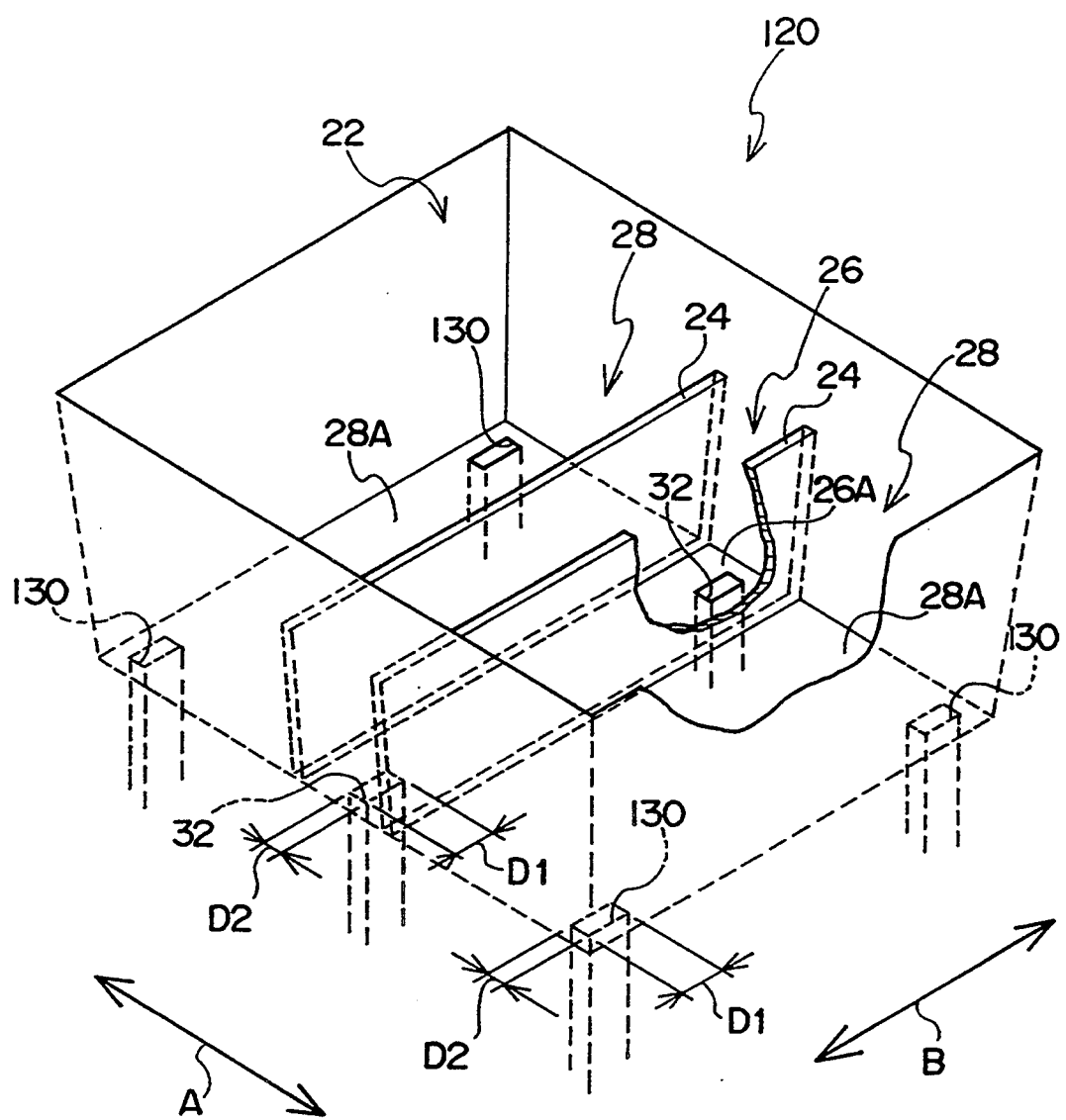
FIG. 40 illustrates a mold for vulcanizing a pneumatic tire of embodiment 6-2 of the present invention.

In the previous embodiment, the cross-sectional configurations of the vent holes 130 and the vent holes 32 are circular. However, the present invention is not limited to the same. Another vulcanization mold of the present invention is illustrated in FIG. 40. In the present embodiment, the cross-sectional configurations of the vent holes 130 and the vent holes 32 are rectangular. The dimension D1 of the respective vent holes 130, 32 in the transverse direction of the tire (the direction of arrow B in FIG. 40) is 1 mm, the dimension D2 thereof in the circumferential direction of the tire (the direction of arrow A in FIG. 40) is 0.5 mm. In other respects, the mold of the present embodiment is the same as that of embodiment 6-1.

Figure 41:
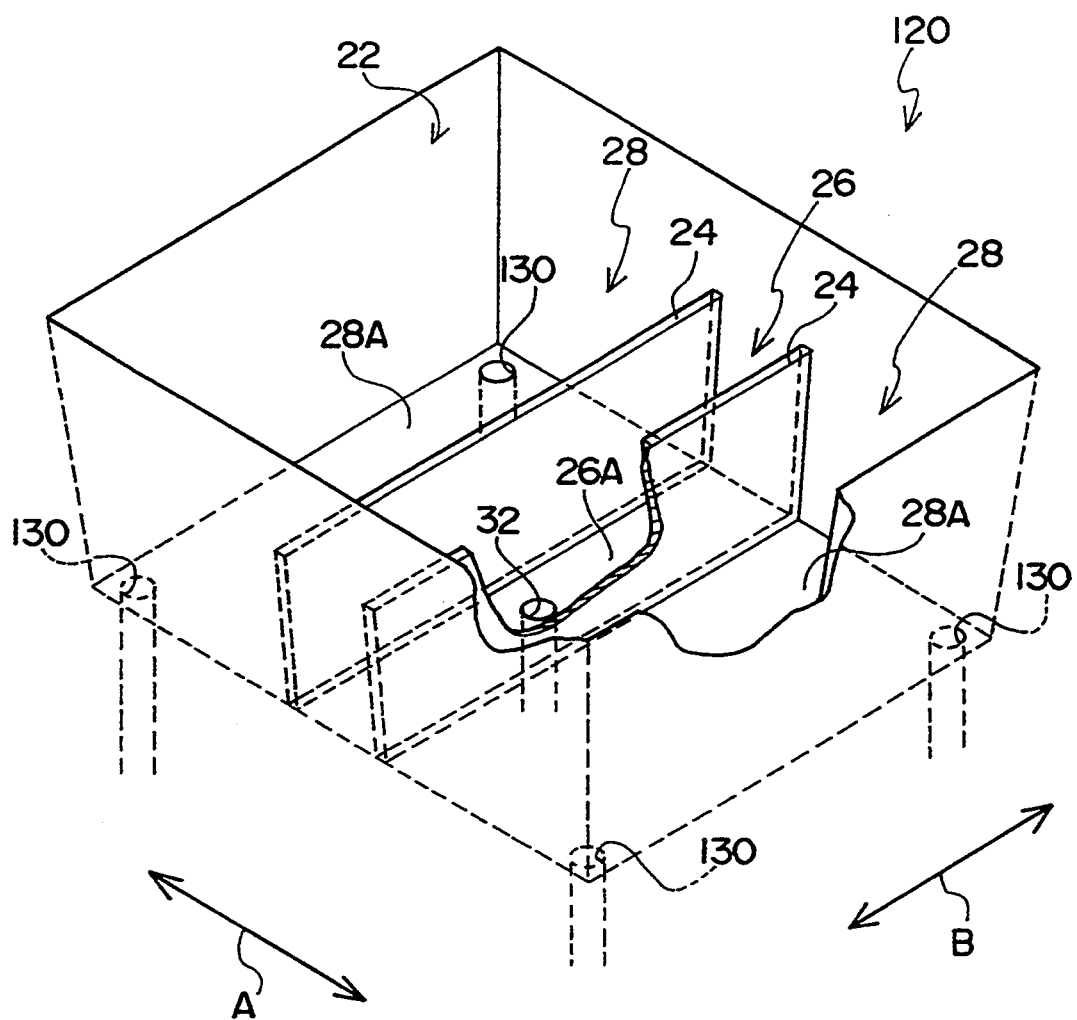
FIG. 41 illustrates a mold for vulcanizing a pneumatic tire of the present invention, wherein only one vent hole is provided in a bottom surface of a concave portion used for forming a narrow area.

In the above-described embodiment, two vent holes 32 are provided in the bottom surface 26A of the narrow area forming concave portion 26. However, it suffices to provide one vent hole 32 in the narrow area forming portion 26. FIG. 41 illustrates an example of a mold in which one vent hole 32 is provided in the center of the bottom surface 26A.

EMBODIMENT 6-3

Figure 42:
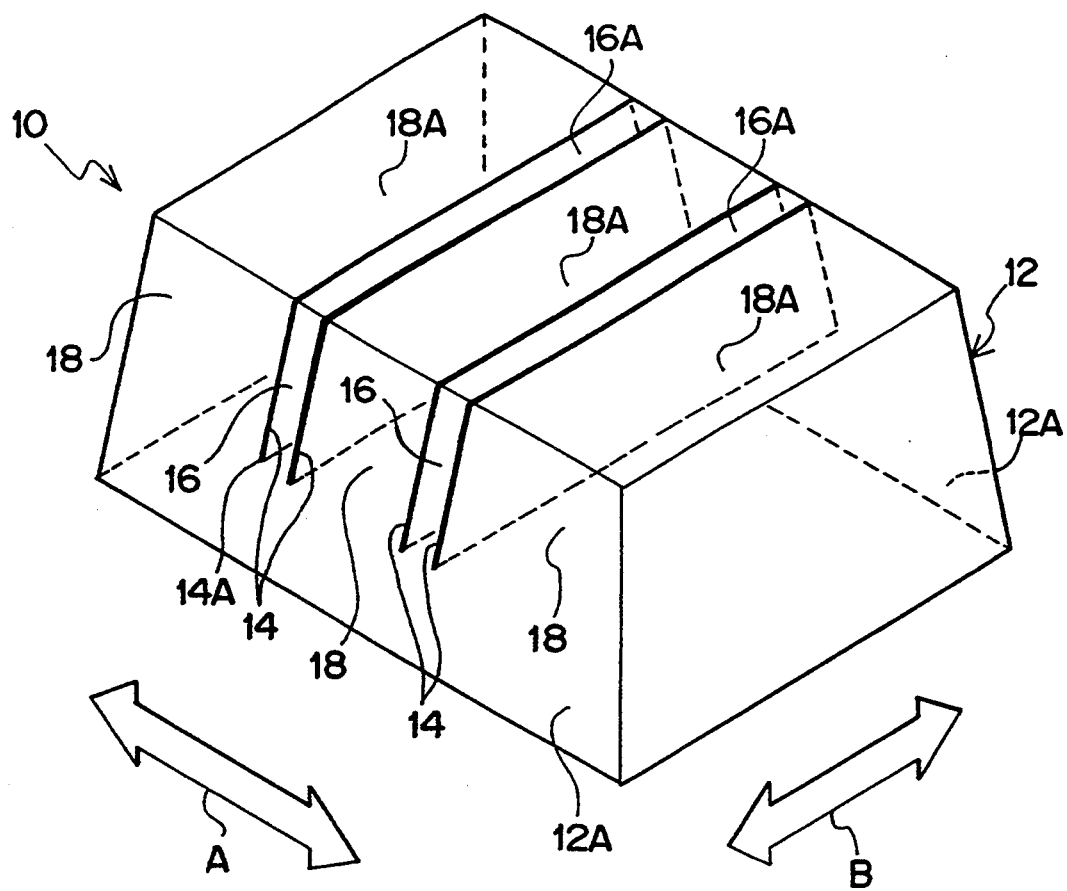
FIG. 42 illustrates a block of a pneumatic tire having two sets of sipes.

A vulcanization forming mold for manufacturing a pneumatic tire having blocks in which two sets of pairs of sipes 14 are provided, as shown in FIG. 42, will be described. Parts which are the same as those of embodiment 6-1 are denoted by the same reference numerals, and description thereof is omitted.

Figure 43:
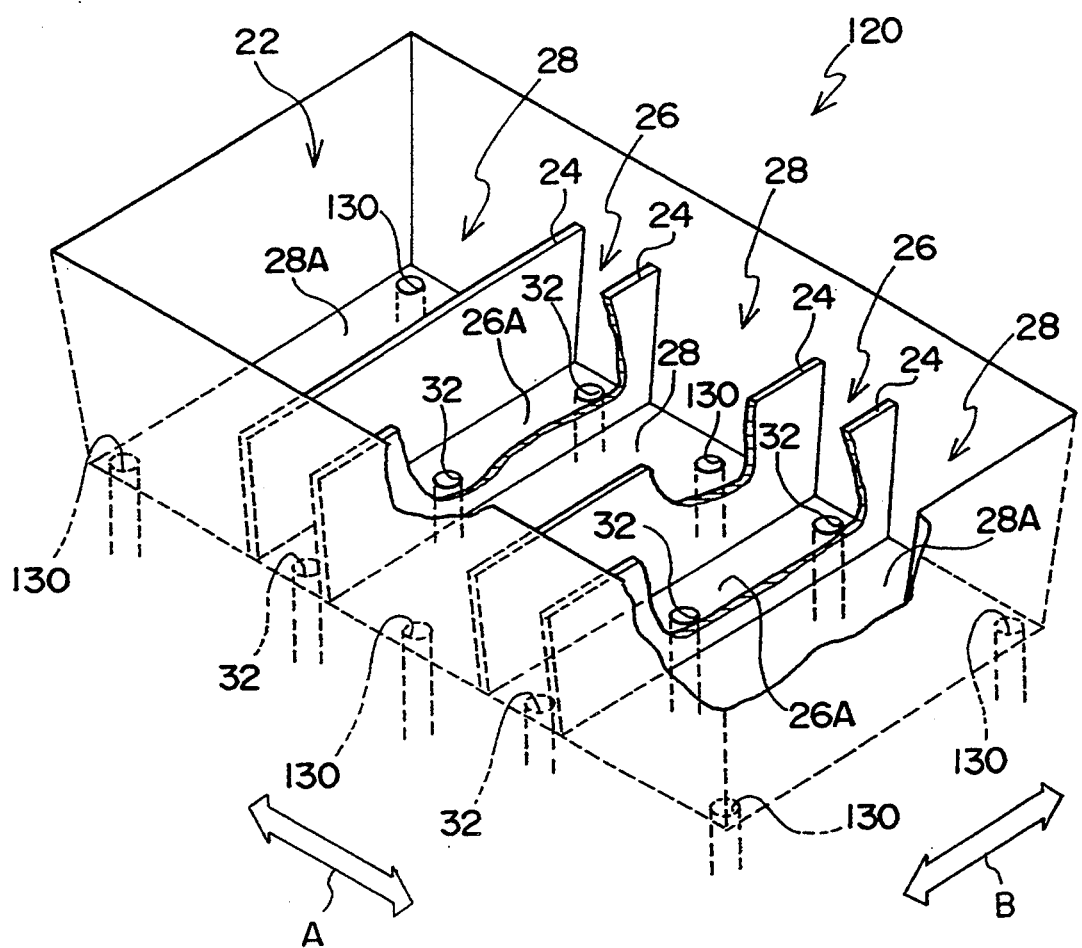
FIG. 43 illustrates a mold of the present invention for manufacturing a pneumatic tire having the block illustrated in FIG. 42.

As shown in FIG. 43, two sets of pairs of blades 24 are provided in the concave portion 22 for forming a block. The vent holes 32 are provided in vicinities of both end portions in the transverse direction of the tire (the direction of arrow B in FIG. 43) and in central portions of the bottom surfaces 26A of each narrow area forming concave portion 26 which is interposed between the pair of blades 24. In the present embodiment, the diameter of the vent hole 32 is set to 1 mm.

Further, the vent holes 130 are provided in vicinities of end portions in the transverse direction of the tire of the bottom portion 28A of the wide area forming concave portion 28 which is provided in the center of the concave portion 22 in the circumferential direction of the tire (the direction of arrow A in FIG. 43).

In the present embodiment as well, when the rubber 34 of the green tire flows into the concave portion 22, the air inside the concave portion 22 is pushed out to the outside air through the vent holes 130 and the vent holes 32. The rubber 34 of the green tire reaches the corners of the bottom surfaces 26A of the narrow area forming concave portions 26 and the corners of the bottom surfaces 28A of the wide area forming concave portions 28. The rubber 34 of the green tire can thereby be fit tightly against the inside surfaces of the mold. Accordingly, bare areas are not formed in the blocks 12 of the pneumatic tire 10 of the present embodiment.

In the above-described embodiments, one or two sets of pairs of sipes were provided per block by the mold. However, the present invention is not limited to the same; the mold may be formed so that three or more sets of pairs of sipes are provided per block.

At least one vent hole 32 may be provided in the narrow area forming concave portion 26, and a plurality of the vent holes 32 may be provided as occasion demands.

Although the configuration of the vent holes 130, 32 is not specified in particular, in order for air to escape therethrough, it is preferable that the configuration of the vent holes 130, 32 is as simple as possible (e.g., circular, rectangular, and the like).

Further, in the present embodiment the blades for forming the pair of sipes are parallel. However, in the present invention, it is not absolutely necessary that the blades are parallel. In addition, the heights and the configurations of the blades are not limited. The shapes of the concave portions of the mold which are used for forming the blocks are not limited to those used in the embodiments, and a variety of configurations may be used.

EXPERIMENTAL EXAMPLE

An experiment was performed with five molds for vulcanization each having different characteristics (existence of vent holes, number of vent holes, size of vent holes, size of ground contacting surface area of narrow area). Green tires were respectively vulcanized in the molds. The blocks on the pneumatic tires formed by the vulcanization molds were inspected to determine whether bare areas had formed in the blocks, and the bare areas which were formed were measured by observation. The results of this experiment are given in Table 7. The size of the bare area of the conventional tire is given as an index number of 100. Smaller numbers are more preferable.

TABLE 7

|  | Comparative Example | Present Invention 1 | Present Invention 2 | Present Invention 3 | Conventional Example |
| --- | --- | --- | --- | --- | --- |
| Number of vent holes in narrow area forming concave portion | 1 | 1 | 1 | 2 | 0 |
| Sectional area of vent hole (mm$^2$) | 0.5 | 1.1 | 1.1 | 1.1 × 2 | — |
| Ground contacting surface area narrow area (mm$^2$) | 90 | 90 | 180 | 180 | 90 |
| Existence of bare areas | Yes | No | Yes | No | Yes |
| Size of bare | 50 | — | 20 | — | 100 |

TABLE 7-continued

| | Comparative Example | Present Invention 1 | Present Invention 2 | Present Invention 3 | Conventional Example |
|---|---|---|---|---|---|
| areas (index number) | | | | | |

As can be understood from the experimental results given in Table 7, when a pneumatic tire is manufactured using the mold for vulcanization forming of the present invention, the formation of bare areas in the narrow area can be controlled.

The present invention may be embodied in a variety of forms without departing from the spirit or essential characteristics thereof. For example, a variety of configurations and dimensions can be used for the block of the pneumatic tire, and a variety of arrangements and combinations can also be used. Further, the structure and elements of the tread are not limited to those described in the embodiments, and various structures and elements may be used. Therefore, the aforementioned embodiments are in all respects illustrative and not restrictive, the scope of the invention being indicated by the appended claims rather than by the foregoing description and all changes which come within the meaning and range of equivalency of the claims are therefore intended to be embraced therein.

What is claimed is:

1. A pneumatic tire comprising a plurality of blocks, each block being located on a ground facing surface of the tire and having at least one set of two sipes extending substantially in a transverse direction of the tire, said at least one set of two sipes defining a first area therebetween and second areas on opposite sides of said first area in a circumferential direction of the tire, the first area being a narrow area having a width TS in a circumferential direction of the tire less than a width TL of each second area in the circumferential direction of the tire, the second areas being wide areas, each sipe having a depth in a radial direction of the tire and a groove width in the circumferential direction of the tire, the groove width of each sipe adjacent a radially innermost bottom portion of the sipe being larger than the groove width of each sipe adjacent a radially outermost top portion of the sipe to define expanded portions at the bottom portion of the sipes, a ratio L/TS of a shortest distance L between the expanded portions of the sipes to an average length TS of the first area in the circumferential direction of the satisfying $0.7 \leq L/TS \leq 1.5$, the bottom portions of the sipes being expanded in convex shapes extending in opposite directions towards the wide areas of the block in the circumferential direction of the tire.

2. The pneumatic tire of claim 1, wherein an average distance H2 in the radial direction of the tire from a tread surface of the first area to bottom portions of the sipes is less than an average distance H1 in the radial direction of the tire from tread surfaces of the second areas to bottom portions of the sipes.

3. The pneumatic tire according to claim 1, wherein a ratio W2/W1 of a length W2 of said narrow area in the transverse direction of the tire to a length W1 of said wide areas in the transverse direction to the tire satisfies $0.50 \leq W2/W1 \leq 0.95$.

4. The pneumatic tire according to claim 1, wherein a length, in the circumferential direction of the tire, of at least one end portion of said narrow area is longer than a length, in the circumferential direction of the tire, of a central portion of said narrow area.

5. The pneumatic tire according to claim 1, wherein the plurality of blocks define a tire block pattern structured so that said narrow area of said block is aligned, in the transverse direction of the tire, with an area having a greater rigidity than the rigidity of said narrow area, said area of rigidity being in a block adjacent to said block in the transverse direction of the tire.

6. The pneumatic tire according to claim 1, wherein said at least one set of sipes defines main sipes and further comprising at least one auxiliary sipe in each of said wide areas, the at least one auxiliary sipe having a depth in the radial direction less than the respective depths of the main sipes.

7. The pneumatic tire of claim 1, wherein the sipes are inclined relative to the radial direction of the tire such that radial extensions of the sipes intersect.

8. A pneumatic tire comprising a plurality of blocks, each block being located on a ground facing surface of the tire and having at least one set of two sipes extending substantially in a transverse direction of the tire, said at least one set of two sipes defining a first area therebetween and second areas on opposite sides of said first area in a circumferential direction of the tire, the first area being a narrow area having a width TS in a circumferential direction of the tire less than a width TL of each second area in the circumferential direction of the tire, the second areas being wide areas, each sipe having a depth in a radial direction of the tire and a groove width in the circumferential direction of the tire, the groove width of each sipe adjacent a radially innermost bottom portion of the sipe being larger than the groove width of each sipe adjacent a radially outermost top portion of the sipe to define expanded portions at the bottom portion of the sipes, a ratio L/TS of a shortest distance L between the expanded portions of the sipes to an average length TS of the first area in the circumferential direction is approximately equal to 1, the bottom portions of the sipes being expanded in convex shapes extending in opposite directions towards the wide areas of the block in the circumferential direction of the tire.

9. The pneumatic tire of claim 8, wherein an average distance H2 in the radial direction of the tire from a tread surface of the first area to bottom portions of the sipes is less than an average distance H1 in the radial direction of the tire from tread surfaces of the second areas to bottom portions of the sipes.

10. The pneumatic tire according to claim 8, wherein a ratio W2/W1 of a length W2 of said narrow area in the transverse direction of the tire to a length W1 of said wide areas in the transverse direction to the tire satisfies $0.50 \leq W2/W1 \leq 0.95$.

11. The pneumatic tire according to claim 8, wherein a length, in the circumferential direction of the tire, of at least one end portion of said narrow area is longer than a length, in the circumferential direction of the tire, of a central portion of said narrow area.

12. The pneumatic tire according to claim 8, wherein the plurality of blocks define a tire block pattern structured so that said narrow area of said block is aligned, in the transverse direction of the tire, with an area having a greater rigidity than the rigidity of said narrow area, said area of rigidity being in a block adjacent to said block in the transverse direction of the tire.

13. The pneumatic tire according to claim 8, wherein said at least one set of sipes defines main sipes and further comprising at least one auxiliary sipe in each of said wide areas, the at least one auxiliary sipe having a depth in the radial direction less than the respective depths of the main sipes.

* * * * *